United States Patent [19]

Payne

[11] Patent Number: 4,507,612
[45] Date of Patent: Mar. 26, 1985

[54] METAL DETECTOR SYSTEMS FOR IDENTIFYING TARGETS IN MINERALIZED GROUND

[75] Inventor: George C. Payne, Salem, Oreg.

[73] Assignee: Teknetics, Inc., Lebanon, Oreg.

[21] Appl. No.: 325,040

[22] Filed: Nov. 25, 1981

[51] Int. Cl.³ .................... G01V 3/11; G01V 3/165
[52] U.S. Cl. .................................. 324/329; 324/233
[58] Field of Search ............... 324/329, 233, 326, 339

[56] References Cited

U.S. PATENT DOCUMENTS

| | | | |
|---|---|---|---|
| 3,147,429 | 9/1964 | Moran | 324/339 |
| 3,405,354 | 10/1968 | Callan et al. | |
| 3,676,772 | 7/1972 | Lee | |
| 3,826,973 | 7/1974 | Pflaum | 324/329 |
| 3,872,380 | 3/1975 | Gardiner | |
| 4,030,026 | 6/1977 | Payne | 324/329 |
| 4,095,469 | 6/1978 | Yamada et al. | |
| 4,096,432 | 6/1978 | Spencer | 324/329 |
| 4,128,803 | 12/1978 | Payne | 324/329 |
| 4,188,577 | 2/1980 | Mhatre et al. | 324/233 X |
| 4,213,093 | 7/1980 | Pecori | 324/329 |
| 4,249,128 | 2/1981 | Karbowski | 324/329 |
| 4,325,027 | 4/1982 | Dykstra et al. | 324/329 |
| 4,331,920 | 5/1982 | Kalisch et al. | 324/233 X |
| 4,334,192 | 6/1982 | Podhrasky | 324/329 |
| 4,344,034 | 8/1982 | Randolph | 324/329 |
| 4,423,377 | 12/1983 | Podhrasky | 324/329 |

*Primary Examiner*—Gerard R. Strecker
*Attorney, Agent, or Firm*—Christensen, O'Connor, Johnson & Kindness

[57] ABSTRACT

Synchronous demodulators demodulate the signal developed in a receive coil coupled to an oscillator driven transmit coil and produce signals that include target pulses when the detector head housing the transmit and receive coils passes over a metallic object (e.g., a target) buried in the ground. The signals are processed to remove ground mineralization information and to determine the "phase angle" of the target, which angle uniquely identifies the detected target. The tangent of the phase angle is determined using either implicit division (sometimes referred to as steepest descent division) or direct division. Regardless of which division technique is used, as the signals are processed, they are continuously filtered to remove ground mineralization information. In addition, the target component of the signals is converted from pulse form into ringing signal form. The ringing signals are processed in a manner that maintains phase correlation between the signals and produces the desired phase angle information. Regardless of how implemented the phase angle information is only determined when the detector head is passing over the target, each such pass improving the accuracy of the result. Further, if the target signals being processed reach a magnitude sufficient to saturate the amplifiers used in various circuits, phase angle determination is inhibited. In addition, the depth of the target is determined by analyzing the magnitude of the target pulse produced when the detector head passes over a target. Both the target identity and the depth signals are displayed on juxtaposed LCD bar graphs. The depth display enhances the target identity display, particularly in situations where the phase angle of undesirable targets (e.g., pull tabs) is close to the phase angle of desirable targets (e.g., $2.50, $5.00 and $10.00 gold pieces).

76 Claims, 24 Drawing Figures

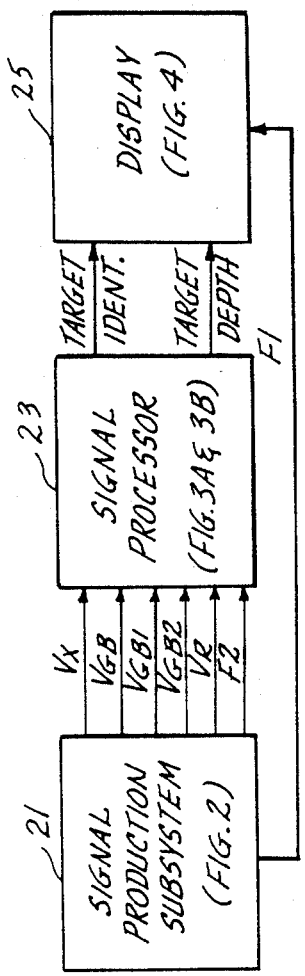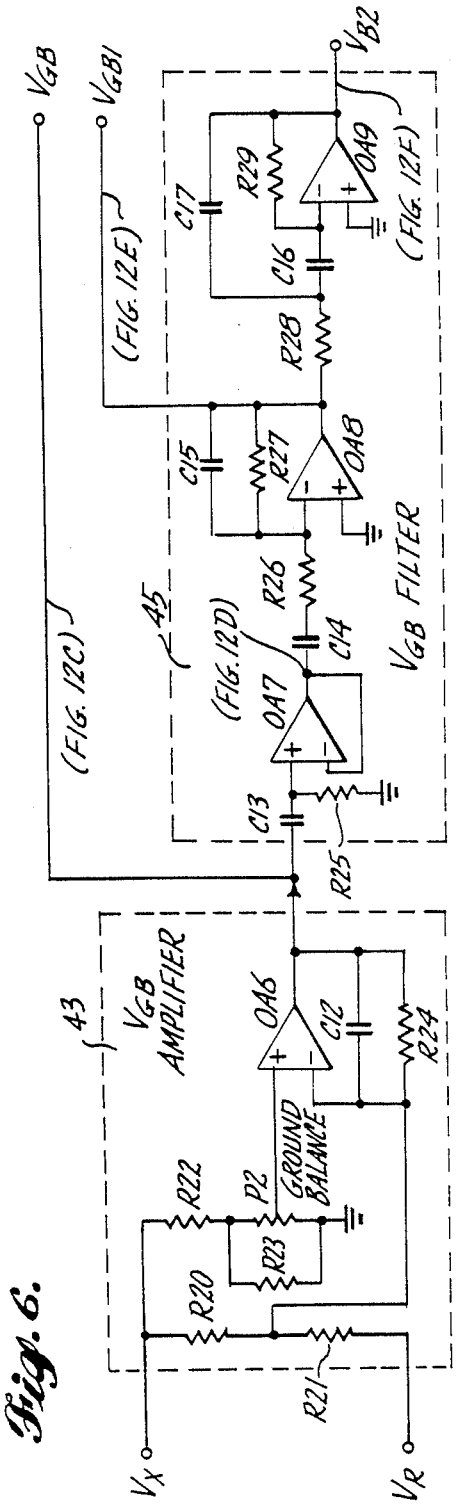

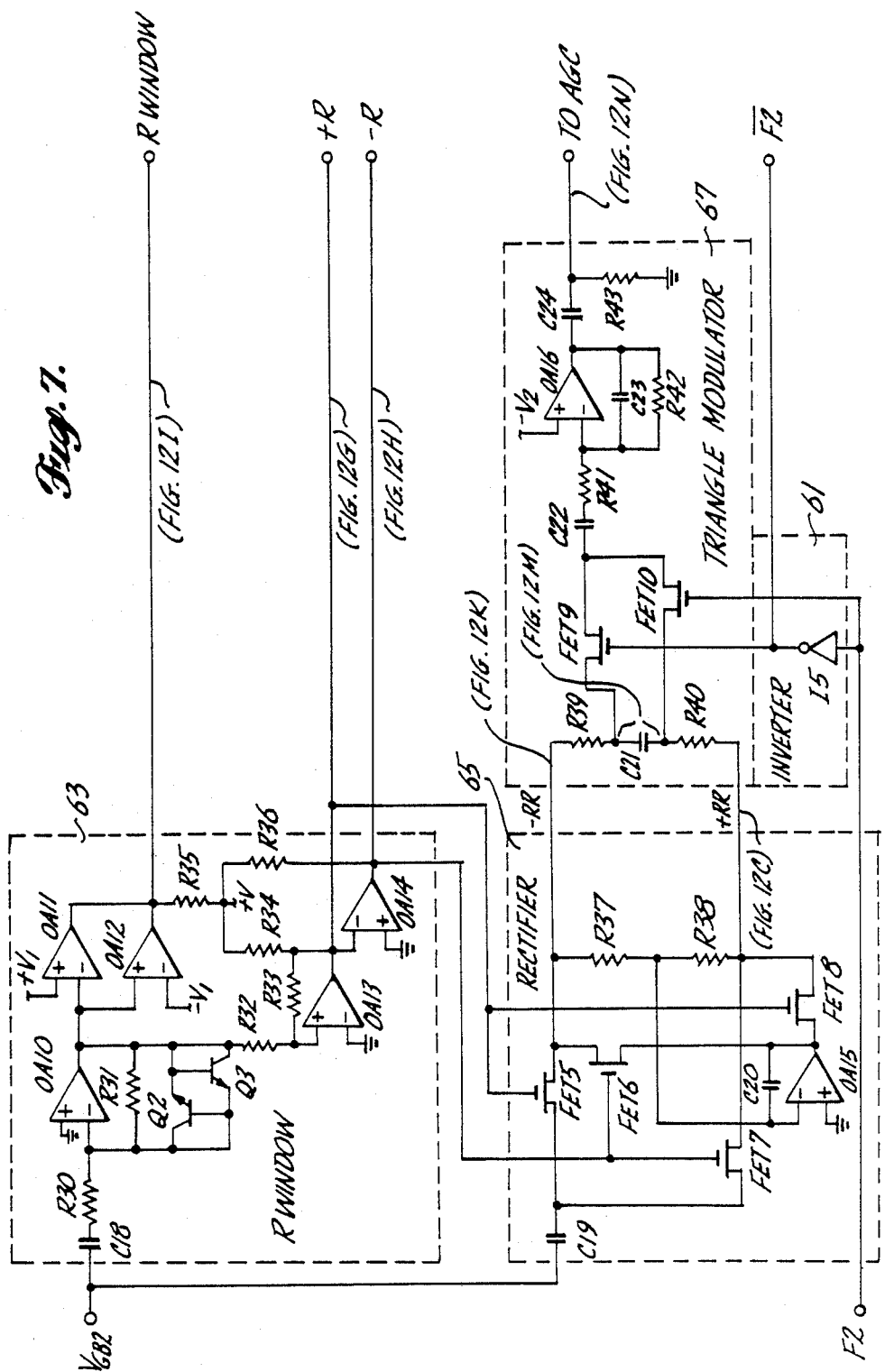

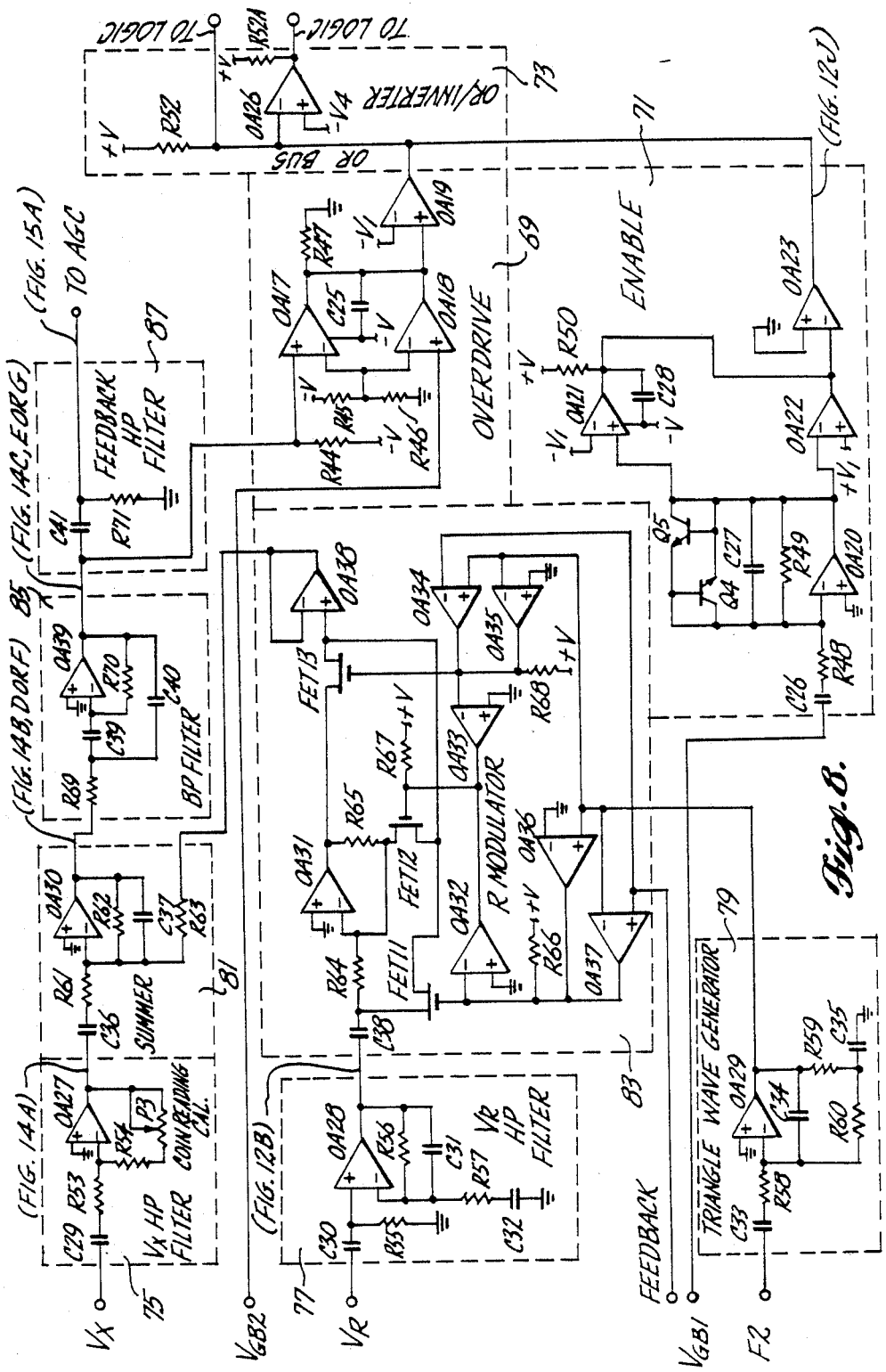

METAL DETECTOR SYSTEMS FOR IDENTIFYING TARGETS IN MINERALIZED GROUND

TECHNICAL AREA

This invention is directed to metal detectors and, more particularly, metal detectors having the ability to identify the specific types of metal objects (e.g., targets) detected.

BACKGROUND OF THE INVENTION

As used in this application the term "metal detector" is generally directed to metal detectors of the type used by individuals to locate buried metal objects, particularly valuable metal objects. Such metal detectors are to be contrasted with other types of metal detectors, such as military metal detectors used to locate mines, commercial metal detectors used to locate pipes and other large metallic objects, and security metal detectors used in airports and other areas to locate lethal weapons (such as knives and guns). While some of the principles involved in the present invention may be useful in these other types of metal detectors, it is to be kept in mind that the invention was developed for use with metal detectors used to locate valuable metal objects buried in mineralized ground and finds its main use in such detectors.

In the past two major kinds of valuable metal type metal detectors have been marketed—beat frequency oscillator metal detectors and induction balance metal detectors. The present invention is directed to induction balance type metal detectors, which are sometimes also referred to as transmit-receive (T/R) type metal detectors.

Induction balance metal detectors include transmit and receive coils, plus other related coils (such as feedback and null coils) mounted in a detector head. Preferably the main coils, i.e., the transmit, receive and feedback coils, are coaxially mounted. In some detectors these coils are coplanar, as well as coaxial. In any event, the transmit coil is driven by an oscillator, and the coils are formed, sized and positioned such that the receive coil produces substantially no output signal in the absence of a metallic object (including mineralized ground) disrupting the magnetic field produced by the transmit coil. Metallic objects of both a ferrous and a nonferrous nature disrupt the magnetic field produced by the transmit coil; however, in different manners. In the case of ferrous objects, the magnetic field is concentrated by the ferrous object. In the case of a nonferrous object, eddy currents are produced in the object that, in turn, produce magnetic fields. The eddy current produced magnetic fields dissipate the magnetic field produced by the transmit coil, in the region of the object. In either case, the magnetic field produced by the transmit coil is disrupted in a manner that generates a voltage in the receive coil. If the ground is mineralized, it generates a voltage in the receive coil having some similarity to that produced by a ferrous target object. (While the receive coil voltage is similar in some respects, it is dissimilar in others. For example, a ferrous target object creates a voltage pulse when the detector head passes over the target whereas the ground produced voltage is relatively uniform when compared to a metal object.)

The transmit coils of early type induction balance or T/R type metal detectors were driven by a relatively high frequency oscillator until it was discovered that instrument sensitivity was improved when an oscillation frequency in the audio frequency range was used. Audio frequencies in the few thousand Hz range were found to be the best. Even though this change improved the sensitivity of metal detectors, early metal detectors, even those having target identification capabilities (such as those described in U.S. Pat. Nos. 3,826,973, issued to Norman C. Pflaum for "Electromagnetic Gradiometer" and 3,872,380, issued to Robert F. Gardiner for "Metal Detector Distinguishing Between Different Metals by Using a Bias Circuit Actuated by the Phase Shifts Caused by the Metals"), did not operate satisfactorily in mineralized ground. More specifically, as noted above, mineralized ground disrupts the magnetic field produced by the transmit coil and generates a voltage in the receive coil in a manner similar to a ferrous metallic object. As a result, it is difficult and, in many instances impossible, to locate target metal objects in mineralized ground.

The ground mineralization problem in the valuable object metal detector field remained until a technique for excluding the effect of ground mineralization was developed by George C. Payne. This technique is described in U.S. Pat. No. 4,030,026, entitled "Sampling Metal Detector." While the technique described in U.S. Pat. No. 4,030,026 eliminated the undesirable effect of mineralized ground, only the existence of a potentially desirable target was identified. Information about the ferrous/nonferrous nature of the target, the depth of the target, etc. was not produced. Later metal detector developments provided some of this information. For example, the metal detector described in U.S. Pat. No. 4,128,803, issued to George C. Payne for "Metal Dector System With Ground Effect Rejection," produces an output signal whose polarity indicates the nature of the metal forming the target, i.e., ferrous or nonferrous. A subsequent development, also by Gerorge C. Payne, provides information about the depth of the target, i.e., the distance between the detector head and the buried target.

As will be readily appreciated from the foregoing summary of advances in the metal detector field during the past decade, metal detectors have advanced from crude instruments only usable in nonmineralized soil to sophisticated instruments usable in mineralized soil. However, prior to the present invention, metal detectors have been unable to identify with precision the nature of targets buried in mineralized soil, except as to whether a target is ferrous or nonferrous. More precisely, some prior art metal detectors using the technique described in U.S. Pat. No. 4,128,803 can be adjusted to discriminate against (e.g., reject signals related to) some nonferrous targets as well as ferrous targets located in mineralized ground. However, within the area of detectable targets, the nature (e.g., nickel, dime, quarter, $5.00 gold coin, $10.00 gold coin, etc.) of the target cannot be identified. As a result, users of prior art metal detectors are required to dig up all identified targets in order to determine whether a specific target is valuable or invaluable. Not only is this procedure time consuming, it is also objectionable in many regions. For example, in national historical sites, such as civil war battlefields.

SUMMARY OF THE INVENTION

In accordance with this invention, metal detector target identifying systems usable in mineralized ground are provided. Metal detector target identifying systems formed in accordance with the invention include a signal processor that determines the phase angle of a target when the detector head of a metal detector passes over the target, including targets buried in mineralized ground.

In one form of the invention the signal processor receives and analyzes a pair of quadrature voltage signals, designated $V_R$ and $V_X$, when the detector head passes over a target. While both of the signals include target information, one of the signals, $V_R$, is relatively clean (i.e., the signal contains substantially no ground mineralization component) and the other signal, $V_X$, is relatively dirty (i.e., the signal contains a ground mineralization component), when the target is buried in mineralized ground. The signal processor determines the voltage ratio between the portion or component of the $V_X$ signal related to the target (i.e., $V_X$, minus its ground mineralization component) and $V_R$. This ratio defines the "phase angle" of the target, i.e., the phase shift produced by the target. Since the phase angle of each type of metal object (e.g., target) is dependent on the size and metal content (e.g., gold, silver, aluminum, iron, alloys, etc.) of the object, the ratio uniquely identifies each target. One manner of carrying out this form of the invention uses an implicit division (sometimes referred to as a steepest descent division) technique to determine the voltage ratio and, thus, the phase angle of the target. An alternate manner of carrying out this form of the invention uses a direct division technique. An alternate form of the invention does not analyze separate quadrature related voltage signals. Rather, an implicit division technique is used to determine the voltage ratio from a single signal that contains the same target information as the quadrature related voltage signals. Regardless of the specific form of the invention, the signal processor is designed to continuously remove the ground information from the signals as they are processed. Further, the signal processor is only enabled to determine a target's phase angle during the period of time the detector head is passing over a target, each such pass improving the accuracy of the result.

In accordance with other aspects of this invention, the phase angle or target identification signal is applied to a suitable display, preferably an LCD bar graph display, calibrated in accordance with the nature of the targets to be identified, i.e., nails, pull tabs, gold coins (based on value), silver coins (also based on value), etc.

In accordance with yet other aspects of this invention, the signal processor also determines the depth of the target and applies this information to a suitable display. Preferably, the display is an LCD bar graph display located adjacent to the LCD bar graph displaying target identity.

In accordance with further aspects of this invention, metal detector target identifying systems formed in accordance with this invention comprise a signal production subsystem that develops the signals to be analyzed by the signal processor. The signal production subsystem includes transmit and receive coils mounted in the detector head (which also houses any other required coils, such as feedback and null coils, and any required trimming capacitors). The signal production subsystem also includes an oscillator connected to the transmit coil and demodulators for demodulating signals produced by the receive coil. The demodulators produce the target identification signals to be analyzed by the signal processor, i.e., the $V_R$ and $V_X$ signals, and the single signal in the form of the invention wherein the signal processor does not analyze separate $V_R$ and $V_X$ signals. Further, the signal production subsystem includes a differential amplifier (or other suitable signal combining circuit) that combines the $V_R$ and $V_X$ signals and removes substantially all ground information therefrom. The resultant target signal is a pulse signal that is analyzed by the signal processor to determine the depth of the target. In addition the signal production subsystem filters this pulse signal to produce one or more ringing signals (e.g., decaying sinusoidal signals). The ringing signals are used to control the enabling and operation of the target identity determining portion of the signal processor.

In accordance with still further aspects, the form of the invention that analyzes the $V_R$ and $V_X$ signals using an implicit division technique to determine the voltage ratio that defines the phase angle of the target includes $V_R$ and $V_X$ filters, which filter the $V_R$ and $V_X$ signals, respectively. The $V_X$ filter removes a substantial portion of the ground component from the $V_X$ signal. While the $V_R$ filter removes ground information from the $V_R$ signal, it is primarily included to maintain phase correlation between the $V_X$ and $V_R$ signals, which are converted from a single pulse to a single sinusoid by the differentiation action of the $V_R$ and $V_X$ filters. The filtered $V_R$ signal is first filtered and then pulse width modulated by a feedback signal in a modulator driven by a triangle wave generator. More specifically, the modulator includes a filter that filters the $V_R$ signal and converts it from a single sinusoid into three sinusoidal pulses. The three sinusoidal pulses are then width modulated. The width of the modulated pulses is determined by the magnitude of the feedback signal and the height of pulses is determined by the magnitude of the three sinusoidal pulses. The results of the modulation are summed with the filtered $V_X$ signal. Prior to actual summation, the summer filters and converts the $V_X$ signal from a single sinusoid into three sinusoidal pulses. Phase correlation between the three pulse width modulated sinusoidal pulses is maintained. The results of the summation are passed through filters that convert the three sinusoidal pulses into a ringing signal. The ringing signal is applied to an automatic gain control (AGC) circuit driven by a triangular signal whose magntiude tracks the magnitude of the target produced ringing signal. The automatic gain control circuit demodulates the ringing signal and produces pulses on one or the other of two output lines. Which output line carries the pulses is determined by the position of the phase angle of the detected target with respect to the phase angle of the last detected target, if any. A larger phase angle causes pulses on one line and a smaller phase angle causes pulses on the other line. The pulse controls the increase or decrease of a charge stored on the capacitor of an integrator. The output of the integrator forms the feedback signal. Further, the output of the integrator forms the target identification signal, which, preferably, is linearized by a logarithmic amplifier before being displayed.

The inclusion of the AGC circuit in the preceding form of the invention counteracts the fact that the loop gain of a feedback type system decreases and the time constant increases as the magnitude of the received signal decreases. The AGC circuit provides an improved result because the triangular modulation signals it receives have a magntiude that is dependent on the magnitude of the target signal. That is, the magnitude of both the signal to be demodulated (the ringing signal) and the modulation signal (the triangular signal) are dependent on the magnitude of the target signal. Thus, as the magnitude of one of the signals decreases the other also decreases and vice versa. The end result is an AGC effect that improves divider overall operation by maintaining equalized gain and uniform time constant nearly independent of the magnitude of the received signal.

In accordance with other aspects, the form of the invention that analyzes a single target signal using an implicit division technique does not include a $V_R$ filter and modulation circuitry to pulse width modulate the filtered $V_R$ signal. Rather, the feedback signal controls the phase relationship between the received signal to be demodulated and the demodulation signal used to create the single target signal to be analyzed. While the $V_R$ filter and modulation circuitry are eliminated, filters for removing mineralized ground information from the single target signal and converting the single target signal from pulse form into a ringing signal are retained along with the AGC circuit and the integrator.

In accordance with still other aspects, the form of the invention that analyzes $V_R$ and $V_X$ signals using a direct division technique include $V_R$ and $V_X$ filters that remove ground information from the $V_R$ and $V_X$ signals (primarily the $V_X$ signal) as these signals are converted from pulse form to ringing form in a phase correlated manner. The filtered, ringing $V_R$ signal is modulated in a triangle amplitude modulator and the result used to pulse width modulate the filtered, ringing $V_X$ signal. The pulse width modulated signals are demodulated in a manner that produces a series of constant magnitude pulses that are filtered in a lowpass filter to produce a DC signal whose polarity and magnitude is directly related to the phase angle of the target.

In accordance with yet still other aspects of this invention, an overdrive control circuit is provided that inhibits the operation of the target identifying portion of the signal processor when the magnitude of the target is high enough to saturate the operational amplifiers included in preferred embodiments of the target identifying of the signal processor.

As will be readily appreciated from the foregoing summary, the invention provides target identifying subsystems that are particularly useful in metal detectors to identify targets in mineralized ground. In addition to identifying targets, the invention has the ability to assist a user in determining whether or not a target is the type of target being sought based on the depth of the target in the ground. More specifically, certain types of undesirable targets, such as pull tabs, produce a target identifying phase angle signal quite similar to the phase angle signal produced by certain types of desirable targets, such as $2.50, $5.00 and $10.00 gold coins. In such instances, it is difficult to precisely determine exactly which type of target has been detected based on the target identity display alone. This difficulty is reduced by the target depth display. Specifically, the depth of the target allows a user to determine the likelihood of whether the target is a valuable or invaluable target because valuable targets are more likely to be located deeper than invaluable targets. For example, pull tabs are normally located near the surface of the ground, while gold coins of the type noted above are generally buried relatively deep, i.e., six, eight or more inches below the surface of the ground.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a block diagram of a metal detector including a target identifying system formed in accordance with the invention;

FIG. 6 is a schematic diagram of a $V_{GB}$ amplifier and a $V_{GB}$ filter suitable for use in the signal production subsystem illustrated in FIG. 2;

FIG. 7 is a schematic diagram of an inverter, an R window circuit, a rectifier and a triangle modulator suitable for use in the target identification subsystem illustrated in FIG. 3A;

FIG. 8 is a schematic diagram of a $V_X$ highpass filter, a $V_R$ highpass filter, a triangle wave generator, an R modulator, a summer, a bandpass filter, a feedback highpass filter, an enable circuit, an overdrive circuit and an or/inverter circuit suitable for use in the target identification subsystem illustrated in FIG. 3A;

FIG. 22 is a waveform illustrating the output of the triangle amplitude modulator of the target identification subsystem illustrated in FIG. 17 when the detector head of the metal detector passes over a target; and, FIG. 23, lines A–K is a series of waveforms illustrating the signals formed at the outputs of the pulse width modulator and the output of the demodulator of the target identification subsystem illustrated in FIG. 17 under different conditions.

DESCRIPTION OF THE PREFERRED EMBODIMENTS

Figure 2:
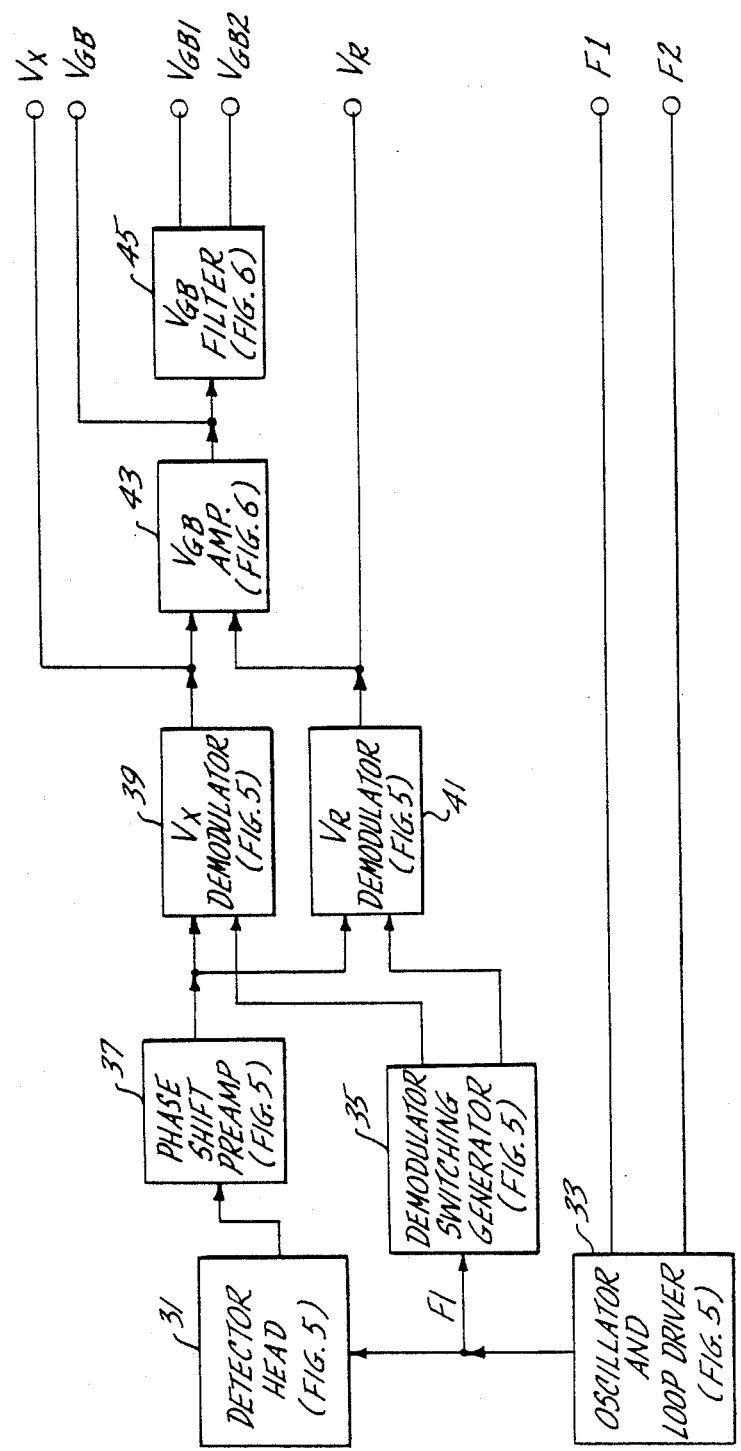
FIG. 2 is a block diagram of a signal production subsystem suitable for use in the metal detector target identifying system illustrated in FIG. 1.

FIG. 1 illustrates in block form a metal detector including a target identifying system formed in accordance with the invention. The illustrated metal detector comprises: a signal production subsystem 21; a signal processor 23; and, a display 25. The signal production subsystem 21, as hereinafter described in more detail, includes a detector head that houses the transmit, receive, feedback and null coils of a T/R or induction balance type metal detector. The transmit coil is driven by an oscillator (which also forms part of the signal production subsystem) and the coils are designed and positioned such that the output of the receive coil is a null in the absence of a metal object positioned so as to disrupt the field produced by the transmit coil in a manner that is detectable by the receive coil. (In this instance the term metal object includes mineralized ground as well as a metal target since mineralized ground will create a detectable disruption in the magnetic field produced by the transmit coil regardless of whether or not a metal target is buried in the mineralized ground.)

The signal production subsystem also includes demodulators that demodulate the output of the receive coil in a manner that produces two quadrature related voltage signals, denoted $V_X$ and $V_R$. When the detector head passes over a metal target, including a metal target buried in mineralized ground, $V_X$ and $V_R$ contain target identity information. In addition, the signal production subsystem differentially combines the $V_X$ and $V_R$ signals and produces an unfiltered (pulse) signal denoted $V_{GB}$, and two filtered (ringing) signals $V_{GB1}$ and $V_{GB2}$ when the detector head passes over a target. As more fully described below $V_{GB}$, $V_{GB1}$ and $V_{GB2}$ contain substantially no ground information, i.e., they have no ground mineralization component.

The $V_X$, $V_R$, $V_{GB}$, $V_{GB1}$ and $V_{GB2}$, along with a clock signal, denoted F2 and derived from the oscillator, are applied to the signal processor 23. The signal processor analyzes the $V_X$ and $V_R$ signals by filtering and ratio combining them in a manner that produces a TARGET IDENTITY signal that denotes the phase angle of the target that created the target component of the $V_R$ and $V_X$ signals. (More correctly, the TARGET IDENTITY signal denotes the tangent of the phase angle of the target.) In this regard, different types of targets produce different magnitudes of phase shift (with respect to the phase of the transmit coil current created by the oscillator signal). While some phase shifts are closely related, each type of target in effect produces a unique phase shift. It is this phase shift that defines the "phase angle" of the target and, thereby, uniquely identifies each target. Because the various signals produced by the signal production subsystem only contain target information when the detector head is passing over the target, the signal processor only determines the tangent of the phase angle of the target during such passes. In this way noise and other signals are prevented from creating erroneous TARGET IDENTITY signals. More importantly, each such pass over the same target is used to update and improve the accuracy of TARGET IDENTITY signals. Also, the signal processor includes override circuitry that becomes operative when the magnitude of target signals reach a level high enough to saturate operational amplifiers included in other circuits. The override circuitry inhibits the erroneous display that may occur as a result of such saturation. Finally, based on $V_{GB}$ the signal processor determines the depth of each detected target and, in accordance therewith, produces a TARGET DEPTH signal.

The TARGET IDENTITY and TARGET DEPTH signals, plus a clock signal, denoted F1 and derived from the oscillator of the signal production system 21 are applied to the display 25. Preferably the display is a liquid crystal display that includes two bar graphs, one of which displays the identity of detected targets (e.g., nail, pull tab, nickel, dime, $5.00 gold coin, etc.) and the other of which displays the depth of detected targets (e.g., one inch, two inches, three inches, etc.). The target depth display enchances the target identification display because certain types of targets have very similar phase angles and, thus, create similar displays. For example, the phase angle of pull tabs is quite similar to the phase angle of $2.50, $5.00 and $10.00 gold coins. The target identity enhancement provided by the depth display is due to the fact that targets such as pull tabs are more likely to be located near the surface of the ground while targets such as gold coins are more likely to be buried deep in the ground.

FIG. 2 is a block diagram of a signal production subsystem suitable for usse in the metal detector illustrated in FIG. 1 and comprises: a detector head 31; an oscillator and loop driver 33; a demodulator switching generator 35; a phase shift preamplifier 37; a $V_X$ demodulator 39; a $V_R$ demodulator 41; a $V_{GB}$ amplifier 43; and, a $V_{GB}$ filter 45. The detector head 31 houses the transmit and receive coils (as well as feedback and null coils, as described below) and the oscillator and loop driver 33 produces the F1 and F2 signals that are applied to the signal processor 23 and the display 25, as briefly discussed above. Preferably, the frequency of F1 is in the KHz range and F2 is in the Hz range. In one actual embodiment of the invention, the frequency of F1 was chosen to be 6592.5 Hz ±3.3 Hz and F2 was chosen to be 421 Hz.

Figure 5:
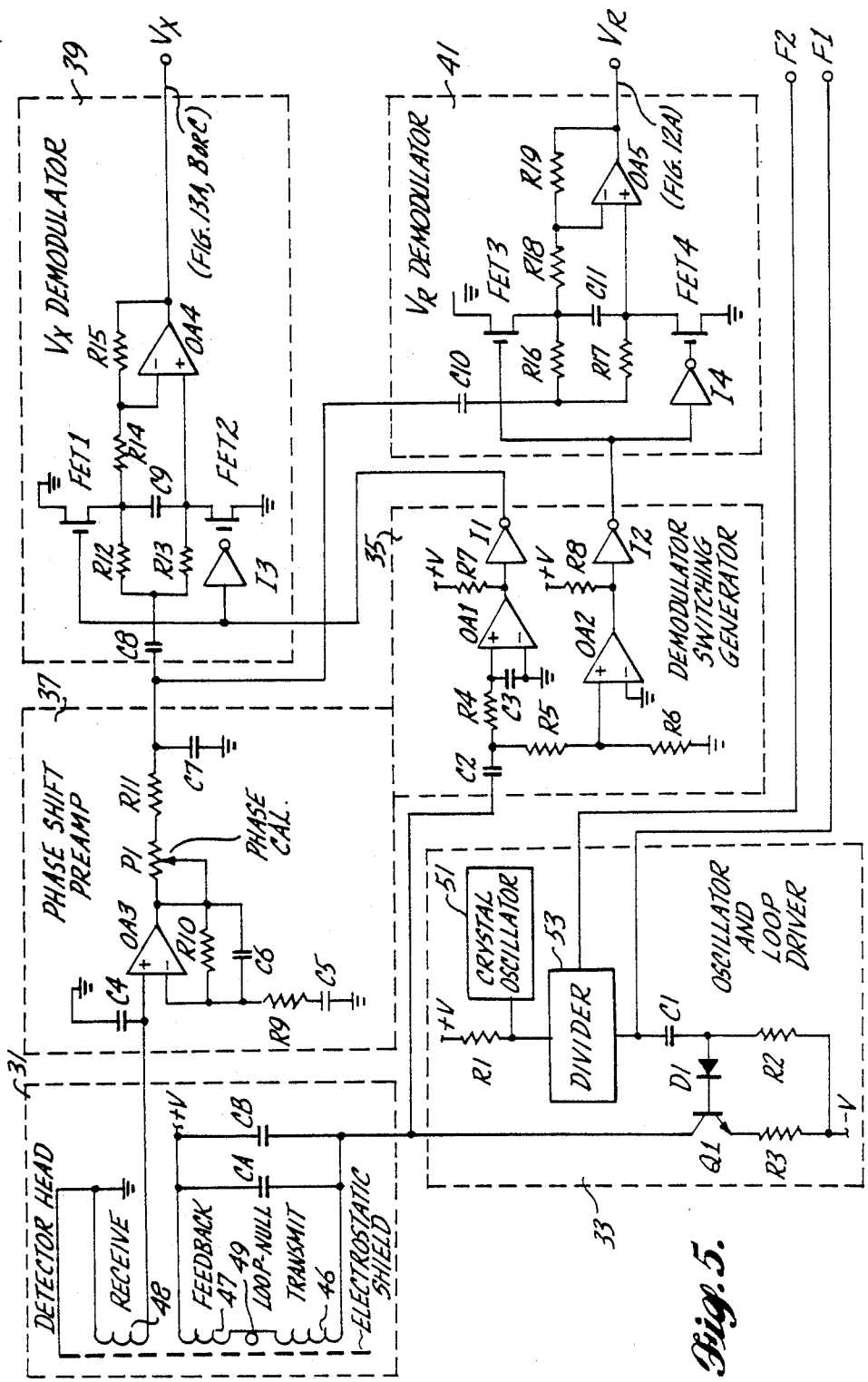
FIG. 5 is a schematic diagram of a detector head, an oscillator and loop driver, a demodulator switching generator, a phase shift preamplifier, a $V_X$ demodulator and a $V_R$ demodulator suitable for use in the signal production subsystem illustrated in FIG. 2.

A signal having the same frequency as F1 and also produced by the oscillator and loop driver is applied to the detector head 31 and the demodulator switching generator 35. As illustrated in FIG. 5 and described below, this signal is applied to the transmit coil and causes it to produce an oscillating magnetic field. The phase shift preamplifier 37 is connected to the receive coil and phase shifts received signals by a predetermined amount. The output of the phase shift preamplifier 37 is applied to the unknown signal inputs of the $V_X$ and $V_R$ demodulators 39 and 41, which also receive demodulation signals from the demodulator switching generator 35 at their demodulation signal inputs. The output of the demodulators is such that ground mineralization information, contained in the phase shifted received signal, is substantially entirely deleted in the $V_R$ demodulator 41. Thus, the output of the $V_R$ demodulator (denoted the $V_R$ signal) is, generally, a "clean" signal, i.e., the $V_R$ signal has substantially no ground mineralization component. Contrariwise, the output of the $V_X$ demodulator (denoted the $V_X$ signal) is a "dirty" signal, i.e., it contains a ground mineralization component when the detector head is moved over mineralized ground. While the $V_R$ signal is a clean signal and the $V_X$ signal is a dirty signal, both signals contain target information when the detector head passes over a target. Further, the target components of the $V_R$ and $V_X$ signals are quadrature related.

In addition to being applied to the signal processor 23, as illustrated in FIG. 1, the $V_R$ and $V_X$ signals are also applied to the $V_{GB}$ amplifier 43. The $V_{GB}$ amplifier is a differential amplifier, i.e., it amplifies the difference between the $V_R$ and $V_X$ signals. As illustrated in FIG. 6 and hereinafter described, the $V_{GB}$ amplifier includes a ground balance potentiometer that allows the amplifier to be adjusted to delete any remaining ground mineralization information contained in the $V_R$ signal. (As noted above ground mineralization information is primarily contained in the $V_X$ signal.) Thus, the output of the $V_{GB}$ amplifier, denoted the $V_{GB}$ signal, contains a very, very small, if any, ground mineralization component. In addition to being applied to the signal processor, as shown in FIG. 1, the $V_{GB}$ signal is applied to the $V_{GB}$ filter 45. As will be better understood from the following description the $V_{GB}$ signal is a pulse signal that occurs when the detector head passes over a target. The $V_{GB}$ filter includes high and bandpass filters with steep low frequency roll-off characteristics. These filters convert the $V_{GB}$ signal from pulse form into a partial ringing signal formed of three alternating polarity sinusoidal pulses and then into a fully ringing signal, i.e., a decaying sinusoidal burst signal. These signals, denoted the $V_{GB1}$ and $V_{GB2}$ signals, respectively, are applied to the signal processor.

FIG. 5 is a schematic diagram illustrating: a detector head 31; an oscillator and loop driver 33; a demodulator and switching generator 35; a phase shift preamplifier 37; a $V_X$ demodulator 39; and, a $V_R$ demodulator 41 suitable for use in the signal production subsystem illustrated in FIG. 2. The detector head 31 houses: the transmit coil 46; and, the receive coil 48. Also housed in the detector head are: a feedback coil 47; a loop null coil 49; and, two trimming capacitors designated CA and CB. The transmit 46, loop null 49 and feedback 47 coils are connected in series in that order. CA and CB are connected in parallel with one another and across the series connected transmit, loop null and feedback coils. The signal produced by the oscillator and loop driver 33 in the manner hereinafter described is connected to the transmit coil end of this circuit. The feedback coil end of the circuit is connected to a positive voltage source designated +V. One end of the receive coil 48 is connected to the input of the phase shifter preamplifier 37. The other end of the receive coil 48 is connected to ground and to an electrostatic shield that is positioned to protect the coils from unwanted interference.

The transmit, feedback, receive and loop null coils, and CA and CB are sized, positioned and adjusted, as appropriate, such that the magnetic coupling between the transmit and receive coils is essentially zero in the absence of a magnetic object disrupting the magnetic field produced by the transmit coil when it is driven by the oscillating output of the oscillator and loop driver 33. This null situation occurs in air and nonmineralized ground that does not contain a metallic target. Mineralized ground, regardless of whether it does or does not contain a metallic target, disrupts the magnetic field produced by the transmit coil in a manner that generates a voltage in the receive coil.

The oscillator and loop driver 33 illustrated in FIG. 5 comprises: a crystal oscillator 51; a divider 53; a capacitor designated C1; three resistors designated R1, R2 and R3; a diode designated D1; and an NPN transistor designated Q1. The output of the oscillator 51 is connected to the input of the divider 53 and through a pull up resistor, R1, to +V. The divider 53 divides down the high frequency output of the crystal oscillator and produces the F1 and F2 signals. As noted above, preferably, the F1 signal is in the few thousand Hz range and the F2 signal is in the several hundred Hz range.

In addition to being applied to the signal processor 23, the F1 signal is also applied to a loop driver circuit formed by C1, R2 and R3, D1 and Q1. More specifically, the F1 signal is applied through C1 in series with R2 to a negative voltage source designated −V. The junction between C1 and R2 is connected to the anode of D1. The cathode of D1 is connected to the base of Q1. The emitter of Q1 is connected through R3 to −V. The collector of Q1 is connected to the junction between the transmit coil 46, and CA and CB (housed in the detector head 31). Thus, the oscillating signal (F1) that drives the transmit coil is produced at the collector of Q1.

The demodulator switching generator 35 illustrated in FIG. 5 comprises: two capacitors designated C2 and C3; five resistors designated R4, R5, R6, R7 and R8; two comparators designated OA1 and OA2; and, two inverters designated I1 and I2. The same signal that is applied by the oscillator and loop driver 33 to the transmit coil 46 is applied through C2 in series with R4 to the noninverting input of OA1. C3 is connected across the inverting and noninverting inputs of OA1; and, the inverting input of OA1 is connected to ground. The output of OA1 is connected to +V through a pull up resistor, R7. In addition, the output of OA1 is connected to the input of I1. The junction between C2 and R4 is connected through R5 in series with R6 to ground. The junction between R5 and R6 is connected to the noninverting input of OA2. The inverting input of OA2 is connected to ground. The output of OA2 is connected through a pull up resistor, R8, to +V. The output of OA2 is also connected to the input of I2.

As will be readily appreciated by those skilled in the analog amplifier art from the foregoing description and viewing the embodiment of the demodulator switching generator 35 illustrated in FIG. 5, the outputs of I1 and I2 are square wave signals having the same frequency as the frequency of the signal applied to the transmit coil 46 housed in the detector head 31. In addition, the square waves are phase related by a predetermined amount dependent upon the value of the chosen components. However, this amount is not ninety degrees (90°). More specifically, while as noted above, the $V_X$ and $V_R$ demodulators demodulate on a quadrature basis, because of internal phase shifts produced in the $V_X$ and $V_R$ demodulators, the phase relationship between the square waves produced at the outputs of I1 and I2 is not exactly ninety degrees (90°). Rather, the square wave phase relationship is offset from 90 degrees by an amount adequate to compensate for the internal phase shifts that occur in the $V_X$ and $V_R$ demodulators, which are more fully described below.

The phase shift preamplifier 37 comprises: four capacitors designated C4, C5, C6 and C7; three resistors designated R9, R10 and R11; a potentiometer designated P1; and, an operational amplifier designated OA3. The ungrounded end of the receive coil 48 of the detector head 31 is connected through C4 to ground and to the noninverting input of OA3. The inverting input of OA3 is connected through R9 in series with C5 to ground. R10 and C6 are connected in parallel and between the output of OA3 and the inverting input of OA3. The output of OA3 is connected through P1 in series with R11 and C7 to ground. The movable element of P1 is connected to the output of OA3. The output of the phase shift preamplifier, which is applied to the $V_X$ and $V_R$ demodulators in the manner hereinafter described, is produced at the junction between R11 and C7. As its name implies, the phase shift preamplifier phase shifts the output of the receive coil. The magnitude of phase shift is controlled by adjusting P1. Once set P1 remains fixed, whereby the phase shift produced by the phase shift preamplifier remains set at a fixed value.

The $V_X$ and $V_R$ demodulators 39 and 41 are substantially identical. The $V_X$ demodulator 39 comprises: two capacitors designated C8 and C9; four resistors designated R12, R13, R14 and R15; an inverter designated I3; two insulated gate field effect transistors switches designated FET1 and FET2; and, an operational amplifier designated OA4. FET1, FET2 and the other hereinafter described insulated gate field effect transistor switches are N-channel type switches. Such switches may take on various forms. The preferred form is CMOS integrated circuit form wherein a plurality of switches are contained in a single integrated circuit. Each switch may comprise a separate P-channel device and an N-channel device connected together to operate as an N-channel composite device.

The output of the phase shift preamplifier, i.e., the signal at the junction of R11 and C7, is connected through C8 to one end of each of R12 and R13. C9 is connected across the other ends of R12 and R13. The junction between R12 and C9 is connected to the source terminal of FET1. The drain terminal of FET1 is connected to ground. The junction between R13 and C9 is connected to the source terminal of FET2 and the drain terminal of FET2 is connected to ground. The output of I1 of the demodulator switching generator 35 is connected to the gate terminal of FET1 and through I3 to the gate terminal of FET2. The junction between R12 and C9 is also connected through R14 to the inverting input of OA4. The junction between R13 and C9 is also connected to the noninverting terminal of OA4. R15 is connected between the output of OA4 and the inverting input of OA4. The output of OA4 is the signal previously designated $V_X$.

As noted above, the $V_R$ demodulator is substantially identical to the $V_X$ demodulator. More specifically, the $V_R$ demodulator comprises: two capacitors designated C10 and C11; four resistors designated R16, R17, R18 and R19; an inverter designated I4; two insulated gate field effect transistor switches designated FET3 and FET4; and, an operational amplifier designated OA5. The output of the phase shift preamplifier is connected through C10 to one end of each of R16 and R17. C11 is connected across the other ends of R16 and R17. Further, the junction between R16 and C11 is connected to the source terminal of FET3 and the drain terminal of FET3 is connected to ground. The junction between C11 and R17 is connected to the source terminal of FET4 and the drain terminal of FET4 is connected to ground. The output of I2 of the demodulating switching generator is connected to the gate terminal of FET3 and through I4 to the gate terminal of FET4. The junction between R16 and C11 is also connected through R18 to the inverting input of OA5. The junction between R17 and C11 is also connected to the noninverting input of OA5. R19 is connected between the output of OA5 and the inverting input of OA5. The output of OA5 is the signal previously designated $V_R$.

The $V_X$ and $V_R$ demodulators are quadrature demodulators that demodulate the output of the phase shift preamplifier. More specifically, as previously described, the demodulation switching generator produces two phase separated square wave signals. While phase separated, both square waves are at the same frequency as the output of the phase shift preamplifier since the frequency of the phase shift amplifier output is based on a signal produced by the transmit coil, which is driven at the same frequency as the demodulator switching generator. As noted above, the phase separation between the two square waves produced by the demodulator switching generator is such that phase shifts produced by the resistive and capacitive input components of the $V_X$ and $V_R$ demodulators results in a ninety degree (90°) or quadrature demodulation of the output of the phase shift preamplifier. As a result, the outputs of the $V_X$ and $V_R$ demodulators are quadrature related.

Figure 12:
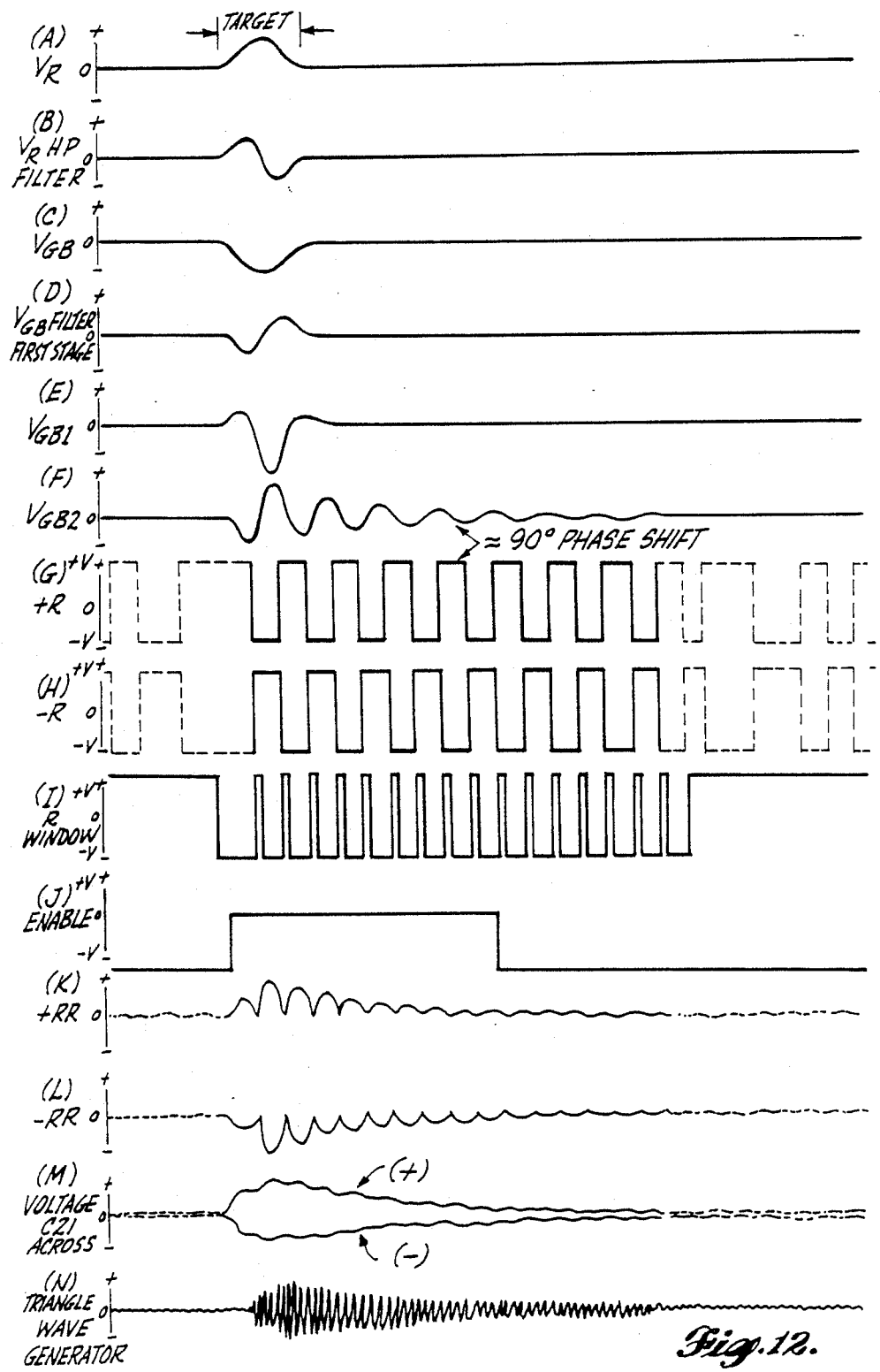
FIG. 12, lines A–N is a series of fourteen waveforms illustrating the signals formed at various points in the signal production subsystem and the signal processor.

In addition to the just described quadrature relationship, one other relationship exists. Specifically, the $V_R$ demodulator is centered at the zero crossing point of the signal at the junction of C10, R16 and R17 produced when the detector head is moved over mineralized ground. More specifically, when the detector head is moved over mineralized ground, the coupling provided by the ground creates a sinusoidal signal at the frequency of the F1 signal, which is the same as the frequency of the square waves produced by the demodulator switching generator. The phase shift produced by the phase shift circuit 37 is set such that the zero crossing points of the phase shifted signal (ignoring any DC offset) occurring at the junction between C10, R16 and R17 are centered at the center of the square waves of the demodulator signal. In other words the phase relationship between the output of the phase shift preamplifier produced by mineralized ground and the demodulation signal that drives the $V_R$ demodulator 41 is ninety degrees (90°). As a result of this arrangement the $V_R$ signal is a relatively "clean" signal, i.e., substantially all of the ground information picked up by the receive coil is removed by the $V_R$ demodulator. This result occurs because the centering of the demodulation signal causes ground information to be cancelled from the demodulated signal as the FET switches are alternately switched on and off to control the charge on C11. The net result is that the output of OA5 is substantially zero when the only disrupting object is mineralized ground. Contrariwise, an object such as coin, pull tab, etc. adds a signal that appears to create a phase shift at the junction of C11, R16 and R17, resulting in the production of a voltage on C11. Thus, a $V_R$ signal occurs on the output of the $V_R$ demodulator when the detector head is moved over mineralized ground that contains a metal target. Such a signal is illustrated in FIG. 12, line A.

Figure 13:
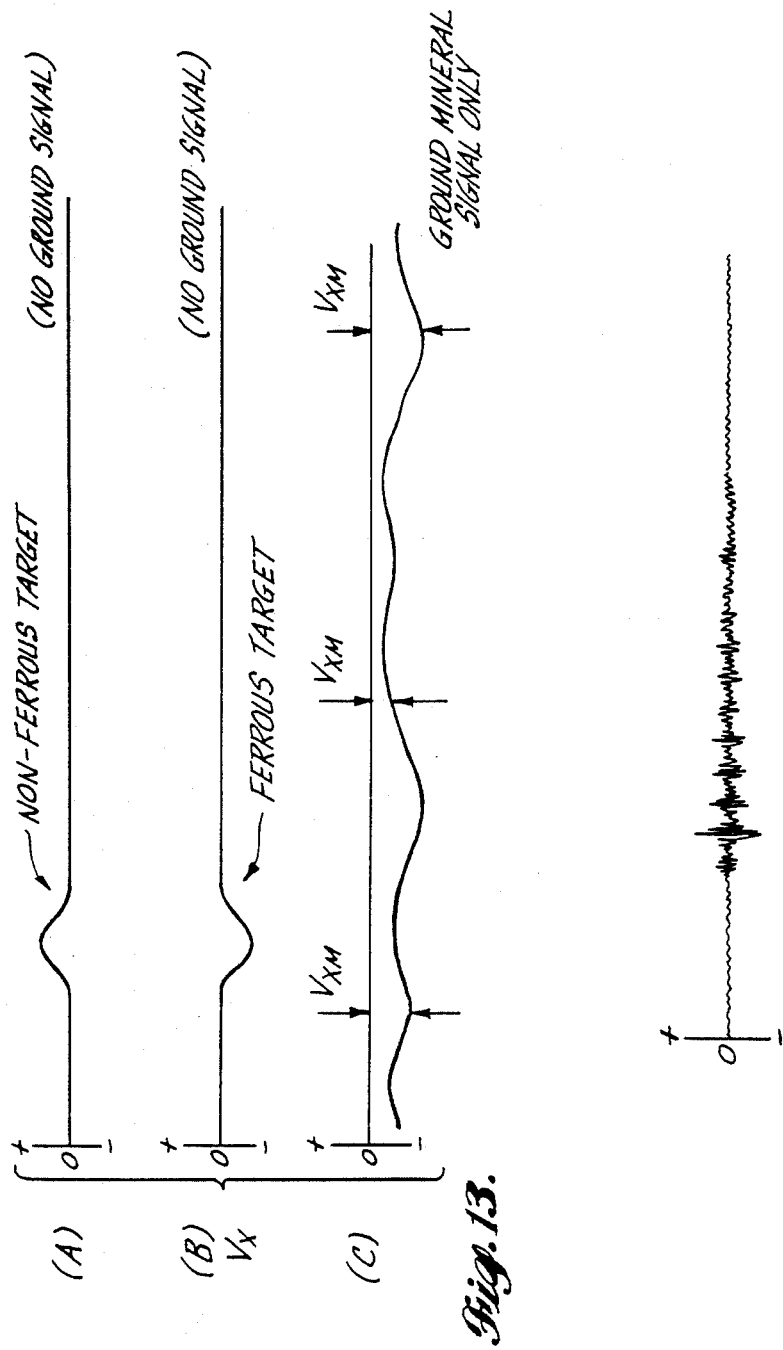
FIG. 13, lines A–C is a series of three waveforms illustrating the type of signals formed on the output of the $V_X$ demodulator by nonferrous targets and ferrous targets buried in nonmineralized ground and mineralized ground that does not contain a target.

In contrast to the operation of the $V_R$ demodulator, the $V_X$ demodulator does produce an output signal when the detector head passes over mineralized ground (see FIG. 13, line C). This result occurs because the $V_X$ demodulator is not centered at the zero crossing points of the signal at the junction of C8, R12 and R13. Rather, as noted above, the $V_X$ demodulator is phased ninety degrees (90°) from this point. As a result, the ground creates a voltage charge on C9, whereby mineralized ground causes the $V_X$ demodulator to produce an output ($V_X$) signal. When the mineralized ground contains a metallic object, the metal object adds a signal that appears to create a phase shift at the junction of C8, R12 and R13, resulting in a variation in the voltage on C9. The polarity of the variation depends upon whether the metallic object is ferrous or nonferrous (see FIG. 13, lines A and B). Consequently, when an object is located in mineralized ground the $V_X$ signal contains a ground component and a target component (the combination of FIG. 13, lines B and C or FIG. 13, lines A and C). In contrast, the $V_R$ signal contains substantially no ground component. Rather it only contains substantially a target component.

As will be readily appreciated by those familiar with prior art metal detectors, the circuits suitable for performing the functions of the circuits illustrated in FIG. 5 have been used before to produce "dirty" $V_X$ and "clean" $V_R$ signals. Thus, the functional operation of the circuitry described thus far is not deemed to be novel per se. The circuitry has been included because it is required to produce a metal detector system in accordance with the invention that has target identification capabilities; and, because it is believed that an understanding of how the $V_R$ and $V_X$ signals are developed will assist in an understanding of the novel aspects of the invention. Attention is directed to U.S. Pat. No. 4,128,803 referenced above for a description of a subsystem that functions in the same general manner as the subsystem illustrated in FIG. 5 to produce similar types of $V_R$ and $V_X$ signals.

FIG. 6 is a schematic diagram of: a $V_{GB}$ amplifier 43; and, a $V_{GB}$ filter 45 suitable for use in the signal production subsystem illustrated in FIG. 2. The $V_{GB}$ amplifier 43 comprises: five resistors designated R20, R21, R22, R23 and R24; a potentiometer designated P2; a capacitor designated C12; and, an operational amplifier designated OA6. The output of the $V_X$ demodulator is connected through R20 in series with R21 to the output of the $V_R$ demodulator. The output of the $V_X$ demodulator is als connected through R22 in series with P2 to ground. R23 is connected in parallel with P2. The adjustable terminal of P2 is connected to the noninverting input of OA6. The junction between R20 and R21 is connected to the inverting input of OA6. C12 and R24 are connected in parallel between the output of OA6 and the inverting input of OA6.

As will be readily appreciated by those skilled in the operational amplifier art, the $V_{GB}$ amplifier is, in effect, a differential amplifier that amplies an adjustable difference between the $V_X$ and $V_R$ signals. Because of the adjustable nature of the amplifier, the effect of mineralized ground can be deleted. More specifically, PT2 is a ground balance potentiometer that allows the effect of mineralized ground to be entirely deleted from the differential signal. In this regard, as noted above, the $V_X$ signal contains some ground information and the $V_R$ signal contains very little ground information, if any. A combination of these two signals, created at the junction of R20 and R21, is applied to the inverting input of OA6. An adjustable magnitude $V_X$ signal is applied to the noninverting input of OA6; and OA6 differentially combines its inverting and noninverting input. When PT2 is set appropriately, the output of OA6 has a substantially zero ground mineralization component. As a result, when the detector head is passed over mineralized ground containing no metal target, the output of the $V_{GB}$ amplifier, denoted the $V_{GB}$ signal, is zero. When the detector head passes over a target, a $V_{GB}$ signal pulse is created (see FIG. 12, line C). The magnitude and duration of the pulse is dependent on how close the target is to the detector head (magnitude) and how long the detector head is over the target (duration).

As will be readily understood by those skilled in the metal detector art, the $V_{GB}$ signal can be produced in other manners. For example, the $V_{GB}$ signal can be produced entirely separately from the production of the $V_X$ and $V_R$ signals using a separate demodulator. The $V_{GB}$ signal is directly produced by the separate demodulator by controlling the phase relationship between the unknown signal received from a preamplifier (which may take the form of the phase shift preamplifier 37) and the demodulation signal. When the phase relationship is correctly set only target information in the unknown signal creates a demodulator output ($V_{GB}$) signal. Ground mineralization information is rejected. While this third demodulator approach can be used it has the cost disadvantage of requiring a further demodulator and phase shifting circuitry.

The $V_{GB}$ filter 45 comprises: five capacitors designated C13, C14, C15, C16 and C17; five resistors designated R25, R26, R27, R28 and R29; and, three operational amplifiers designated OA7, OA8, OA9. The output of the $V_{GB}$ amplifier 43; i.e., the $V_{GB}$ signal, is applied through C13 to the noninverting input of OA7. The noninverting input of OA7 is also connected through R25 to ground. The output of OA7 is connected to the inverting input of OA7. The output of OA7 is also connected through C14 in series with R26 to the inverting input of OA8. The noninverting input of OA8 is connected to ground. C15 and R27 are connected in parallel between the output of OA8 and the inverting input of OA8. The output of OA8 is connected through R28 in series with C16 to the inverting input of OA9. The noninverting input of OA9 is connected to ground. The output of OA9 is connected: through C17 to the junction between R28 and C16; and, through R29 to the inverting input of OA9.

As will readily be appreciated by those familiar with operational amplifier type filter circuits, the $V_{GB}$ filter 45, in essence, comprises three filters—two highpass filters and one bandpass filter. The first highpass filter is formed by C13, R25 and OA7. The second highpass filter is formed by C14, C15, R26, R27 and OA8; and, the bandpass filter is formed by the remaining components, i.e., R28, R29, C16, C17 and OA9. All of the filters have steep low frequency roll-off characteristics. The target created $V_{GB}$ signals are converted from pulse signal form into ringing signal form by the $V_{GB}$ filter. (A ringing signal is a sinusoidal burst signal that decays to zero.) The conversion is such that both the $V_{GB1}$ signal, which occurs at the output of the second highpass filter, i.e., at the output of OA8, and the $V_{GB2}$ signal, which occurs at the output of the bandpass filter, i.e., at the output of OA9, are ringing signals. However, $V_{GB1}$ is only a partial ringing signal, namely a three sinusoidal pulse signal (see FIG. 12, line E) while $V_{GB2}$ is a full ringing signal (see FIG. 12, line F). As noted above and illustrated in FIG. 1, $V_{GB1}$ and $V_{GB2}$, as well as $V_{GB}$, are applied to the signal processor 23.

Figure 3:
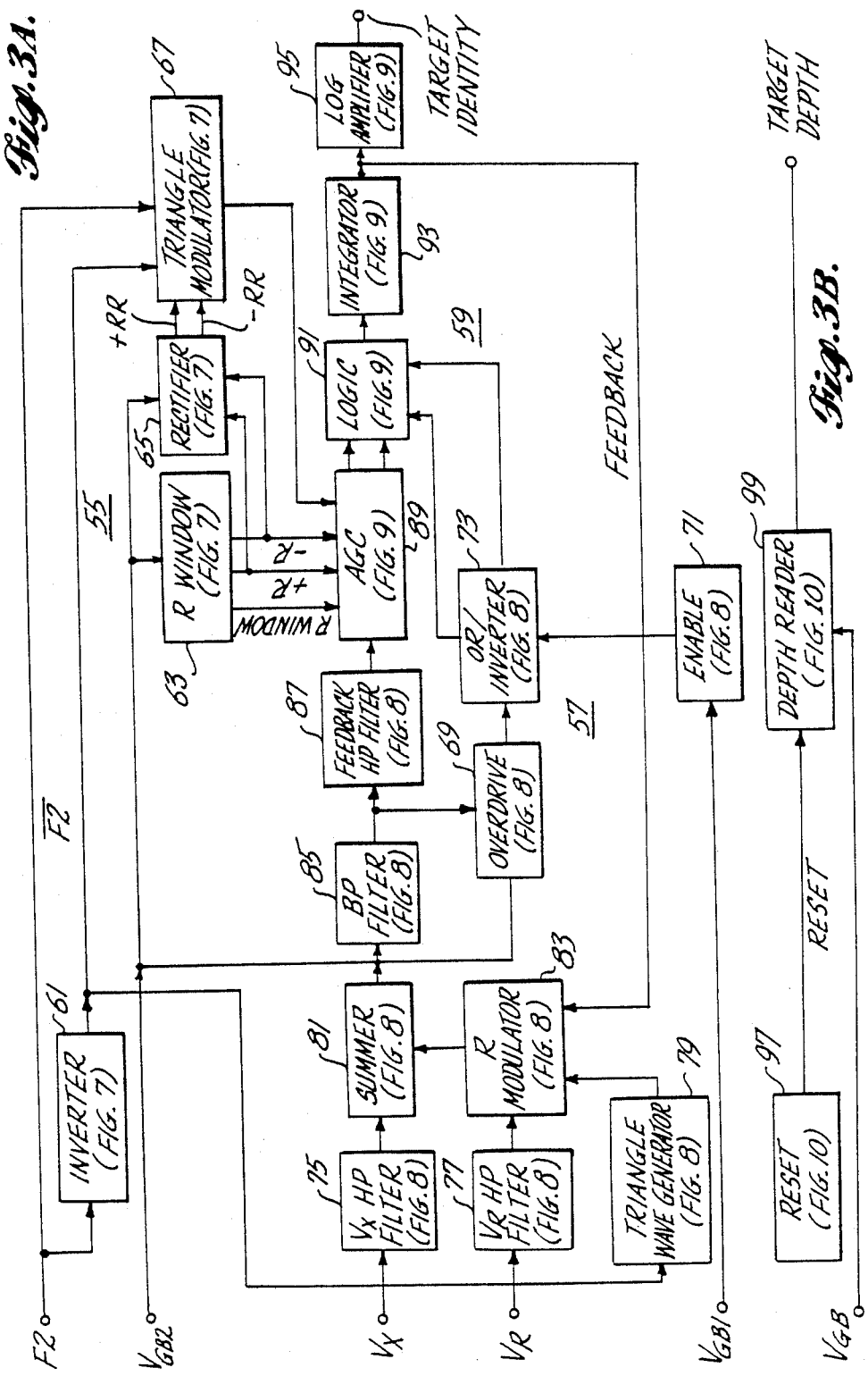
FIGS. 3A and 3B are block diagrams of the target identification and target depth subsystems, respectively, of a signal processor suitable for use in the metal detector target identifying system illustrated in FIG. 1.

The signal processor 23 generally comprises a target identification subsystem (FIG. 3A) and a target depth subsystem (FIG. 3B). The target identification subsystem includes three major sections—a control section 55; an overdrive/enable section 57; and, a divider section 59. The control section 55 comprises: an inverter 61; an R window circuit 63; a rectifier 65; and, a triangle modulator 67. The F2 signal produced by the oscillator and loop driver 33 is applied to an input of the triangle modulator and to the input of the inverter 61. The output of the inverter ($\overline{F2}$) is applied to a second input of the triangle modulator 67. The $V_{GB2}$ signal produced by the $V_{GB2}$ filter 45 is applied to inputs of the R window circuit 63 and the rectifier 65. The R window circuit produces an R WINDOW signal that, in essence, shifts from a first state to a second state and remains in the second state (except for short excursions which are hereinafter described) during the period of time a target creates a $V_{GB2}$ ringing signal. In addition to the R WINDOW signal, the R window circuit produces two output signals denoted +R and −R. The +R and −R signals are square wave signals that are 180 degrees out of phase and have a frequency equal to the frequency of $V_{GB2}$. The +R and −R signals are applied to the rectifier 65 (and along with the R WINDOW signal to the divider 59 in the manner hereinafter described). The rectifier uses the +R and −R signals to rectify the $V_{GB2}$ signal and create a pair of opposite polarity rectified, decaying sine waves having an envelope that tracks the envelope of $V_{GB2}$. The rectified decaying sine waves are denoted as +RR and −RR signals and are applied to the triangle modulator 67. The triangle modulator creates a triangular wave signal whose frequency is the same as F2 and whose amplitude tracks the envelope of the +RR and −RR signals. The output of the triangle modulator is also applied to the divider 59 in the manner hereinafter described.

The overdrive/enable section 57 comprises: an overdrive circuit 69; an enable circuit 71; and an or/inverter circuit 73. The overdrive circuit 69 receives the $V_{GB2}$ signal and a signal from the divider 59 produced in the manner hereinafter described. The output of the overdrive circuit is applied to an input of the or/inverter circuit 73. As long as both of the inputs to the overdrive circuit remain below a predetermined level, determined by the saturation level of the operational amplifiers used in an actual embodiment of the invention, the output of the overdrive circuit remains in a high state. If the level of either of the input signals applied to the overdrive circuit 69 achieves or exceeds the predetermined level the output of the overdrive control circuits shifts to a low state. As more fully described below this state shift disables the operation of the divider 59.

$V_{GB1}$ is applied to the single input of the enable circuit 71. The output of the enable circuit 71, which is also a two state signal, is applied to a second input of the or/inverter circuit 73. Normally the output of the enable circuit 71 is in a low state. When the detector head passes over a target and a $V_{GB1}$ ringing signal is created, the output of the enable circuit shifts to a high state and remains in that state as long as $V_{GB1}$ exceeds a predetermined level. In other words, the enable output remains in its high state for a period shorter than the period of the $V_{GB2}$ signal.

In accordance with the state of its input signals, the or/inverter circuit 73 produces a pair of complementary control signals that are applied to the divider 59 in the manner hereinafter described. In essence the or/inverter circuit OR's its inputs together and controls its complementary outputs such that the outputs are in a first state if the outputs of both the overdrive and enable circuits 69 and 71 are high. When either or both outputs are low, the complementary outputs of the or/inverter circuit shift to their opposite states.

As will be better understood from the following discussion, the divider 59 uses an implicit division (sometimes referred to as steepest descent division) technique to determine the voltage ratio between the $V_R$ signal and the target component of the $V_X$ signal. The circuits used to form the divider continuously remove ground information from the signal(s) as they are processed while maintaining phase correlation between the signals being processed. Phase correlation is also maintained between the signals being processed and the signals developed by the control section 55.

The divider 59 comprises: a $V_X$ highpass filter 75; a $V_R$ highpass filter 77; a triangle wave generator 79; a summer 81; an R modulator 83; a bandpass filter 85; a feedback highpass filter 87; an automatic gain control (AGC) circuit 89; a logic circuit 91; an integrator 93; and, a logarithmic amplifier 95. The $V_X$ signal produced by the $V_X$ demodulator 39 is applied through the $V_X$ highpass filter 75 to one input of the summer 81. The $V_R$ signal produced by the $V_R$ demodulator 41 is applied through the $V_R$ highpass filter 77 to an input of the R modulator 83. The output of the inverter 61, i.e., the $\overline{F2}$ signal is applied to the input of the triangle wave generator 79 and the output of the triangle wave generator 79 is applied to a second input of the R modulator 83. The output of the R modulator is applied to the second input of the summer 81.

The output of the summer 81 is applied through the bandpass filter 85 to the input of the feedback highpass filter 87. The output of the bandpass filter is also applied to the second input of the overdrive circuit 69 and, thus, forms the second overdrive control signal. The output of the feedback highpass filter 87 is applied to one input of the AGC circuit 89.

The AGC circuit 89 also receives, at control inputs, the R WINDOW signal, the +R signal, the −R signal and the output of the triangle modulator 67. The AGC circuit 89 produces two output signals, which are applied to two signal inputs of the logic circuit 91. The logic circuit 91 has two control inputs to which are applied the complementary signals produced by the or/inverter circuit 73. The output of the logic circuit 91 is applied to the input of the integrator 93; and, the output of the integrator 93 is applied to the input of the logarithmic amplifier 95. The output of the integrator 93 also forms a feedback signal that is applied to a third input of the R modulator 83. The output of the logarithmic amplifier is the TARGET IDENTITY signal that is applied to the LCD display 25, as previously described.

The $V_X$ and $V_R$ highpass filters have steep low frequency roll-off characteristics. These filters remove some of the ground information from the $V_X$ and $V_R$ signals (as noted above, the $V_R$ signal has very little ground information) and convert the target pulses that form part of these signals from pulse form into the form of a single sinusoid. Since the $V_R$ signal contains very little ground information the $V_R$ highpass filter removes very little such information. Rather than being included for its filtering capabilities, the $V_R$ highpass filter is included for its pulse to single sinusoid conversion capabilities.

In addition to having a steep low frequency roll-off characteristic, the $V_X$ and $V_R$ highpass filters 75 and 77 are designed to have the same time constant. As a result, the outputs of the $V_X$ and $V_R$ highpass filters have the same phase relationship as their inputs. In general this phase relationship is in phase or 180 degrees out of phase depending upon whether the target is ferrous or nonferrous.

The single sinusoid developed on the outputs of the $V_X$ and $V_R$ highpass filters as the result of the detector head passing over a target are converted into partially ringing signals (three pulses of alternating polarity—either two positive and one negative or vice versa—with the last pulse being of lower magnitude than the first pulse) by filters located at the $V_X$ highpass filter input of the summer 81 and the $V_R$ highpass filter input of the R modulator 83. As will be better understood from the following description of a preferred embodiment of the R modulator (illustrated in FIG. 8), the R modulator is a pulse height, pulse width modulator. That is, the width of the pulses produced at the output of the R modulator is dependent on the magnitude of the feedback signal and the height of the pulses is dependent on the magnitude of the output of the $V_R$ highpass filter 77.

The output of the summer 81 is also in the form of three pulses of alternating polarity. As will be better understood from the following discussion, the polarity of the first pulse when the detector head first passes over a target (which determines the polarity of the second and third pulses) is dependent upon the phase angle of the target with respect to a previously detected target, if any. (If no target was detected, the divider starts from a quiescent state in which the output of the integrator, i.e., the feedback signal, is zero.) After several passes over the target, the output of the summer 81 is at or near a null state, i.e., its two inputs are of equal magnitude, but opposite polarity.

The partial ringing signals produced by the summer 81 are converted into full ringing signals (i.e., a sinusoidal burst that decays to zero) by the bandpass filter 85 and the feedback highpass filter 87.

Figure 9:
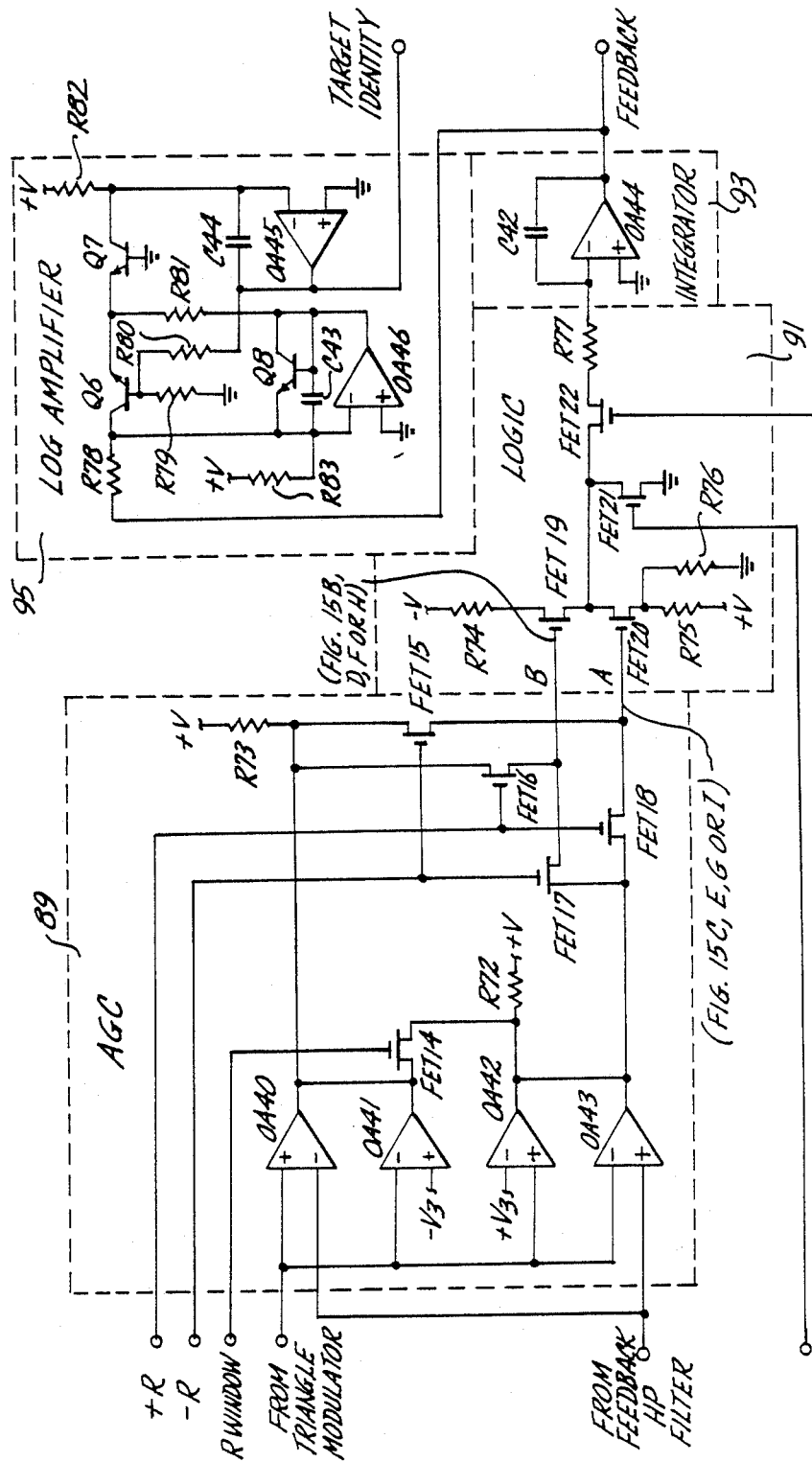
FIG. 9 is a schematic diagram of an AGC circuit, a logic circuit, an integrator and a log amplifier suitable for use in the target identification subsystem illustrated in FIG. 3A.

The R WINDOW signal produced by the R window circuit 63 is an enable signal that enables the AGC circuit only when the detector head is passing over a target. During the period of time between passes the AGC circuit is disabled. When enabled, the AGC circuit demodulates the ringing signals applied to the AGC circuit by the feedback highpass filter 87. In essence, the $+R$ and $-R$ signals applied to the AGC circuit direct pulses, created by triangularly modulating the ringing signals, to one or the other of the outputs of the AGC circuit. A preferred embodiment of an AGC circuit is illustrated in FIG. 9 and described below.

When enabled by the or/inverter circuit, the logic circuit causes positive or negative pulses to be applied to the integrator 93. The polarity of the pulses is based on which of the outputs of the AGC circuit is pulsed. The charge on the integrator 93 is increased or decreased in accordance with the polarity and magnitude of the pulses produced by the logic circuit. As will be better understood from the following discussion, in general, the polarity of the pulses is dependent upon whether the target passed over by the detector head has a phase angle greater or less than the phase angle of the last target that was detected and the width of the pulses (and thus their charge or discharge content) is related to the angular separation therebetween. As a result changes (i.e., increases and decreases) in the magnitude of the feedback signal are related to whether the "new" target has a phase angle greater or less than the phase angle of the "last" target (if any). Further the polarity and absolute magnitude of the feedback signal is directly related to the voltage ratio between the target components of the $V_X$ and $V_R$ signals. Thus, polarity and absolute magnitude of the feedback signal defines the tangent of the phase angle of the target. The logarithmic amplifier is included to provide a more easily read display.

As will be readily appreciated from the foregoing description, the divider 59 produces a "phase angle" signal whose readability is improved by the logarithmic amplifier 95. The divider is based on an implicit division or steepest descent division technique wherein the result (e.g., the feedback signal) is first assumed to be known and then modified to create a summation null. The AGC circuit, which is normally not included in dividers that function in accordance with either of these techniques, compensates for the fact that loop gain tends to decrease and loop time constant tends to increase in such dividers as the magnitude of the signals being divided decreases. As will be better understood from the following description of the AGC circuit, the AGC circuit compensates for these effects because the magnitude of the triangular wave produced by the triangle modulator 67 is dependent upon the magnitude of the target signal.

Figure 10:
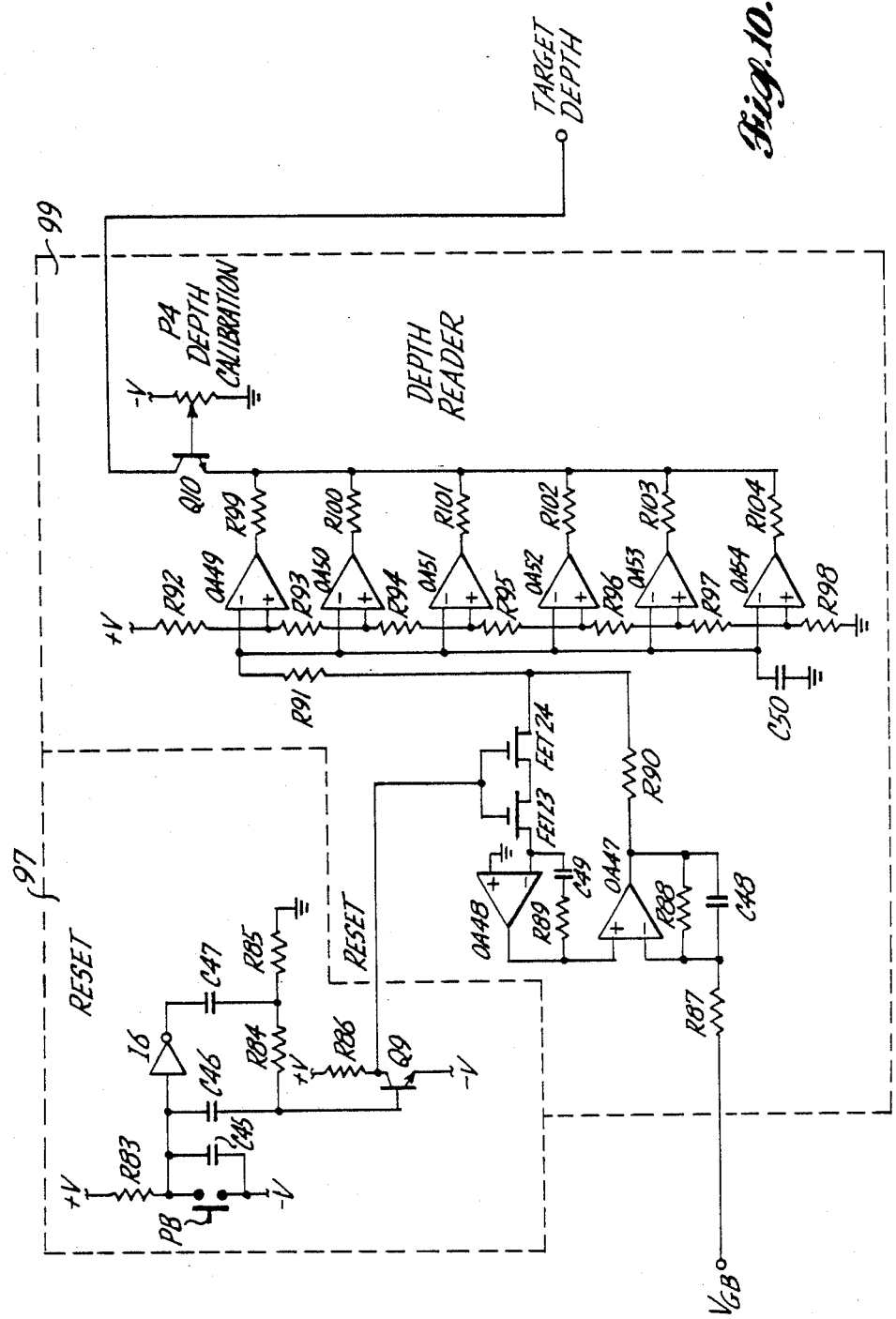
FIG. 10 is a schematic diagram of a reset circuit and a depth reader circuit suitable for use in the target depth subsystem illustrated in FIG. 3B.

The target depth subsystem illustrated in FIG. 3B comprises: a reset circuit 97; and, a depth reader circuit 99. The reset circuit 97 produces a reset pulse when a pushbutton, which forms part of the reset circuit 97, is depressed or released, i.e., a reset pulse is produced when either action occurs. The reset pulses produced by the reset circuit are applied to one input of the depth reader circuit 99 and zero the depth reader circuit just prior to the detector head passing over a target. The depth reader circuit 99 also receives the $V_{GB}$ pulses produced by the $V_{GB}$ amplifier when the detector head passes over a target. Based on the magnitude of the $V_{GB}$ pulse signals, the GB depth reader circuit produces a TARGET DEPTH signal, which is applied to the LCD display 25. Preferred embodiments of the reset circuit 97 and the depth reader circuits are illustrated in FIG. 10 and described below.

A schematic diagram of preferred embodiments of circuits suitable for use in forming the control section 55 of the signal processor 23 are illustrated in FIG. 7 and next described. These circuits, as noted above, comprise: the inverter 61; the R window circuit 63; the rectifier 64; and, the triangle modulator 67. The inverter 61 comprises a single inverter designated I5. The F2 signal produced by the oscillator and loop driver circuit 33 of the signal production subsystem 21 is applied to the input of I5. The output of I5 is thus the complement of the F2 signal, previously defined as the $\overline{F2}$ signal.

The R window circuit 63 comprises: a capacitor designated C18; seven resistors designated R30 through R36; two NPN transistors designated Q2 and Q3; one operational amplifier designated OA10; and, four comparators designated OA11 through OA14. The $V_{GB2}$ signal is applied through C18 in series with R30 to the inverting input of OA10. The noninverting input of OA10 is connected to ground. R31 is connected between the output of OA10 and the inverting input of OA10. The inverting input of OA10 is also connected to the collector and base of Q2 and to the emitter of Q3. The collector and base of Q3 and the emitter of Q2 are connected to the output of OA10. The output of OA10 is also connected to the inverting input of OA11 and to the noninverting input of OA12. The noninverting input of OA11 is connected to a positive reference voltage designated +V1 and the inverting input of OA12 is connected to a negative reference voltage designated −V1. The outputs of OA11 and OA12 are connected together and through a pull up resistor, R35, to +V. The R WINDOW signal is formed at the outputs of OA11 and OA12.

The output of OA10 is also connected through R32 to the noninverting input of OA13. The inverting input of OA13 is connected to ground. R33 is connected between the output of OA13 and the noninverting input of OA13. The output of OA13 is also connected through a pull up resistor, R23, to +V. Further, the output of OA13 is connected to the inverting input of OA14. The noninverting input of OA14 is connected to ground. The output of OA14 is connected through a pull up resistor, R36, to +V. The +R signal is formed on the output of OA13 and the −R signal is formed on the output of OA14.

As will be readily appreciated from the foregoing description, OA10 and the circuit components related thereto, i.e., C18, R30, R31, Q2 and Q3 form a clamped amplifier that produces a highpass filtered, clamped version of the $V_{GB2}$ signal. Filterins is provided by C18 and R30; and clamping is provided by Q2 and Q3. OA11 and OA12 form a pair of comparators that are triggered at relatively low levels. In this regard, in one actual embodiment of the invention, +V1 and −V1 were chosen to be + and −0.2 volts, respectively. This magnitude was well below the clamping level created by Q2 and Q3. Thus, the outputs of the appropriate one of OA11 and OA12 switched well before the output of OA10 was clamped by the appropriate one of Q2 and Q3. In essence, OA11 and OA12 rectify the output of OA10, when the absolute magnitude of the output of OA10 is above the absolute magnitude of ±V1. Rectification occurs because OA11 inverts input signals above the switching level set by +V and OA12 does not invert signals above the switching level set by −V1. While rectification occurs, short periods of time elapse during which neither the OA11 or the OA12 outputs switch states. These periods occur when the output of OA10 passes through zero. Thus, the R WINDOW signal includes a plurality of short excursions, one related to each zero crossing of the output of OA10. More specifically, the output of OA11 and OA12, i.e., the R WINDOW signal, is normally high. When the first excursion of a $V_{GB2}$ ringing signal occurs, the R WINDOW signal goes low and remains there for the majority of the excursion. When the excursion ends and the zero crossing point is approached, the triggered one of OA11 and OA12 returns to its nontriggered output state, whereby the R WINDOW signal returns to its high state. The R WINDOW signal remains in its high state until the next excursion (which occurs in the opposite polarity direction) triggers the other one of OA11 and OA12. When this point is reached the R WINDOW signal returns to its low state and remains there until the next zero crossing occurs. The end result is an R WINDOW signal of the type described above, which is illustrated in FIG. 12, line I. The R WINDOW signal exists only for the period of time that $V_{GB2}$, or more precisely, the output of OA10, rises above +V1 or drops below −V1. Preferably the magnitude of ±V1 is chosen to be slightly above the magnitude of system noise signals. As a result, system noise is insufficient to trigger OA11 or OA12.

OA13 and OA14 form a second pair of comparators. The first comparator, OA13, receives the clamped output of OA10 via R32. A slight amount of positive feedback provided by R33 creates circuit hysteresis that squares up the output of OA10. OA14 inverts the output of OA13 whereby the −R signal (FIG. 12, line H), which occurs on the output of OA14, is the complement of the +R signal (FIG. 12, line G), which occurs on the output of OA13. That is, the +R and −R signals are 180 degrees out of phase. While the OA11 and OA12 comparators require a particular signal level in order to trigger or toggle, i.e., switch output states, the OA13 and OA14 comparators, because they are referenced to ground, have no such requirement. Consequently, the +R and −R signals continuously switch states even in the absence of a $V_{GB2}$ ringing signal. Such noise switching is of no consequence since the AGC circuit is disabled in the absence of an R WINDOW signal, which only occurs when a $V_{GB2}$ ringing signal of adequate magnitude occurs, as previously described.

The rectifier 65 comprises: two capacitors designated C19 and C20; two resistors designated R37 and R38; an operational amplifier designated OA15; and, four insulated gas field effect transistor switches designated FET5, FET6, FET7 and FET8. The $V_{GB2}$ signal is applied through C19 to the source terminals of FET5 and FET7. The drain terminal of FET5 is connected to the drain terminal of FET6 and through R37 in series with R38 to the drain terminals of FET7 and FET8. The source terminals of FET6 and FET8 are connected to the output of OA15. The junction between R37 and R38 is connected to the inverting input of OA15. The noninverting input of OA15 is connected to ground. C20 is connected between the output of OA15 and the inverting input of OA15. The +R signal produced by the R window circuit is applied to the gate terminals of FET5 and FET8. The −R signal produced by the R window circuit is applied to the gate terminals of FET6 and FET7. The −RR output of the rectifier 65 occurs at the junction between the drain terminals of FET5 and FET6 and R37. The +RR output of the rectifier 65 occurs at the junction between the drain terminals of FET7 and FET8 and R38.

As will be readily appreciated from the foregoing description and viewing FIG. 7, the rectifier circuit 65 includes a filter formed by C19 in combination with R37 and R38. The time constant of this filter is the same as the time constant of the filter of the R window circuit (i.e., the filter formed by C18 and R30). Thus, the +R and −R signals switch their respective FET switches in phase with the $V_{GB2}$ signal. As a result, −RR and +RR are rectified decaying sine waves (because $V_{GB2}$ is a decaying sine wave) of opposite polarity. More specifically, a tracing of the rectifier circuit reveals that the FET switches are switched in a manner that causes the filtered $V_{GB2}$ signal to be rectified in a full wave manner in both the positive and negative directions. Positive pulses form the +RR signal (FIG. 12, line K) and negative pulses form the −RR signal (FIG. 12, line L).

The triangle modulator 67 comprises: four capacitors designated C21, C22, C23 and C24; five resistors designated R39, R40, R41, R42 and R43; an operational amplifier designated OA16; and, two insulated gate field effect transistor switches designated FET9 and FET10. The −RR signal produced by the rectifier 65 is applied through R39 to one side of C21 and the +RR signal is applied through R40 to the other side of C21. The junction between R39 and C21 is connected to the source terminal of FET9 and the junction between C21 and R40 is connected to the source terminal of FET10. The drain terminals of FET9 and FET10 are connected together and through C22 in series with R41 to the inverting input of OA16. The F2 signal is applied to the gate of FET10 and the output of I5, i.e., the $\overline{F2}$ signal, is applied to the gate of FET9. The noninverting input of OA16 is connected to a negative voltage source designated −V2. C23 and R42 are connected in parallel, between the output of OA16 and the inverting input of OA16. The output of OA16 is connected through C24 in series with R43 to ground. The output of the triangle modulator applied to the automatic gain control (AGC) circuit occurs at the junction between C24 and R43.

R39 in combination with C21 form a filter for the −RR signal and C21 in combination with R40 form a filter for the +RR signal. The filters remove the harmonics from the rectified signals, whereby the voltage across C21 is a relatively smooth envelope of the $V_{GB2}$ signal (see FIG. 12, line M). FET9 and FET10 alternately apply the positive and negative sides of the envelope signal at the frequency of the F2/$\overline{F2}$ signals to an integrator formed by OA16 and its related components, namely R42 and C23. In other words the signal applied to the integrator is a modulated burst signal. Preferably the modulation frequency, i.e., the frequency of the F2/$\overline{F2}$ signals is several hundred times the frequency of the $V_{GB2}$ ringing signal. Further, the integrator formed by OA16, R42 and C23 has a relatively long time constant compared to the period of F2, i.e., the resistance of R42 is high when compared to the reactance of C23. As a result, the integrator converts the pulses of the modulated envelope signal into triangular waves. C24 removes any DC offset component produced by OA16. The end result is a triangular wave signal having an envelope that tracks the envelope of the $V_{GB2}$ ringing signal, not the individual pulses of the $V_{GB2}$ ringing signal (see FIG. 12, line N). This signal is applied to the AGC circuit, as noted above.

FIG. 8 is a schematic diagram of a preferred embodiment of the overdrive, enable and or/inverter circuits that form the overdrive/enable section 57 of the target identification subsystem, plus some of the circuits that form the divider 59, namely preferred embodiments of the $V_X$ highpass filter, the $V_R$ highpass filter, the triangle wave generator, the summer, the R modulator, the bandpass filter and the feedback highpass filter.

The overdrive circuit 69 illustrated in FIG. 8 comprises: four resistors designated R44, R45, R46 and R47; a capacitor designated C25; and, three comparators designated OA17, OA18 and OA19. The output of the bandpass filter 85 of the divider is connected through R44 to −V and to the noninverting input of OA17. The $V_{GB2}$ signal is applied to the noninverting input of OA18. R45 and R46 are connected in series between −V and ground; and, the junction between R45 and R46 is connected to the inverting inputs of OA17 and OA18. The outputs of OA17 and OA18 are connected together and through C25 to the power input of these two comparators (which are part of a common integrated circuit powered by −V). Further, the output of OA17 and OA18 are connected through R47 to ground and to the noninverting input of OA19. The inverting input of OA19 is connected to −V1.

OA17 and OA18 are comparators that compare the voltages on their respective noninverting inputs with the voltage at the junction between R45 and R46. As long as the excursions of the output of the bandpass filter 85 and the $V_{GB2}$ signal remain above the voltage at the junction between R45 and R46, the outputs of OA17 and OA18 remain in a high state. In the event the excursions of either of these signals exceeds this voltage level, the common output of OA17 and OA18 switches to a low state. The voltage at the junction between R45 and R46 is set such that OA17 and OA18 are triggered, i.e., switch states, before any of the amplifiers used in the various signal processor circuits become saturated. (As will be readily appreciated by those skilled in the operational amplifier art, erroneous signal processing occurs when operational amplifiers become saturated.) As will be better understood from the following description of the or/inverter circuit 73, when the output of the overdrive circuit shifts from a high state to a low state the logic circuit is inhibited and prevents a target identification display. OA19 is included to square and buffer the output signal of the overdrive circuit.

The enable circuit 71 comprises: three capacitors designated C26, C27 and C28; three resistors designated R48, R49 and R50; two NPN transistors designated Q4 and Q5; one operational amplifier designated OA20; and, three comparators designated OA21, OA22 and OA23. The $V_{GB1}$ signal is applied through C26 in series with R48 to the inverting input of OA20. The noninverting input of OA20 is connected to ground. C27 and R49 are connected in parallel, between the output of OA20 and the inverting input of OA20. The inverting input of OA20 is also connected to the base and collector of Q4 and to the emitter of Q5. The output of OA20 is also connected to the base and collector of Q5 and to the emitter of Q4. Finally, the output of OA20 is connected to the noninverting input of OA21 and to the inverting input of OA22. The inverting input of OA21 is connected to −V1 and the noninverting input of OA22 is connected to +V1. The outputs of OA21 and OA22 are connected together and to the inverting input of OA23. The outputs of OA21 and OA22 are also connected through a pull up resistor, R50, to +V. A capacitor, C28, is connected between the outputs of OA21 and OA22 and the negative (−V) power inputs thereof.

The noninverting input of OA23 is connected to ground.

OA20 and its associated components, i.e., C26, C27, R48, R49, Q4 and Q5 form a high gain clamping amplifier. The output of the high gain clamping amplifier is applied to two comparators formed by OA21 and OA22. The comparator inputs of OA21 and OA22 are set at a relatively low level. For example, $-V1$ and $+V1$ may be set at $-0.2$ volts and $+0.2$ volts, respectively, i.e., the same values used in the R window circuit. In any event this voltage level is set such that the comparators formed by OA21 and OA22 switch before the clamping effects of Q4 and Q5 become effective. Q4 and Q5 are provided to prevent OA20 from becoming saturated. In other words Q4 and Q5 are provided to maintain the integrity of the output of OA20. As noted above, the $V_{GB1}$ signal produced when the detector head passes over a target is a partial ringing signal, i.e., it is in the form of three sinusoidal pulses. As a result, the outputs of OA21 and OA22 form, in essence, a long pulse signal that shifts from a high state to a low state during the period of time the detector head is over the target. However, rather than including excursions from the low state back to the high state during the period of time that the detector head is over the target (as occurs in the R WINDOW signal), such excursions are prevented by the filtering action of R50 and C28. Thus, the signal applied to the inverting input of OA23 is a long pulse. OA23 inverts the polarity of the pulse prior to its being applied to the or/inverter circuit 73. Thus, the output of OA23 is a signal that is normally low and goes high during the period of time that the detector head is over the target (see FIG. 12, line J). While long, this pulse has a period less than the period of the $V_{GB2}$ signal. The shorter enable pulse period results in a reduction in errors caused by mineralized ground.

The or/inverter circuit 73 comprises: a comparator designated OA26; and, two resistors designated R52 and R52A. The signals produced by the overdrive circuit 69 and the enable circuit 71 are applied to an OR bus that is also connected through a pull up resistor, R52, to $+V$. The OR bus is also connected to the inverting input of OA26. The output of OA26 is connected through a pull up resistor, R52A, to $+V$. The noninverting input of OA26 is connected to a negative voltage designated $-V4$. In one actual embodiment of the invention V4 was chosen to be $-5$ volts. The output of OA26 and the OR bus are connected to the logic circuit 91, which forms a portion of the divider 59, in the manner hereinafter described.

In essence either of the outputs of the overdrive circuit 69 and enable circuit 71 can control the state of the signal on the OR bus. If both outputs are high the signal on the OR bus is high. If either output is low the signal on the OR bus is low. The signal on the OR bus is simply inverted by OA26. Consequently, the signals applied to the logic circuit are complements of one another.

As noted above, the portion of the divider 59 illustrated in FIG. 8 includes: the $V_X$ highpass filter 75; the $V_R$ highpass filter 77; the triangle wave generator 79; the summer 81; the R modulator 83; the bandpass filter 85; and, the feedback highpass filter 87. The $V_X$ highpass filter 75 comprises: a capacitor designated C29; two resistors designated R53 and R54; an operational amplifier designated OA27; and, a potentiometer designated P3. The $V_X$ signal produced by the $V_X$ demodulator 39 is applied through C29 in series with R53 to the inverting input of OA27. R54 and P3 are connected in series between the output of OA27 and the inverting input of OA27. The noninverting input of OA27 is connected to ground. The $V_X$ highpass filter is a conventional operational amplifier highpass filter. P3 provides a factory adjustment coin reading calibration that allows the magnitude of the feedback signal applied to the inverting input of OA27 to be adjusted. The $V_X$ highpass filter is designed to remove a portion of the ground component from the $V_X$ signal. As noted above, the $V_X$ highpass filter has a steep low frequency roll-off characteristic. As also noted above, the target components of the $V_X$ signal are converted from the form of a single pulse into a single sinusoid by the $V_X$ highpass filter (see FIG. 14, line A). The polarity of the first excursion of the single sinusoid is dependent upon whether the target pulse is positive (FIG. 13, line A) or negative (FIG. 13, line B).

The $V_R$ highpass filter 77 comprises: three capacitors designated C30, C31 and C32; three resistors designated R55, R56 and R57; and, an operational amplifier designated OA28. The $V_R$ signal produced by the $V_R$ demodulator 41 is applied through C30 to the noninverting input of OA28. The noninverting input of OA28 is also connected through R55 to ground. R56 and C31 are connected in parallel between the output of OA28 and the inverting input of OA28. The inverting input of OA28 is also connected through R57 in series with C32 to ground. While the $V_R$ highpass filter 77 does filter ground information (if any) from the $V_R$ signal, it performs another function that is more important. Specifically, it is included so to convert $V_R$ target signals from pulse form into a single sinusoid and maintain the result in phase with the sinusoid created in the output of the $V_X$ highpass filter by a target pulse as heretofor described. In other words, the $V_R$ highpass filter has a time constant that is the same as the time constant of the $V_X$ highpass filter.

The triangle wave generator 79 comprises: three capacitors designated C33, C34 and C35; three resistors designated R58, R59 and R60; and, an operational amplifier designated OA29. The $\overline{F2}$ signal produced by the inverter 61 (FIG. 7) is applied through C33 in series with R58 to the inverting input of OA29. The noninverting input of OA29 is connected to ground. C34 is connected between the output of OA29 and the inverting input of OA29. R59 and R60 are connected in series between the output of OA29 and the inverting input of OA29. The junction between R59 and R60 is connected through C35 to ground. In essence, the triangle wave generator 79 is an integrator that integrates the square waves that form the $\overline{F2}$ signal and, in accordance therewith produces a triangular wave signal, which is applied to the R modulator 83 and used in the manner hereinafter described.

The summer 81 comprises: two capacitors designated C36 and C37; three resistors designated R61, R62 and R63; and, an operational amplifier designated OA30. The output of the $V_X$ highpass filter 75, i.e., the output of OA27, is applied through C36 in series with R61 to the inverting input of OA30. The noninverting input of OA30 is connected to ground. C37 and R62 are connected in parallel between the output of OA30 and the inverting input of OA30. The output of the R modulator 83 is connected through R63 to the inverting input of OA30. The summer 81 filters the output of the $V_X$ highpass filter 75 and sums the result with the output of the R modulator. In addition to filtering the output of the $V_X$ highpass filter, the input filter of the summer converts the single sinusoid output of the $V_X$ highpass filter into a signal comprising three sinusoidal pulses. C36 and R61 perform the function of filtering and converting the output of the $V_X$ highpass filter; and, the summation function is performed at the inverting input of OA30. C37 filters out high frequency switching components present in the output of the R modulator 83. The high frequency switching components are produced when the R modulator is switched by the output of the triangle wave generator as hereinafter described.

The R modulator 83 comprises: a capacitor designated C38; five resistors designated R64 through R68; three insulated gate field effect transistor switches designated FET11, FET12 and FET13; two operational amplifiers designated OA31 and OA38; and, six comparators designated OA32 through OA37. The output of the $V_R$ highpass filter, i.e., the output of OA28, is applied through C38 in series with R64 to the inverting input of OA31. The noninverting input of OA31 is connected to ground. R65 is connected between the output of OA31 and the inverting input of OA31. The junction between C38 and R64 is connected to the source terminal of FET11. The junction between R64 and R65 is connected to the source terminal of FET12. The output of OA31 is connected to the source terminal of FET13. The drain terminals of FET11, FET12 and FET13 are connected together and to the noninverting input of OA38. The feedback signal is applied to the inverting input of OA34 and the noninverting input of OA37. The triangular wave signal produced by the triangle wave generator 79 is applied to the noninverting input of OA34, the inverting input of OA35, the noninverting input of OA36 and the inverting input of OA37. The noninverting input of OA35 and the inverting input of OA36 are connected to ground. The outputs of OA34 and OA35 are connected together and through a pull up resistor, R68, to $+V$. The outputs of OA34 and OA35 are also connected to the gate terminal of FET13 and to the inverting input of OA33. The noninverting input of OA33 is connected to ground. The outputs of OA36 and OA37 are connected together and through a pull up resistor, R66, to $+V$. The outputs of OA36 and OA37 are also connected to the gate terminal of FET11 and to the inverting input of OA32. The noninverting input of OA32 is connected to ground. The outputs of OA32 and OA33 are connected together and through a pull up resistor, R67, to $+V$. The outputs of OA32 and OA33 are also connected to the gate terminal of FET12.

As noted above, the R modulator is a pulse height—pulse width modulator that includes an input filter that converts the sinusoid output of the $V_R$ highpass filter created by a target pulse into a sinusoidal signal comprising three sinusoidal pulses, which are in phase with the three sinusoidal pulses created by the previously described input filter of the summer. The input filter of the R modulator is formed by C38 and R64. The magnitude of the feedback signal controls pulse width and the magnitude of the output of the $V_R$ highpass filter controls pulse height. Switching is created by the triangular wave signal produced by the triangle wave generator. More specifically, as will be better understood from the following description, the feedback signal is a variable magnitude signal of positive or negative polarity, depending upon the nature (e.g., ferrous or nonferrous) of the target. Further the polarity and magnitude is of a form that drives the output of the summer toward zero. Each time the detector head is passed over the target, the feedback signal is moved toward a magnitude and polarity that becomes closer and closer to the exact value required to drive the output of the summer 81 to zero. In this regard, the trigger point and the operative one (OA34 and OA37) of the operating pair (OA34, OA35 or OA36, OA37) of the comparators are determined by the polarity and magnitude of the feedback signal. Specifically, the magnitude of a positive feedback signal establishes the trigger point of OA37; and, the magnitude of a negative feedback signal establishes the trigger point of OA34. The actuated pair of comparators is switched back and forth by the triangular wave signal, with the "on" time being related to the magnitude of the feedback signal. The on (high output) state of the operative pair of comparators enables (gates closed) either FET11 or FET13, as the case may be. During the period of time the appropriate one of these switches is enabled, the output of the related one of inverters OA32 or OA33 disables (gates open) FET12. Conversely when the operative one of FET11 or FET13 is disabled, FET12 is enabled. As a result, the signals through FET11 and FET12 (or the signals through FET12 and FET13) are alternately gated to OA38. OA38 is a buffer amplifier that buffers the output of the R modulator 83.

Figure 14:
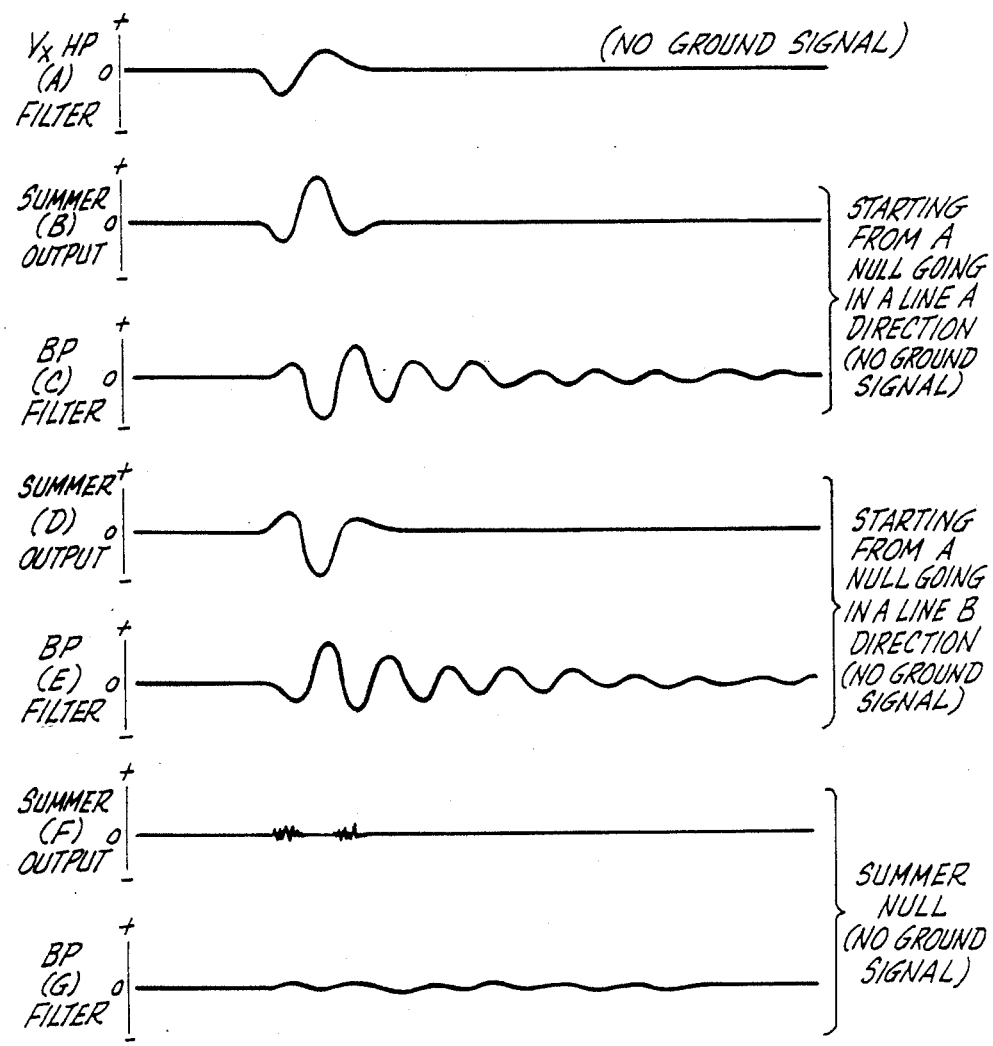
FIG. 14, lines A–G is a series of seven waveforms illustrating the signals formed at the output of the $V_X$ highpass filter, the summer and the bandpass filter of the target identification subsystem illustrated in FIG. 3A for different starting conditions.

The bandpass filter 85 comprises: two resistors designated R69 and R70; two capacitors designated C39 and C40; and, an operational amplifier designated OA39. The output of the summer (examples of which are illustrated in FIG. 14, lines B, D or F) is applied through R69 in series with C39 to the inverting input of OA39. The noninverting input of OA39 is connected to ground. R70 is connected between the output of OA39 and the inverting input of OA39. C40 is connected between the output of OA39 and the junction between R69 and C39.

The bandpass filter 85 filters the output of the summer 81 to remove some of the ground information that is still present in the summer signal. That is, while a substantial portion of the original ground component present in the $V_X$ signal was removed by the $V_X$ highpass filter and the input filter of the summer 81, ground information is still present in the output of the summer 81. The bandpass filter 85 removes some of the remaining ground information. In addition the bandpass filter 85 has a steep low frequency roll-off characteristic and converts the output of the summer (when the output is not nulled) from its three pulse sinusoidal form into a ringing signal. Finally, as previously described, the output of the bandpass filter forms one of the inputs of the overdrive circuit 69. Thus, the overdrive circuit is enabled to prevent a target identification display when signals flowing through the divider reach a level adequate to saturate any of the operational amplifiers of the divider. Exemplary waveforms of signals produced at the output of the bandpass filter are illustrated in FIG. 14, lines C, E or G.

Figure 15:
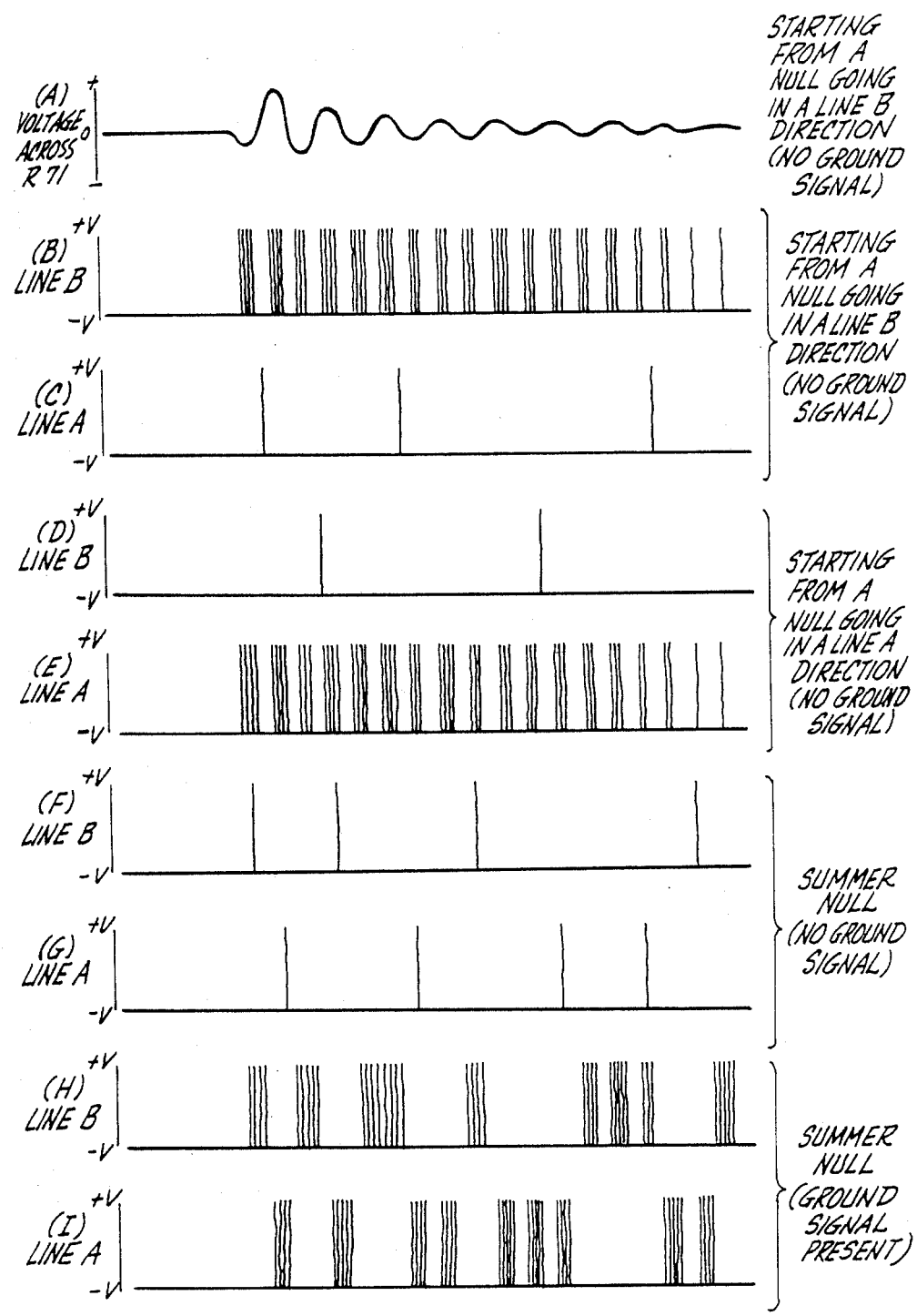
FIG. 15, lines A–I is a series of nine waveforms illustrating the signals formed on the outputs of the AGC circuit of the target identification subsystem illustrated in FIG. 3A for different conditions.

The feedback highpass filter 87 comprises: a capacitor designated C41; and, a resistor designated R47. The output of the bandpass filter, i.e., the output of OA39, is applied through C41 in series with R71 to ground. The output of the feedback highpass filter is formed at the junction between C41 and R71. The feedback highpass filter 87 filters out additional low frequency ground signals present in the output of the bandpass filter 85. An exemplary waveform of a signal produced at the output of the feedback highpass filter is illustrated in FIG. 15, line A.

Preferred embodiments of circuits suitable for forming the remaining elements of the divider 59—the AGC circuit 89; the logic circuit 91; the integrator 93; and, the logarithmic amplifier 95—are illustrated in FIG. 9. The AGC circuit 89 comprises: four comparators designated OA40, OA41, OA42 and OA43; five insulated gate field effect transistor switches designated FET14, FET15, FET16, FET17 and FET18; and, two resistors designated R72 and R73. The output of the feedback highpass filter 87 (FIG. 8) is applied to the inverting input of OA40 and the noninverting input of OA43. The output of the triangle modulator (FIG. 7) is applied to: the noninverting input of OA40; the inverting input of OA41; the noninverting input of OA42; and, the inverting input of OA43. The noninverting input of OA41 is connected to a negative reference voltage designated $-V3$ and the inverting input of OA42 is connected to a positive reference voltage designated $+V3$. $+V3$ and $-V3$ are of equal and opposite polarity. In one actual embodiment of the invention, $+V3$ was chosen to be $+3.6$ millivolts and $-V3$ was chosen to be $-3.6$ millivolts. The outputs of OA40 and OA41 are connected together and to the source terminal of FET14. The outputs of OA40 and OA41 are also connected through a pull up resistor, R73, to $+V$. The outputs of OA42 and OA43 are connected together and to the drain terminal of FET14. The outputs of OA42 and OA43 are also connected through a pull up resistor, R72, to $+V$. The R WINDOW signal is applied to the gate terminal of FET14. The outputs of OA40 and OA41 are also connected to the source terminals of FET15 and FET16. Further, the outputs of OA42 and OA43 are connected to the source terminals of FET17 and FET18. The $+R$ signal is applied to the gate terminals of FET16 and FET18 and the $-R$ signal is applied to the gate terminals of FET15 and FET17. The drain terminals of FET16 and FET17 are connected together and signals created at the junction are applied to the logic circuit 91 along a line denoted B and used in the manner hereinafter described. Similarly, the drain terminals of FET15 and FET18 are connected together and signals created at the junction are applied to the logic circuit 91 along a line denoted A and used in the manner hereinafter described.

OA40, OA41, OA42 and OA43 form four comparators that compare the triangular signal produced by the triangle modulator with either the output of the feedback highpass filter or with $-V3$ and $+V3$. More specifically, OA41 and OA42 compare the triangular signal with $-V3$ and $+V3$ and create a slight negative window that prevents noise from causing erroneous reading when the AGC circuit is enabled in the manner hereinafter described. OA41 and OA42 also coact with OA40 and OA43 to create a pulse width modulator that modulates the output of the feedback highpass filter in the manner described below.

As described above and illustrated in FIG. 15A, the output from the feedback highpass filter is a ringing decaying sine wave when the system is not in a null state. The excursion direction (positive or negative) of the first pulse of the ringing signal is determined by the excursion direction of the first pulse of the three pulse sinusoidal output of the summer. The latter excursion direction is determined by whether the excursions of the output of the R modulator is greater or less than the excursions of the output of the $V_X$ highpass filter after being filtered by the input filter of the summer. It should be noted that this filtered $V_X$ signal may be in phase or 180 degrees out of phase with the output of the R modulator. Even when in phase the excursion direction of the first pulse of the summer output can be in the same direction as if the two summer inputs were 180 degrees out of phase. This result occurs because the width of the pulses produced by the R modulator is controlled by the magnitude of the feedback signal, which in turn is controlled by the phase angle of the target. Because the phase angle of a "new" target can be less than the phase angle of the last detected target (as will be better understood from the following discussion), the feedback signal magnitude can decrease without changing polarity. Thus, the magnitude of the feedback signal can change in the direction of objects of the opposite type (e.g., ferrous toward nonferrous or vice versa) even though the "new" and "last" objects are of the same type (e.g., both nonferrous). In such a case, even though the summed signals are in phase the output of the summer would change as if they were 180 degrees out of phase.

The polarity of the first excursion of the output of the feedback highpass filter is important because it ultimately determines which one of the two output lines of the AGC circuit apply the pulses to the logic circuit produced as the result of a target creating a ringing signal on the output of the feedback highpass filter. If the first excursion is in the positive direction one of the output lines (A or B) applies pulses to the logic circuit during the first excursion and all subsequent excursions, both positive and negative, of the ringing signal. Contrariwise if the first excursion is in the negative direction the other output line (B or A) applies pulses to the logic circuit during the first excursion and all subsequent excursions of the ringing signal (having a magnitude above the cutoff level set by the magnitude of $\pm V3$, of course). This result occurs because of the phase relationship of the $+R$ and $-R$ signals to ringing signals produced by the feedback highpass filter when the detector head passes over a metal target. One of these signals (i.e., the $+R$ signal or the $-R$ signal) is in phase with the ringing signal and the other is 180 degrees out of phase with the ringing signal. How this phase relationship functions to create the foregoing result is next described.

The excursion direction of the output from the feedback highpass filter determines which of OA40 or OA43 produces an output signal in response thereto, i.e., the polarity of the excursions determines which comparator is triggered on and off by the triangular signal produced by the triangle modulator 67. Positive excursions cause OA43 to produce an output signal and negative excursions cause OA40 to produce an output signal. Regardless of which is triggered, the OA40/OA41 and OA42/OA43 pairs of comparators produce a modulated version of the output of the feedback highpass filter. FET15, FET16, FET17 and FET18 form a switching network that directs these signals. More specifically, these field effect transistor switches are actuated to direct the modulated ringing signal. They are not actuated to remove the pulse modulation effect produced by the triangular signal. In this regard, it will be recalled that $+R$ and $-R$ signals are square waves that are 180 degrees out of phase with one another. It will also be recalled that these signals have the same frequency as $V_{GB2}$, which is a ringing signal that was created by the detector head passing over a target. One significant difference between the $V_{GB2}$ ringing signal and the output of the feedback highpass filter is that the first excursion of the $V_{GB2}$ ringing signal is always in the same direction regardless of whether the target is ferrous or nonferrous. Consequently, +R and −R always have the same phase relationship with respect to the original target pulse. Contrariwise, the polarity of the first excursion of the output of the feedback highpass filter, produced when the detector head passes over a metallic target, is dependent upon the phase angle of the "new" target with respect to the phase angle of the immediately preceding target, if any, as described above. While the phase of the output of the feedback highpass filter can be either 0 degrees or 180 degrees with respect to a reference point in time, the varous circuit components are chosen such that the frequency of the output of the feedback highpass filter is the same as the frequency of the $V_{GB2}$ ringing signal and, thus, the frequency of the +R and −R signals. Further, the circuit components are chosen such that the one of +R and −R signals is in phase with the output of the feedback highpass filter and the other is 180 degrees out of phase therewith.

As a result of the foregoing frequency and phase relationship the FET switches (which are gated open and closed by the +R and −R signals) direct the outputs of the OA40/OA41 and OA42/OA43 pairs to output lines A and B of the AGC circuit 89 in accordance with the tangent of the phase angle of the target. This directing function, in essence, combines the outputs of OA40/OA41 and OA42/OA43 pairs of comparators. However, rather than directing the outputs of the OA40/OA41 and OA42/OA43 pairs to the output lines in accordance with the ferrous or nonferrous nature of the targets, the outputs are directed in accordance with whether the phase angle of the "new" target is greater or less than the phase angle of the immediately preceding target, if any. If no prior target was detected the system starts at a null point. The null point is a zero magnitude integrator output.

In summary, the AGC circuit pulse modulates the ringing signals produced by the feedback highpass filter when the detector head passes over a target and then directs the resultant pulses to an output line in accordance with whether the tangent of the phase angle of the detected target is greater or less than the tangent of the phase angle of the last detected target or a zero phase angle. Examples of the pulses produced on lines A and B are illustrated in FIG. 15, lines B through I.

While the AGC circuit 89 could include a single channel, whereby, in essence, a half wave directing action would occur, there is a ground cancellation advantage to the dual channel approach illustrated in FIG. 9 and heretofore described. Specifically, even when a null (zero magnitude) target signal is created on the output of the summer 81 (usually after the detector head makes several passes over the same target), a slight ground signal remains on this output. This ground signal creates small ringing signals on the output of the feedback highpass filter 87. These ringing signals are random and have a frequency that is mostly unrelated to the frequency of the +R and −R signals. As a result of the random nature of these ground signals, over a period of time, they will create an equal number of pulses on both of the output lines of the AGC circuit 89 when the AGC circuit is enabled as the detector head passes over a target (see FIG. 15, lines H and I). Thus, they will have an average effect on the voltage stored in the hereinafter described integrator. This result would not be the same in a single channel AGC circuit. In such a circuit ground created pulses would be unequally applied to the output lines and, thus, produce an offset error in the output of the integrator. Hence, a dual channel AGC circuit of the type illustrated and described further reduces the effect of mineralized ground.

The AGC circuit, in combination with the remaining portions of the loop has one additional benefit. Specifically, it has an automatic gain control effect that offsets the loop gain decrease and time constant increase that occurs when the target signal has a low magnitude. The benefit is described in detail following the description of the logic circuit 91 and the integrator 93, which are next described.

The logic circuit 91 comprises: four resistors designated R74, R75, R76 and R77; and, four insulated gate field effect transistor switches designated FET19, FET20, FET21 and FET22. The junction between the drain terminals of FET16 and FET17 of the AGC circuit 89 is connected to the gate terminal of FET19 and the junction between the drain terminals of FET15 and FET18 is connected to the gate terminal of FET20. The drain terminal of FET19 is connected through R74 to −V. The source terminal of FET19 is connected to the drain terminal of FET20. R75 is connected in series with R76 between +V and ground. The junction between R75 and R76 is connected to the source terminal of FET20. The junction between the source terminal of FET19 and the drain terminal of FET20 is connected to the source terminal of FET21 and to the source terminal of FET22. The drain terminal of FET21 is connected to ground. The drain terminal of FET22 is connected to one end of R77. The other end of R77 is connected to the integrator 93 in the manner hereinafter described. The gate terminal of FET21 is connected to the output of OA26 of the or/inverter circuit 73 (FIG. 8). The gate terminal of FET22 is connected to the OR bus of the or/inverter circuit 73.

As previously described, the outputs of the or/inverter circuit 73 control the flow of signals through the logic circuit 19. When the state of the signal on the OR bus is high FET22 is gated closed and FET21 is gated open. As noted above, this stae exists in the absence of an overdrive inhibiting pulse and in the presence of an enable pulse. Contrariwise when the state of the signal on the OR bus is low FET21 is gated closed and FET22 is gated open. This state exists when an overdrive inhibiting pulse is produced by the overdrive circuit, or in the absence of an enable pulse being produced by the enable circuit.

When FET22 is gated closed and FET21 is gated open pulses developed at the junction between the source terminal of FET19 and the drain terminal of FET20 are applied to the integrator 93. One such pulse occurs each time one or the other of FET19 and FET20 are gated closed. Which one is gated closed depends upon which of the two output lines (A or B) of the AGC circuit applied the closure pulse to these two field effect,transistor switches. In any event, when FET19 is gated closed a negative pulse is applied to the integrator and when FET20 is gated closed a positive pulse is applied to the integrator. These negative and positive pulses have fixed magnitudes and decrease and increase, respectively, the charge stored on a capacitor forming part of the integrator. Thus, which of the two output lines of the AGC circuit carries the pulses that gate FET19 or FET20 closed determines whether the integrator capacitor charge is increased or decreased.

The integrator 93 comprises: a capacitor designated C42; and, an operational amplifier designated OA44. The output end of R77 is connected to the inverting input of OA44. The noninverting input of OA44 is connected to ground. C42 is connected between the output of OA44 and the noninverting input of OA44. In a conventional manner the integrator 93 integrates the positive and negative pulses supplied to it by the logic circuit 91 in the manner heretofor described. More specifically, positive pulses change the charge across C42 in one direction and negative pulses change the charge in the other direction. The output of OA44 is the feedback signal that is applied to OA34 and OA37 of the R modulator 83 (FIG. 8) in the manner heretofore described. The magnitude of this DC signal, which may be of positive or negative polarity, is directly related to the voltage ratio between the target component of the $V_X$ and the $V_R$ signals which ratio, in turn, is directly related to the tangent of the phase angle (and thus the identity) of the target.

The time constant of the integrator 93 is primarily determined by the values of R77 and C42. More precisely, the time constant of the integrator is determined by the resistance and reactance value of these components, plus the resistance of the other components making up the logic circuit 91 and the loop gain of the overall divider 59.

As noted above, as the magnitude of the signals applied to the divide loop decrease, the loop gain decreases and the loop time constant increases. In the present environment, the magnitude of target signals and, thus, the magnitude of the various signals applied to and flowing in the divider resulting from the detector head passing over a target is directly related to the distance between the target and the detector head. That is, the further a target is from the detector head, the weaker is the target signal and the weaker are the various signals created by a target signal, which have been described above. As a result, in the absence of other factors, the divider becomes less responsive the further the target is from the detector head. An unresponsive divider, of course, is likely to cause an erroneous output from the integrator. The automatic gain control circuit counteracts this undesirable result. More specifically, when the target signal is weak, whereby the output from the feedback highpass filter is weak, the triangular signal produced by the triangle modulator is also weak. Since the OA40/OA41 and OA42/OA43 pairs of the AGC circuit, which compare the feedback highpass filter signal with the triangular signal, are triggered based on the difference between these two signals, the width of the pulses is substantially the same for lower magnitude target signals as higher magnitude target signals. Also, the number of pulses is substantially the same. Since it is the width of pulses, not the height of the pulses that controls the charge on the capacitor, C42, of the integrator, loop response is improved. Such would not be the result if the magnitude of the output of the triangle modulator remained constant while the magnitude of the output from the feedback highpass filter changes in accordance with target/detector head distance.

While the feedback signal produced on the output of OA44 is directly related to the tangent of the phase angle of the target, the relationship is nonlinear. The logarithmic amplifier 95 is included to improve the readability of this relationship.

The logarithmic amplifier 95 comprises: two capacitors designated C43 and C44; three NPN transistors designated Q6, Q7 and Q8; six resistors designated R78 through R83; and, two operational amplifiers designated OA45 and OA46. The output of the integrator 93 is applied through R78 to the collector of Q6. The emitter of Q6 is connected to the emitter of Q7 and the collector of Q7 is connected through a pull up resistor, R82, to +V. The base of Q6 is connected through R79 to ground and through R80 to the output of OA45. The base of Q7 is connected to ground. The junction between the emitters of Q6 and Q7 is connected through R81 to the output of OA46. The junction between R78 and the collector of Q6 is connected to the emitter of Q8, through a pull up resistor, R83, to +V and to the inverting input of OA46. The noninverting input of OA46 is connected to ground. C43 is connected between the output of OA46 and the inverting input of OA46. The output of OA46 is also connected to the collector and the base of Q8. The collector of Q7 is also connected to the inverting input of OA45. The noninverting input of OA45 is connected to ground. C44 is connected between the output of OA45 and the inverting input of OA45. The linearized feedback signal, denoted the TARGET IDENTITY signal, occurs at the output of OA45.

Since the logarithmic amplifier 95 illustrated in FIG. 9 is a conventional logarithmic amplifier that merely logarithmically linearizes the output of the integrator 93, its operation will not be described in detail here. Rather, attention is directed to National Semiconductor Application Note No. 30 entitled "Log Converters," by Robert C. Dobkin dated November, 1969, a copy of which is contained in the Linear Applications Handbook published by National Semiconductor Corporation, Santa Clara, Calif. The logarithmic amplifier 95 illustrated in FIG. 9 is substantially identical to FIG. 1 of this application note, except that the reference and input signals are reversed in order to avoid inverting the output signal, as discussed in the written portion of the note.

Basically the logarithmic amplifier 95 expands the lower voltage end of the feedback signal and compresses the higher voltage end in order to create a more nearly linear signal. This result is accomplished by the logarithmic amplifier providing more gain when the feedback voltage is low and less gain when the feedback voltage is high.

FIG. 10 is a schematic diagram of a reset circuit 97 and a depth reader circuit 99 suitable for use in the target depth subsystem illustrated in FIG. 3B. The reset circuit 97 comprises: four resistors designated R83, R84, R85 and R86; three capacitors designated C45, C46 and C47; an inverter designated I6; an NPN transistor designated Q9; and, a pushbutton switch designated PB. R83 is connected in series with PB between +V and −V. C45 is connected in parallel with PB. The junction between PB and R83 is connected through C46 to the base of Q9. The emitter of Q9 is connected to −V. The collector of Q9 is connected through a pull up resistor, R86, to +V. The junction between C46 and the base of Q9 is connected through R84 in series with R85 to ground. The junction between R83 and PB is also connected to the input of I6. The output of I6 is connected through C47 to the junction between R84 and R85. Reset pulses are produced at the collector of Q9.

As described above, the reset circuit produces a pulse each time PB is closed or opened. In other words, each time the state of PB changes a pulse is produced by the reset circuit. Under quiescent conditions Q9 is biased on by R84 and R85. As a result, the voltage at the collector of Q9 has some negative value near −V. When PB is closed, the upper terminal of C46 is connected to −V, whereby Q9 is turned off for a short period of time. The short off time is primarily determined by the time constant of C46, R84 and R85. C47 functions to slightly shorten this time constant. The result is the production of a short reset pulse. Thereafter, when PB is opened, the upper terminal of C47 is connected to −V and Q9 is again turned off for a short period of time. The period of time is primarily determined by the time constant of C47, R84 and R85. In this case C46 functions to slightly shorten this time constant. Thus, the reset line is normally low until PB is actuated in one direction or the other, i.e., opened or closed. When this occurs, a reset pulse is produced.

The depth reader 99 comprises: three capacitors designated C48, C49 and C50; two insulated gate field effect transistor switches designated FET23 and FET24; a NPN transistor designated Q10; a potentiometer designated P4; eighteen resistors designated R87 through R104; two operational amplifiers designated OA47 and OA48; and, six comparators designated OA49 through OA54. Preferably FET23 and FET24 are VMOS FETs. The $V_{GB}$ signal produced by the $V_{GB}$ amplifier (FIG. 6) is applied through R87 to the inverting input of OA47. R88 and C48 are connected in parallel between the output of OA47 and the inverting input of OA47. The output of OA47 is connected through R90 to the source terminal of FET24. The drain terminal of FET24 is connected to the drain terminal of FET23 and the source terminal of FET23 is connected to the inverting input of OA48. The noninverting input of OA48 is connected to ground. C49 is connected in series with R89 between the output of OA48 and the inverting input of OA48. The output of OA48 is also connected to the noninverting input of OA47. The reset pulses produced by the reset circuit 97 are applied to the gate terminals of FET23 and FET24.

The junction between R90 and the source terminal of FET24 is connected through R91 to the inverting inputs of OA49, OA50, OA51, OA52, OA53 and OA54. The inverting inputs of OA49 through OA54 are also connected through C50 to ground. R92 through R98 are connected in series in numerical order between +V and ground. The junction between R92 and R93 is connected to the noninverting input of OA49; the junction between R93 and R94 is connected to the noninverting input of OA50; the junction between R94 and R95 is connected to the noninverting input of OA51; the junction between R95 and R96 is connected to the noninverting input of OA52; the junction between R96 and R97 is connected to the noninverting input of OA53; and, the junction between R97 and R98 is connected to the noninverting input OA54. The outputs of OA49 through OA54 are connected through R99 through R104, respectively, to the emitter of Q10. The base of Q10 is connected to the movable contact of P4. P4 is connected between −V and ground. The TARGET DEPTH signal is produced at the collector of Q10.

As will be recalled from the foregoing description of the $V_{GB}$ amplifier 43, the $V_{GB}$ signal contains substantially no ground information and does not discriminate between targets. That is, any metallic target that disrupts the magnetic field of the transmit coil in a manner that creates a detectable current in the receive coil creates a $V_{GB}$ pulse, regardless of the ferrous or nonferrous nature of the target. The $V_{GB}$ amplifier is designed such that the polarity of the pulse is always the same. While the $V_{GB}$ signal does not discriminate between targets, it does contain target information in addition to merely denoting the existence of a target. Specifically, the magnitude of the $V_{GB}$ pulse is related to the distance between the target and the detector head and, thus, the depth of the target in the ground.

The portion of the depth reader 99 that applies a signal through R91 to OA49 through OA54 is, in essence, a track and hold circuit that is zeroed by each reset pulse. That is, the $V_{GB}$ signal is referenced to zero by the track and hold circuit each time a reset pulse is produced by the reset circuit 97. Zeroing is accomplished by applying the output of OA47 through FET23 and FET24 to the inverting input of OA48 when a reset pulse occurs. OA48 integrates the output of OA47 when this occurs and applies a compensating signal to the noninverting input of OA47 that drives the output of OA47 to zero. This zeroing procedure takes place prior to the detector head making a pass over the target. Thus, the output of OA48 compensates for any offset voltages present on the $V_{GB}$ signal line. Since the track and hold circuit is conventional, and has been used in the past in metal detectors it will not be further discussed here, except to note that OA48 is an operational amplifier having a high input impedence; C49 is a large capacitor; and, OA47 adds gain to the $V_{GB}$ signal before it is applied through R91 to the inverting inputs of OA49 through OA54.

OA49 through OA54 form a series of comparators that compare the output of OA47 with voltages supplied by a voltge divider formed by R92 through R98. Each succeeding comparator is tripped by a higher voltage starting from bottom to top, as shown in FIG. 10. That is, the lower comparator OA54 turns on first; the next to lower comparator OA53 turns on second, etc., depending upon magnitude of the $V_{GB}$ pulse created by the target. As noted above this magnitude is related to the distance between the target and the detector head 31. Each of the comparators feeds a current signal to the common output line; and, all of the lower order comparators remain on as higher order comparators turn on. Consequently, it is the magnitude of the current flowing through Q10 that is related to the distance between the target and the detector head, not the magnitude of the voltage on the collector of Q10. P4 is provided for initial calibration purposes. That is, the setting of P4 determines the voltage applied to the base of Q10 and, thus, the current amplification provided by Q10. Also, Q10 provides a virtual ground for the outputs of the comparator. Preferably the values of R92 through R98 are chosen such that a linear output current to depth relationship is produced. That is, while the magnitude of the $V_{GB}$ pulse created by the target is related to the distance between the target and the detector head, the relationship is nonlinear. The values of R92 through R98 are chosen to compensate for this nonlinearity. As a result the current magnitude of the TARGET DEPTH signal is substantially linearly related to the depth of the target.

Figure 4:
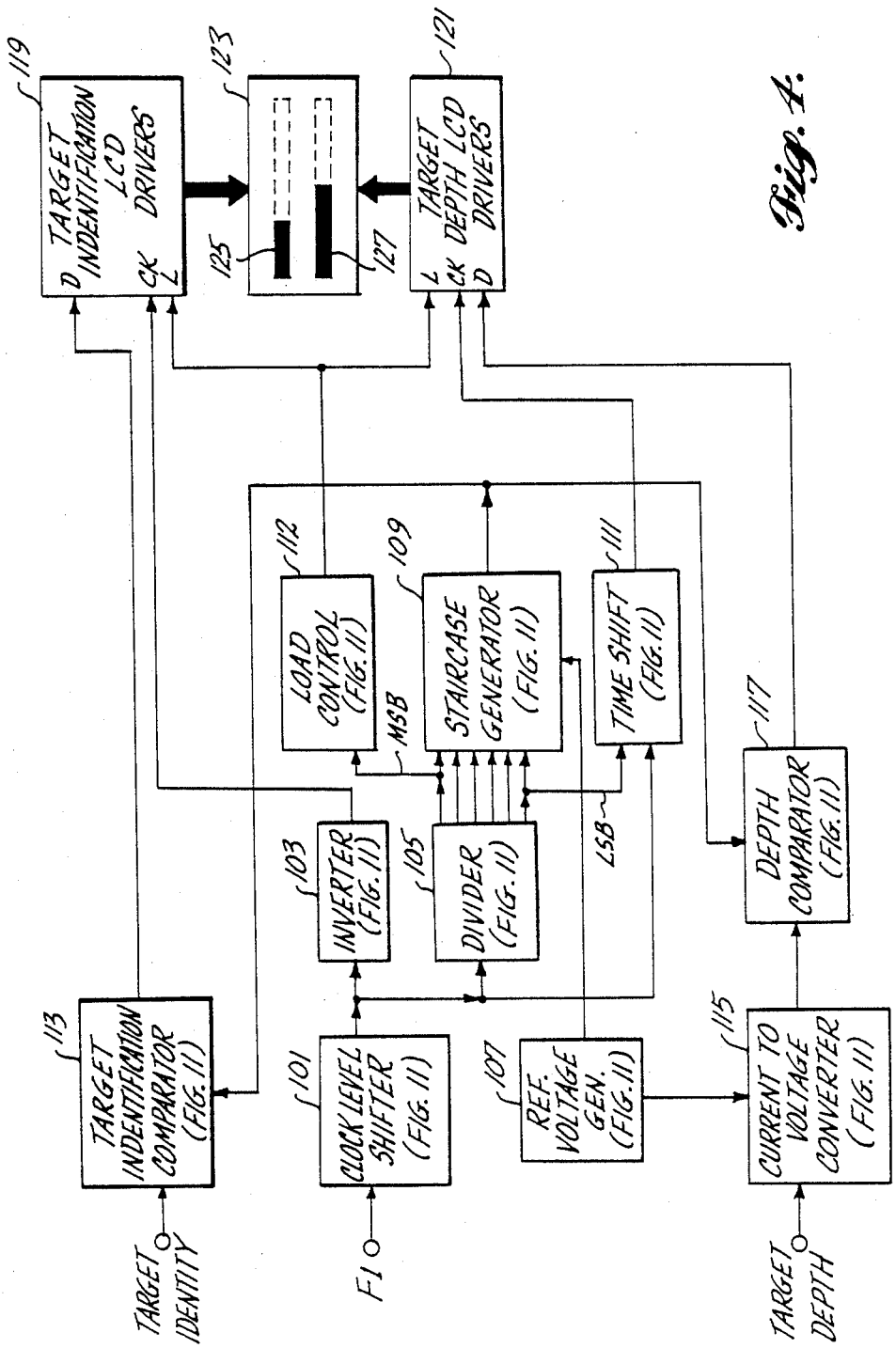
FIG. 4 is a block diagram of an LDC display suitable for use in the metal detector target identifying system illustrated in FIG. 1.

As shown in FIG. 4, the preferred embodiment of the display 25 (FIG. 1) comprises: a clock level shifter 101; an inverter 103; a divider 105; a reference voltage generator 107; a staircase generator 109; a time shift circuit 111; a load control 112; a target identification comparator 113; a current to voltage converter 115; a target depth comparator 117; target identification LCD drivers 119; target depth LCD drivers 121; and, a multiple LCD display 123.

The F1 signal produced by the oscillator and loop drive 33 of the signal production system 21 is applied to the input of the clock level shifter 101. The output of the clock level shifter is applied to inputs of the inverter 103, the divider 105 and the time shift circuit 111. The output of the inverter 103 is applied to the clock (CK) input of the target identification LCD drivers 119. The divider 105 produces a plurality of parallel outputs that are applied to the staircase generator 109. The least significant bit (LSB) output is also applied to the time shift circuit 111 and, the most significant bit (MSB) is also applied to the load control 112. The output of the time shift circuit 111 is connected to the clock (CK) input of the target depth LCD drivers 121. The output of the load control is applied to the load (L) inputs of the target identification and target depth LCD drivers 119 and 121.

The reference voltage generator 107 produces two reference voltages. One of the reference voltages is applied to the staircase generator 109 and the other reference voltage is applied to the current to voltage converter 115. The output of the staircase generator 109 is connected to an input of the target identification comparator 113 and an input of the target depth comparator 117. The TARGET IDENTITY signal is applied to the second input of the target identification comparator 113 and the output of the target identification comparator 113 is connected to the data (D) input of the target identification LCD drivers 119. The TARGET DEPTH signal is applied to the input of the current to voltage converter 115 and the output of the current to voltage converter 115 is connected to the second input of the target depth comparator 117. The output of the target depth comparator 117 is connected to the data (D) input of the target depth LCD drivers 121.

The target identification LCD drivers 119 and the target depth LCD drivers 121 each produce a plurality of parallel control signals that are applied to the display control inputs of two bar graphs 125 and 127, which form the multiple LCD display 123. The control signals produced by the target identification LCD drivers control one bar graph 125 and the control signals produced by the target depth LCD drivers 121 control the second bar graph 127. Preferably the first and second bar graphs 125 and 127 are juxtaposed, i.e., located side by side. In addition, although not illustrated in FIG. 4, preferably, suitable pictorial or scale information is located adjacent to the displays. In the case of the LCD bar display, the scale may comprise identification information, such as pull tab, penny, nickel, five dollar gold coin, etc. In the case of the depth LCD display 127, the scale information comprises depth information, such as one inch, two inches, three inches, etc.

In operation, the clock level shifter receives the F1 clock signals produced by the oscillator and loop driver and shifts them to a suitable level. The clock signals are inverted by the inverter 103 (which is included to provide load and clock signal synchronization) and applied to the clock input of the target identification LCD drivers 119 wherein they control the stepping of a ring counter forming part of the target identification LCD drivers, in a conventional manner. Each time the divider 105 reaches its maximum count value the MSB output of the divider switches state, also in a conventional manner. When the MSB output of the divider switches states the load control produces a pulse that causes a set of latches, also forming part of the target identification LCD drivers, to read and store the state of the ring counter stages. The information stored in the latches thereafter controls the display produced by the first bar graph 125.

The clock pulses applied to the divider 105 are counted by the divider and in a conventional manner control the binary state (high or low) of each of the parallel output signals produced by the divider. The parallel output signals cause the output of the staircase generator to increase by a fixed amount each time the divider 105 counts another clock pulse, until the divider reaches its maximum count value. It is at this point that the MSB output of the divider switches states. The next clock pulse that occurs after the divider reaches its maximum count value causes the divider outputs to return to a zero output state, whereby the output of the staircase generator returns to a zero voltage level. Thereafter the staircase cycle is repeated as the divider counts up to its maximum value. The reference voltage generator 107 supplies a precise voltage that is operated on by the staircase generator in accordance with the output state of the outputs of the divider 105 to produce precise voltage changes (e.g., steps) in the output of the staircase generator.

The output of the staircase generator is compared in the target identification comparator 113 with the TARGET IDENTITY signal. During the period of time that the voltage magnitude of the TARGET IDENTITY signal is above the magnitude of the output of the staircase generator the target identification comparator 113 applies a high (binary one) signal to the target identification LCD drivers 119, which is clocked into the ring counter stages as the clock pulses clock the ring counter, as previously described. When the voltage magnitude of the output of the staircase generator reaches a level that equals or slightly exceeds the magnitude of the TARGET IDENTITY signal, the output of the target identification comparator 113 shifts from a high state to a low (binary zero) state. Thereafter the low output of the target identification comparator is clocked into the stages of the ring counter as clock pulses occur. Simultaneously with the staircase generator output being reset to zero the load control produces a pulse that, as noted above, shifts the state of the ring counter stages into a set of latches, which thereafter control the display created by the first bar graph. Thus, the data stored in the latches is updated each time a load pulse is produced.

The time shift circuit 111 is basically a divider that divides the clock pulses by two so that one half of the number of clock pulses produced by the clock level shifter 101 are applied to the clock (CK) input of the depth LCD drivers 121 as are applied to the clock input of the target identification LCD drivers. The current to voltage converter 115 converts the TARGET DEPTH signal from current form to voltage form. The target depth comparator compares the voltage magnitude of the output of the current to voltage comparator with the magnitude of the output of the staircase generator. During the period of time that the voltage magnitude of the output of the current to voltage converter 115 exceeds the magnitude of the output of the staircase generator 109, the target depth comparator 117 applies a high signal to the depth LCD drivers 121. When the voltage magnitude of the output of the staircase generator 109 reaches a level that is equal to or slightly exceeds the magnitude of the output of the current to voltage converter 115, the output of the target depth comparator 117 shifts from a high state to a low state. The target depth LCD drivers 121 are formed in the same manner as the target identification LCD drivers 119. Specifically, each time a clock pulse occurs a ring counter is stepped. As the counter is stepped, the binary state on the input of the ring counter is read into the first stage of the ring counter, in a conventional manner. When a load pulse occurs, the binary data in the ring counter stages is transferred to, and updates, a set of latches that control the display created by the second bar graph 127.

Figure 11:
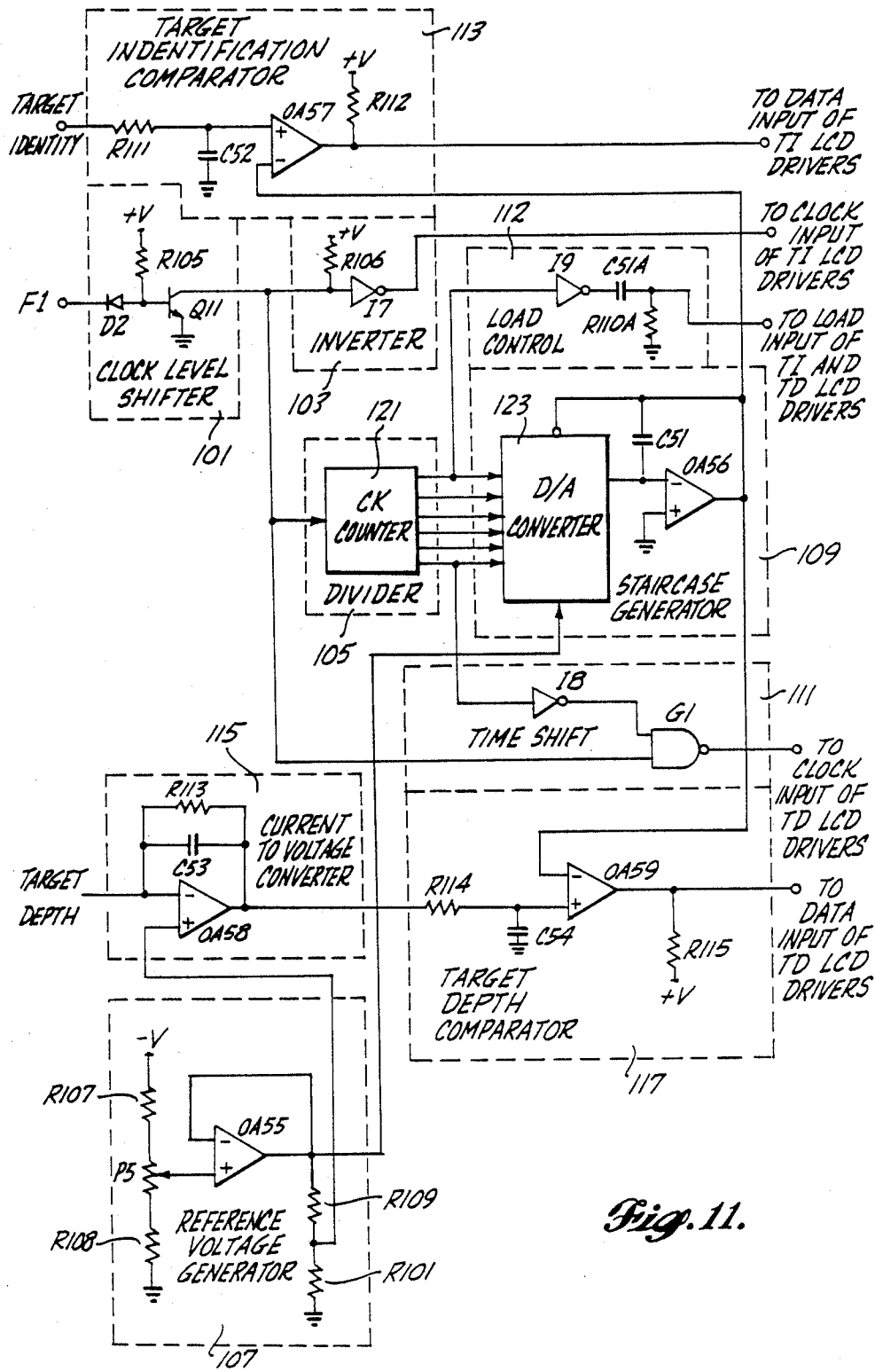
FIG. 11 is a schematic diagram of a clock level shifter, an inverter, a divider, a reference voltage generator, a staircase generator, a time shift circuit, a target identification comparator, current-to-voltage converter, and a target depth comparator suitable for use in the LCD display illustrated in FIG. 4.

A schematic diagram of a preferred embodiment of all of the circuits forming the LCD display illustrated in FIG. 4, except for the target identification LCD drivers and the target depth LCD drivers is illustrated in FIG. 11 and next described.

The clock level shifter 101 illustrated in FIG. 11 comprises: a diode designated D2; a resistor designated R105; and a NPN transistor designated Q11. F1 is applied to the cathode of D2 and the anode of D2 is connected through a pull up resistor, R105, to +V and to the base of Q11. The emitter of Q11 is connected to ground. The clock level shifter 101 merely shifts the voltage level of F1 to a level suitable for use by the circuits to which the clock level shifter is connected. The shifted level signal is produced at the collector of Q11.

The inverter 103 comprises: an inverter designated I7; and, a resistor designated R106. The collector of Q11 is connected to the input of I7. The input of I7 is also connected through R106, which functions as a pull up resistor, to +V. The inverter, in a conventional manner merely inverts the clock signal pulses, which are applied to the clock input of the target identification LCD drivers 119 illustrated in FIG. 4 and heretofore described.

The divider 105 merely comprises a free running counter 121. The clock pulses produced at the output of the clock level shifter 101 are applied to the clock input of the counter 121. In a conventional manner the counter 121 counts the clock pulses. All or selected stages of the counter are connected via separate lines to separate inputs of the staircase generator 109. As each clock pulse is counted by the counter the binary state of one or more of the output stages changes, as appropriate. After the counter 121 has counted up to its maximum value (preferably 64 pulses to create a 64 step staircase generator output, as described below), the next pulse returns it to zero and the count cycle is repeated.

The reference voltage generator 107 comprises: four resistors designated R107, R108, R109 and R110; a potentiometer designated P5; and, an operational amplifier designated OA55. R107, P5 and R108 are connected in series and in that order between −V and ground. The movable contact of P5 is connected to the noninverting input of OA55. The output of OA55 is connected to the inverting output of OA55 and the output of OA55 is also connected through R109 in series with R110 to ground. The output of OA55 is connected to the voltage input of the staircase generator 109 and the junction between R109 and R110 is connected to the current to voltage converter 115.

The staircase generator 109 comprises: a digital-to-analog (D/A) converter 123; a capacitor designated C51; and, an operational amplifier designated OA56. The digital inputs of the D/A converter 123 are connected to the outputs of all or the selected stages of the counter 121 of the divider 105. The reference voltage input of the D/A converter is connected to the output of OA55 of the reference voltage generator 107. The analog output of the D/A converter 123 is connected to the inverting input of OA56. The noninverting input of OA56 is connected to ground. The output of OA56 is connected through C51 to the inverting input of OA56 and to the feedback control input of the D/A converter 123. The feedback control input connects a feedback resistor between the inverting input of OA56 and the output of OA56. Preferably, the staircase generator has a 64 step output. At the end of the 64 steps, when the counter 121 recycles to zero, the output of the D/A converter returns to zero. Thereafter, as the counter 121 counts the next 64 pulses the output of the staircase generator 109 steps through its 64 output steps.

The time shift circuit 111 comprises: an inverter designated I8; and, a NAND gate designated G1. The output of the clock level shifter 101 is applied to one input of G1. The least significant bit (LSB) output of the counter 121 of the divider 105 is connected though I8 to the second input of G1. The time shift circuit 111 in combination with the divider 105 divides the output of the clock level shifter 101 by two. Consequently, the number of pulses applied to the clock input of the target depth LCD drivers is equal to one half the number of pulses applied to the clock input of the target identification LCD drivers. The inclusion of the time shift circuit allows the target identification and the target depth displays to the correlated without requiring the inclusion of a second staircase generator to produce a staircase voltage signal having thirty-two (32) steps for use with the target depth comparator described below.

The load control 112 comprises: an inverter designated I9; a capacitor designated C51A; and, a resistor designated R110A. The most significant bit (MSB) output of the counter 121 of the divider 105 is connected to the input of I9. The output of I9 is connected through C51A in series with R110A to ground. The load pulse occurs at junction between C51A and R110A, which junction is connected to the load inputs of the target identification and target depth LCD drivers 119 and 121.

The target identification comparator 113 comprises: two resistors designated R111 and R112; a capacitor designated C52; and, a comparator designated OA57. The TARGET IDENTITY signal is applied through R111 in series with C52 to ground. The junction between R111 and C52 is connected to the noninverting input of OA57. The output of the staircase generator 109 is connected to the inverting input of OA57. The output of OA57 is connected through a pull up resistor, R112, to +V. In operation, as long as the magnitude of the TARGET IDENTITY signal is above the magnitude of the output of the staircase generator, the output of OA57 is high. As soon as the magnitude of the output of the staircase generator 109 reaches or exceeds the magnitude of the TARGET IDENTITY signal, the output of OA57 shifts from a high state to a low state. During the period of time the output of the target identification comparator 113, i.e., the output of OA57, is high the ring counter of the target identification LCD drivers reads and shifts a high input as it is clocked. When the output of OA57 drops from a high state to a low state, the ring counter of the target identification LCD drivers reads and shifts a low input as it is clocked.

As will be readily appreciated from viewing FIG. 11 and the foregoing description, the target identification comparator is unipolar. That is, it only produces a shift in its output state from low to high when the TARGET IDENTITY signal is positive. Negative signals have no effect on the output of the target identification comparator regardless of the state of the output of the staircase generator. This result is provided because all valuable metal objects have the same polarity because they are all nonferrous, even though they have different phase angles. And, of course, the signal processing circuits are designed such that nonferrous objects all create a positive signal on the output of the logarithmic amplifier 95. Obviously, if desired, the negative signals created by ferrous targets could be inverted prior to being applied to the logarithmic amplifier and then compared in a target identification comparator similar to the target identification comparator illustrated in FIG. 11 to display the phase angles and, thus, the identity of ferrous targets.

The current to voltage converter 115 comprises: a resistor designated R113; a capacitor designated C53; and, an operational amplifier designated OA58. The TARGET DEPTH signal produced by the depth reader 99 is applied to the inverting input of OA58. C53 and R113 are connected in parallel between the output of OA58 and the inverting input of OA58. The voltage at the junction between R109 and R110 of the reference voltage generator 107 is applied to the noninverting input of OA58. In a conventional manner the current to voltage converter 115 converts the TARGET DEPTH signal information from current form to voltage form and applies the voltage form to the target depth comparator 117.

The target depth comparator 117 comprises: two resistors designated R114 and R115; a capacitor designated C54; and, an operational amplifier designated OA59. The output of the current to voltage converter 115, i.e., the output of OA58, is applied through R114 in series with C54 to ground. The junction between R114 and C54 is connected to the noninverting input of OA59. The output of the staircase generator 109 is applied to the inverting input of OA59. The output of OA59 is applied through a pull up resistor, R115, to +V. In operation, the depth comparator compares the magnitude of the output of the current to voltage converter 115 with the magnitude of the output of the staircase generator. When the magnitude of the voltage produced by the current to voltage converter 115 is above the magnitude of the staircase generator output voltage, the output of OA59 is high. When the magnitude of the output of the staircase generator 109 reaches or exceeds the output voltage of the current to voltage converter 115, the output of OA59 shifts to a low state. During the period of time that the output of OA59 is in its high state, the ring counter of the target depth LCD drivers reads and shifts a high signal as it is clocked by the clock pulses produced by the time shift circuit 111. During the period of time that the output of OA59 is in its low state the ring counter of the target depth LCD drivers reads and shifts a low signal as it is clocked.

In summary, a metal detector including a target identifying system formed in accordance with the invention of the type illustrated and described above comprises a signal production subsystem that produces target information (when a detector head passes over a suitable target) and timing (e.g., clock) signals. A signal processor receives the signals and, in accordance therewith, determines the tangent of the phase angle of the target. In addition, the signal processor determines the approximate depth of the target in the ground. A display receives the resulting TARGET IDENTITY and TARGET DEPTH signals and creates a suitable display, preferably, on side-by-side LCD bar graphs.

The signal production subsystem, in many respects, is conventional in overall form. Specifically, the signal production subsystem includes a signal generator for producing the clock signals, plus an oscillating signal that is applied to a transmit coil mounted in the detector head. The oscillating signal also controls the production of demodulation signals. When a target disrupts the magnetic field produced by the transmit coil (as the detector head is moved over the target), a target pulse is developed in the receive coil. In the case of a target buried in mineralized ground, the target pulse is added to the ground signal developed in the detector coil as the detector head passes over the ground. A phase shift preamplifier shifts the phase of the target pulse by a fixed amount. The output of the phase shift preamplifier is demodulated in a pair of demodulators that produce a pair of quadrature signals, each of which contains a target component. One of the signals is relatively clean, i.e., it contains substantially no ground component. The other signal is "dirty," i.e., it contains a ground component. These signals, denoted $V_X$ and $V_R$ are manipulated by the signal processor to determine the phase angle of the target. In addition to producing the $V_X$ and $V_R$ signals, the signal production subsystem differentially combines these signals and produces a pulse signal that identifies the presence, but not the nature of, a target. This signal, denoted $V_{GB}$, contains substantially no ground information and is utilized to determine the approximate depth of the target. $V_{GB}$ is also filtered in the signal production subsystem to develop a pair of ringing signals, denoted $V_{GB1}$ and $V_{GB2}$ that are utilized in the portion of the signal processor that determines the phase angle of the target.

The signal processor determines the phase angle of the target by first filtering the $V_X$ and $V_R$ signals to remove ground information therefrom, particularly from the "dirty" $V_X$ signal. The filters are such that the phase information (which is in the form of a voltage ratio) between the filtered $V_X$ and $V_R$ signals is the same as the phase information (which is also in the form of a voltage ratio) between the unfiltered $V_X$ and $V_R$ signals. Further the filters convert the target information in the $V_R$ and $V_X$ signals from pulse form into the form of a single sinusoid and then into the form of a three pulse sinusoid. While some ground information is removed, all of the ground information is not removed from the $V_X$ signal as the $V_X$ signal is filtered and converted. Thereafter, the voltage ratio between the target components of the filtered $V_X$ signal and the target component of the filtered $V_R$ signal is determined, which ratio defines the tangent of the phase angle of the target. The determination is made in a divider that, in general, functions in accordance with implicit (sometimes referred to as steepest-descent) division principles. That is, the divider is a feedback divider wherein the output signal is fed back into an R modulator (driven by a triangular wave signal) that pulse width-pulse height modulates the filtered $V_R$ signal prior to the filtered $V_R$ signal being summed with the filtered $V_X$ signal. The summed signal is filtered in bandpass filters and highpass filters that remove additional ground information and convert the summation result from three pulse sinusoidal form into full ringing signal form. The resultant ringing signal is applied to an automatic gain control circuit driven by a triangular signal and enabled only when a target pulse is detected. The automatic gain control circuit converts the ringing signal into pulse trains and, then, demodulates the pulse trains so that they occur on one or the other of two output lines. Which of the output lines carries the pulse trains is determined by whether or not the phase angle of the target is greater or less than the phase angle of the last detected target. The pulses control the application of positive or negative charges to an integrator whose output forms the feedback signal applied to the R modulator. In addition, the output of the integrator is made more readable by a logarithmic amplifier to create a TARGET IDENTITY signal that is more easily related to a target's identity.

The approximate depth of the target is determined by comparing the magnitude of the $V_{GB}$ signal with a series of voltage levels and using the result to control the magnitude of a current, which forms a TARGET DEPTH signal. The TARGET DEPTH signal and the TARGET IDENTITY signal are displayed, preferably on LCD bar graph displays positioned side-by-side so that the two displays can be simultaneously observed. The simultaneous observation of the two displays has the advantage of improving the identification of the target creating the displays. More specifically, some targets have similar phase angles—for example, pull tabs and five dollar gold coins. However, pull tabs are normally located near the surface of the ground whereas gold coins are more likely to be buried several inches in the ground. In the case of two such targets, the target depth display assists the target identification display by letting the user know if the target identified is near the surface of the ground or deep. If near the surface the target is more likely to be a pull tab than if the target is deep.

As will be readily appreciated by those familiar with TR type metal detectors with discrimination and ground effect rejection, no target signal is produced when the detector head of the metal detector described above is held in a stationary position with respect to a target. Rather a target signal is only produced when there is relative motion between the detector head and the target. In most instances such relative motion is produced by moving the detector head over the ground. Each time the detector head passes over the same target, the target identification display of the present invention becomes more and more accurate. In the case of the just described embodiment of the invention this result occurs because the output of the summer approaches closer to the ideal null state each time the detector head is moved over the same target because a vernier charge is added to or deleted from the capacitor of the integrator during each pass, until the desired null state is achieved.

Figure 16:
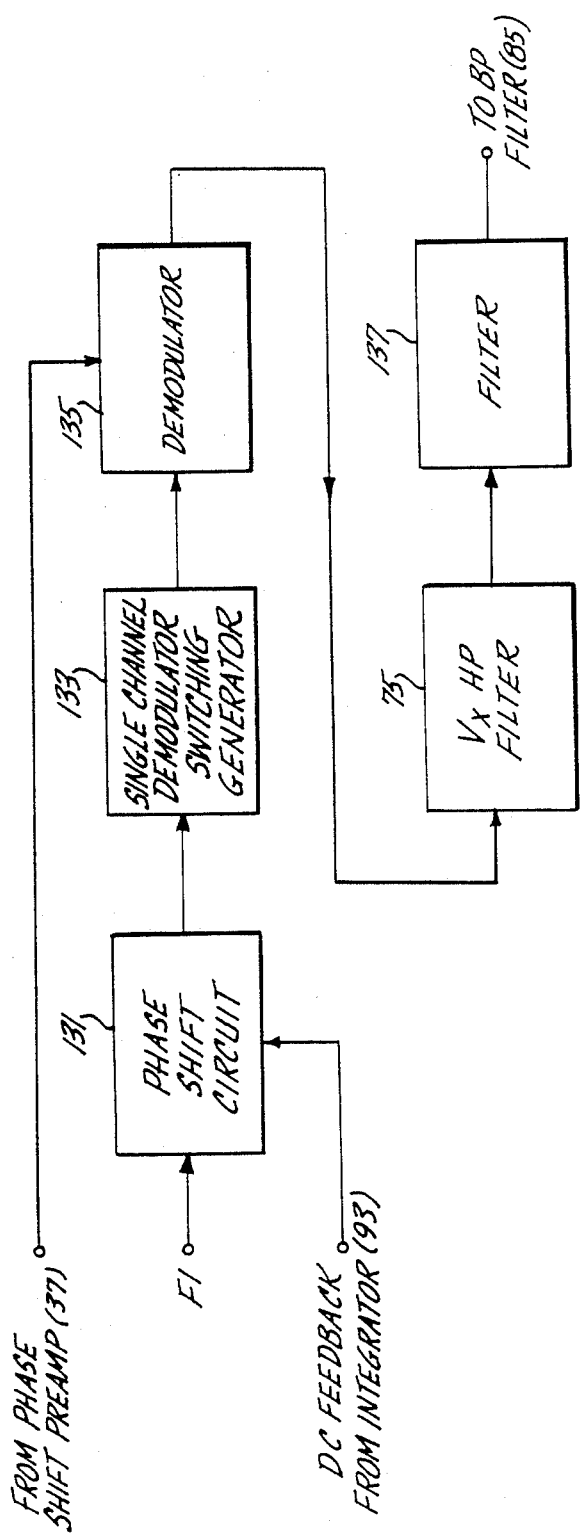
FIG. 16 is a block diagram illustrating a modification to the target identification subsystem illustrated in FIG. 3A required to form an alternative embodiment of the invention.

FIG. 16 is a block diagram illustrating how the target identifying subsystem of the signal processor 23 can be modified to produce and alternative embodiment of the invention. In accordance with this alternative embodiment of the invention, the $V_R$ highpass filter 77, the triangle wave generator 79 and the R modulator 83 are deleted; and, a phase shift circuit 131, a single channel demodulator switching generator 133 and a demodulator 135 are added. Further the summer 81 is changed to a simple filter 137 that performs the same function as the input filter (which receives the output of the $V_X$ highpass filter 73) of the summer 81. The phase shift circuit 131 receives the F1 signal produced by the oscillator and loop driver 33 of the signal production subsystem 21. Rather than being applied to the R modulator (which is no longer included), the feedback signal produced by the integrator 93 is applied to the phase shift control input of the phase shift circuit 131. The magnitude and polarity of the feedback signal control how much the F1 signal is phase shifted by the phase shift circuit 131. However, in this embodiment the feedback signal is related to the actual phase angle of the target as opposed to the tangent of the phase angle. If desired, the circuit components can be chosen so as to make the feedback/phase angle relationship linear. Moreover, the linear relationship reduces and may entirely eliminate the need for a logarithmic amplifier.

The output of the phase shift circuit 131 is connected to the single channel demodulator switching generator 133, which is essentially identical to one of the two channels of the demodulator switching generator 35 illustrated in FIG. 5 and heretofor described. Thus, the output of the single channel switching generator is a square wave signal having the same frequency as F1. The output of the single channel switching generator 133 is applied to the demodulation signal input of the demodulator 135. The output of the phase shift preamplifier 37 is applied to the unknown signal input of the demodulator 135. The demodulator 135 is similar to either the $V_X$ or the $V_R$ demodulator 39 and 41, illustrated in FIG. 5 and heretofore described. The output of the demodulator 135 is applied to the input of the $V_X$ highpass filter 75 and the output of the $V_X$ highpass filter is applied to the input of the filter 137. The output of the filter 137 is applied to the bandpass filter 85.

In general the alternative embodiment of the target identification subsystem illustrated in FIG. 16 and described above operates in a manner similar to the target identification system illustrated in FIG. 3A and previously described. The primary difference is that rather than summing two target signals and using a feedback signal to null the result of the combination, a single target signal is produced and the feedback signal is used to null the single signal. More specifically, the feedback signal of the modification illustrated in FIG. 16 controls the phase shift of the F1 signal created by the phase shift circuit such that the output of the demodulator is nulled. When this position is achieved the magnitude and polarity of the feedback signal is related to the phase angle of the target in substantially the same manner as the magnitude and polarity of the feedback signal of the previously described target identifying subsystem is related to the tangent of the phase angle of the target. Ground information is deleted from the output of the demodulator by the filters in the manner previously described. Further, the filters convert the target information from the pulse form produced by the demodulator 135 first into single sinusoid form (in the $V_X$ highpass filter 75), then into three pulse sinusoid form (in the filter 137) and finally into ringing signal form (in the bandpass filter 85 and the feedback highpass filter 87).

An obvious alternative to the target identifying subsystem illustrated in FIG. 16 and heretofor described is to adjust the phase shift circuit 131 to create a fixed amount of phase shift (or delete the phase shift circuit) and use the feedback signal to control the amount of phase shift produced by the phase shift preamplifier 37.

FIGS. 17-21 illustrate another alternative embodiment of a target identification subsystem suitable for use in the signal processor illustrated in FIG. 1. The target identification subsystem illustrated in FIG. 17 comprises: a $V_R$ highpass filter 201; a $V_R$ bandpass filter 203; a triangle amplitude modulator 205; an overdrive circuit 207; a pulse generator 209; a first inverter 211; a $V_X$ highpass filter 213; a $V_X$ bandpass filter 215; an amplifier 217; a second inverter 219; a pulse width modulator 221; a highpass window amplifier 223; a target window circuit 225; a bandpass amplifier 229; polarity comparators 231; a reference volage source 233; a demodulator 235; a lowpass filter 237; and, a buffer amplifier 239.

The $V_R$ signal is applied to the input of the $V_R$ highpass filter 201, which converts single pulse target signals into three sinusoidal pulses, i.e., a partially ringing signal. The output of the $V_R$ highpass filter is applied to the input of the $V_R$ bandpass filter 203, which converts the three pulse sinusoidal target signals into full ringing signals, i.e., decaying sinusoidal signals. These signals are applied to the triangle amplitude modulator 205 and to the overdrive circuit 207. The triangle amplitude modulator also receives the F2 signal produced by the oscillator and loop driver 33 (FIG. 2). The overdrive circuit also receives a signal from the $V_X$ channel, described below. The output of the overdrive circuit 207 is applied to the input of the pulse generator 209, which also receives a signal denoted F3 signal. The F3 signal is produced by the oscillator and loop driver circuit in the same manner as the F2 signal. In one actual embodiment the frequency of F3 was set to equal twice the frequency of F2. In this embodiment the frequency of F2 was adjusted to 412 Hz, whereby the frequency of F3 was 824 Hz. Unless disabled by the overdrive circuit in the manner hereinafter described, the pulse generator 209 produces reset pulses at the frequency of F3, which are applied to the triangle amplitude modulator 205 and through the first inverter 211 to the polarity converters 231.

The $V_X$ signal is applied to the $V_X$ highpass filter 213, which filters out a substantial part of any ground mineralization information contained in the $V_X$ signal and converts the target portion of the $V_X$ signal from pulse form into three sinusoidal pulses. These pulses are applied to the $V_X$ bandpass filter, which removes additional ground mineralization information and converts the target information from its three sinusoidal pulse form into ringing signal form. The ringing signal is amplified by the amplifier 217 and the result is applied to the second input of the overdrive circuit 207. The output of the amplifier 217 is also applied to the second inverter 219 and to the pulse width modulator 221. The output of the second inverter 219 is also applied to the pulse width modulator 221. Finally, the output of the triangle amplitude modulator 205 is applied to a third input of the pulse width modulator 221. In the manner hereinafter described, the pulse width modulator 221 produces three output signals, which are applied to the demodulator 235.

The output of the $V_R$ highpass filter is also applied to the input of the highpass window amplifier 223. The highpass window amplifier converts the three sinusoidal pulse target signals into a clamped signal, i.e., a partial ringing signal wherein the larger excursions of the signal are clamped to a predetermined voltage level. The output of the highpass window amplifier 223 is applied to the input of the target window circuit 225 and the output of the target window circuit, which is a wide pulse whose length is determined by the length of the clamped ringing signal produced at the output of the highpass window amplifier is applied to a further input of the polarity comparators 231.

The output of the $V_R$ bandpass filter 203 is also applied to the input of the bandpass amplifier 229, which amplifies the signal to a suitable level. The output of the bandpass amplifier 229 is applied to the polarity comparators 231. The polarity comparators produce two output signals, denoted positive ($+$) and negative ($-$). These signals are applied to the demodulator 235, which also receives positive and negative reference voltages from the reference voltage source 233. The output of the demodulator 235 is applied to the lowpass filter 237 and the output of the lowpass filter is applied to the buffer amplifier 239. The TARGET IDENTITY signal is formed at the output of the buffer amplifier 239.

Figure 17:
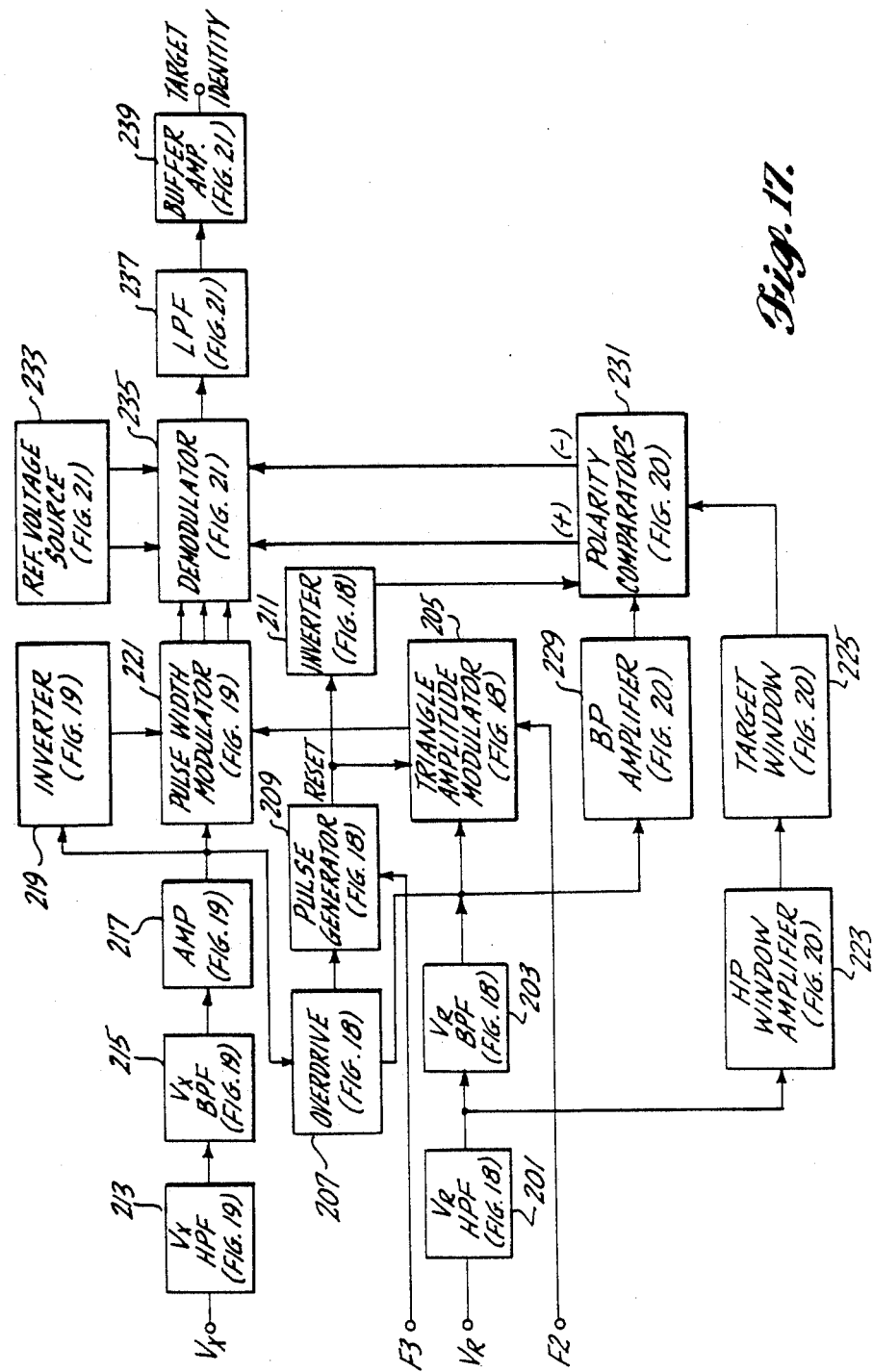
FIG. 17 is a block diagram of an alternative embodiment of the target identification subsystem illustrated in FIG. 3A.

Turning now to a description of the operation of the target identification subsystem illustrated in FIG. 17, the ground portion or component of the $V_X$ signal is slowly varying, as illustrated in FIG. 13, line C. The majority of this component of the $V_X$ signal is removed by the $V_X$ highpass and $V_X$ bandpass filters. (As with the embodiment of the invention illustrated in FIG. 3A, both of these filters have steep low frequency roll-off characteristics.) Conversely, the quickly changing target pulse, which forms the other component of the $V_X$ signal when the detector head passes over a target, passes nearly unattenuated through the $V_X$ highpass and the $V_X$ bandpass filters and, as previously noted, first takes on the form of three sinusoidal pulses, i.e., three pulses of alternate polarity (at the output of the $V_X$ highpass filter) and, then, the form of an exponentially decaying sinusoid (at the output of the $V_X$ bandpass filter). Similar action occurs in the $V_R$ highpass and bandpass filters. As with the previously described target identification subsystem the filters are all designed such that phase correlation is maintained as the $V_X$ and $V_R$ target signals are manipulated in the manner just described.

The two decaying sinusoidal signals produced at the outputs of the $V_R$ and $V_X$ bandpass filters when the detector head passes over a target are divided in a divider that is only made operative during the period of time the sinusoidal signals are present and have excursions that exceed a preset voltage level. More specifically, the divider is only enabled when the highpass window amplifier 223 receives a highpass filtered $V_R$ signal of suitable amplitude. Such a signal causes the highpass window amplifier to produce an output that enables the target window circuit, which, in turn, enables the polarity comparators 231. The enablement period is determined by how long the amplified signal lies above a window level set by the target window circuit. Thus, the output of the target window is shorter than the duration of the ringing signal occurring on output of the $V_R$ bandpass filter 203 when the detector head passes over a target, resulting in a reduction in ground mineralization errors.

When the polarity comparators are enabled by the target window circuit, they compare the positive and negative excursions of the output of the bandpass amplifier 229 with fixed reference levels. Each comparison creates a square pulse at the related positive or negative output of the polarity comparators. The square pulses alternate and have a dead zone between their trailing and leading edges. That is, the pulse on one output (e.g., the positive output) ends before the next pulse on the other output (e.g., the negative output) begins and vise versa. The positive (+) and negative (−) pulses are used by the demodulator to demodulate the output of the pulse width modulator 221.

The triangle amplitude modulator modulates the output of the $V_R$ bandpass filter at the frequency of F2. Preferably the frequency of F2 is twenty (20) or more times the frequency the ringing signal produced on the output of the $V_R$ highpass filter when the detector head passes over the target. The triangle amplitude modulator also converts the modulation pulses to triangular pulses. While the triangular pulses formed at the output of the triangle amplitude modulator do not necessarily have to have a pure triangular form, any variation from this ideal form increases the nonlinearity of the TARGET IDENTITY signal.

The triangle amplitude modulation output signal is used in the pulse width modulator to modulate the output of the amplifier 217. The results of the modulation are a plurality of signals (hereinafter described) that are demodulated in the demodulator 235. The output of the demodulator is a series of pulses whose polarity and charge content contain the desired tangent of the target phase angle information. The tangent of the phase angle information is converted into DC form by the lowpass filter 237.

In essence, the polarity comparators, the demodulator and the lowpass filter create a relatively long time constant filter. The time constant is many times the duration of the target pulse produced when the detector head is swept over a target and results from the fact that the demodulator sends pulses to the lowpass filter only when a target signal is present. The charge holding capacitor of the filter holds the accumulated charge during the period of time cathat a target signal is absent. This accumulation of charge technique results in the capacitor voltage approaching more closely the true target tangent of the phase angle voltage each time a target pulse is produced as the detector head is swept back and forth over the same target, as also occurs in the previously described embodiments of the target identification subsystem.

Figure 18:
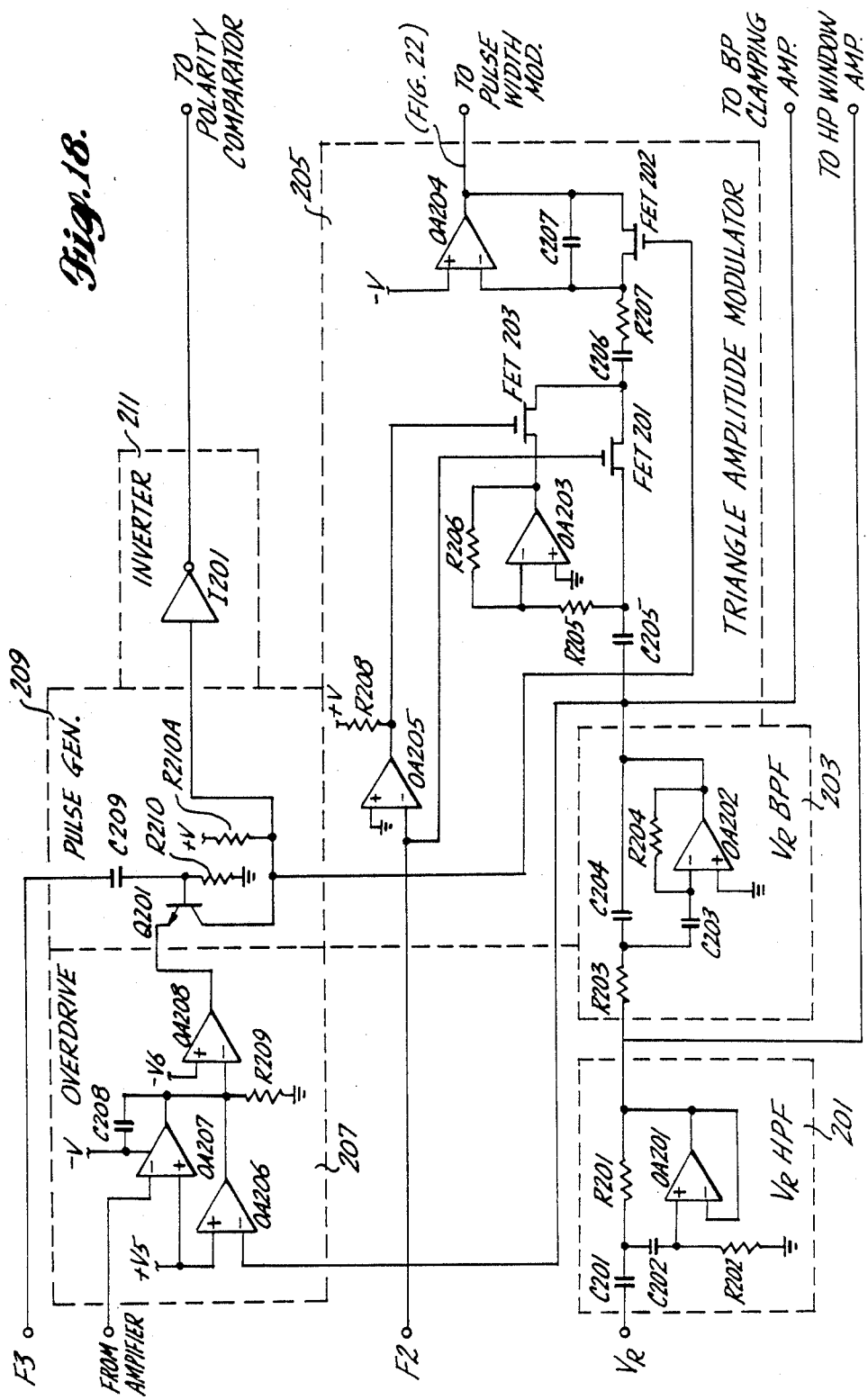
FIG. 18 is a schematic diagram of a $V_R$ highpass filter, a $V_R$ bandpass filter, a triangle modulator, an overdrive circuit, a pulse generator and a first inverter suitable for use in the target identification subsystem illustrated in FIG. 17.

FIG. 18 is a schematic diagram illustrating preferred embodiments of: the $V_R$ highpass filter 201; the $V_R$ bandpass filter 203; the triangle amplitude modulator 205; the overdrive circuit 207; the pulse generators 209; and, the first inverter 211 of the target identification subsystem illustrated in FIG. 17. The $V_R$ highpass filter 201 illustrated in FIG. 18 comprises: two capacitors designated C201 and C202; two resistors designated R201 and R202; and, an operational amplifier designated OA201. The $V_R$ signal is applied through C201 connected in series with C202 and R202 in that order, to ground. The junction between C202 and R202 is connected to the noninverting input of OA201. The output of OA201 is connected through R201 to the junction between C201 and C202. The output of OA201 is also connected to the inverting input of OA201. The $V_R$ highpass filter, as previously noted, has a steep low frequency roll-off characteristic and converts the $V_R$ signal produced when the detector head passes over a metallic target from single pulse form into three sinusoidal pulses of alternating polarity.

The $V_R$ bandpass filter 203 comprises: two resistors designated R203 and R204; two capacitors designated C203 and C204; and, an operational amplifier designated OA202. The output of OA201 of the $V_R$ highpass filter 201 is applied through R203 in series with C203 to the inverting input of OA202. The noninverting input of OA202 is connected to ground. The output of OA202 is connected through R204 to the inverting input of OA202 and through C204 to the junction between R203 and C203. As noted above, the $V_R$ bandpass filter has a step low frequency roll-off characteristics and converts the three pulse sinusoidal signal produced by the $V_R$ highpass filter when the detector head passes over a target into a ringing signal, i.e., a decaying sinusoidal signal.

The triangle amplitude modulator 205 comprises: three capacitors designated C205, C206 and C207; four resistors designated R205, R206, R207 and R208; two operational amplifiers designated OA203 and OA204; a comparator OA205; and, three insulated gate field effect transistor switches designated FET201, FET202 and FET203. The output of OA202 of the $V_R$ bandpass filter 203 is applied through C205 in series with R205 to the inverting input of OA203. The noninverting input of OA203 is connected to ground. R206 is connected between the output of OA203 and the inverting input of OA203. The junction between C205 and R205 is connected to the source terminal of FET201. The output of OA203 is connected to the source terminal of FET203. The drain terminals of FET201 and FET203 are connected together and through C206 in series with R207 to the source terminal of FET202 and to the inverting input of OA204. The drain terminal of FET202 is connected to the output of OA204. The noninverting input of OA204 is connected to −V. C207 is connected between the output of OA204 and the inverting input of OA204. The signal applied to the pulse width modulator is formed on the output of OA204. The F2 signal is applied to the inverting input of OA205 and to the gate terminal of FET201. The noninverting input of OA205 is connected to ground and the output of OA205 is connected through a pull up resistor, R208, to +V. The output of OA205 is also connected to the gate of FET203. Finally, the output of the hereinafter described pulse generator 209 is connected to the gate of FET202.

The ringing signals produced at the output of the $V_R$ bandpass filter 203 when the detector head passes over a target are further filtered by C205, which, essentially, forms another highpass filter. The filtered signal is then inverted by R205, R206 and OA203. In this regard, the resistance value of R205 equals the resistance value of R206. Thus, the same signals are applied to the source terminals of FET201 and FET203, except that they are 180 degrees out of phase. The F2 signal applied to the triangle amplitude modulator 205 is inverted by OA205 and R208. Thus, FET201 and FET203 are alternately switched open and closed. As a result, the signal at the junction of the drain terminals of FET201 and FET203 is a modulated double sideband signal. That is, the signal is a series of alternating positive and negative pulses whose magnitude tracks the magnitude of the pulses that form the ringing signal (not the envelope of the ringing signal as in the triangle modulator 67). C206 couples the pulses to an integrator formed by R207, C207 and OA204; and, removes any DC component from the modulated signal. The integrator converts the pulses into triangular waves. As noted above and described more fully below, the pulse generator 209 produces short pulses at the frequency of F3, which is twice the frequency of F2. Each time such a pulse occurs FET202 is turned on and shorts the charge on C207. In this way the integrator is zeroed prior to each triangular pulse being produced. The end result is a bi-polar triangular wave whose magnitude tracks the magnitude of the pulses that formed the original ringing signal, as illustrated in FIG. 22.

The overdrive circuit 207 comprises: a capacitor designated C208; a resistor designated R209; and, three comparators designated OA206, OA207 and OA208. The output of the $V_R$ bandpass filter 203 is connected to the inverting input of OA206. The noninverting input of OA206 is connected to a positive reference voltage designated +V5. The output of the amplifier 217 is applied to the inverting input of OA207. The noninverting input of OA207 is connected to +V5. The outputs of OA206 and OA207 are connected together and through R209 to ground. The outputs of OA206 and OA207 are also connected through C208 to −V. C208 and R209 form a filter that filters the output of OA206 or OA207. The junction between C208 and R209 is connected to the inverting input of OA208. The noninverting input of OA208 is connected to a negative voltage source designated −V6. In operation, as long as neither the output of the $V_R$ bandpass filter nor the output of the amplifier 217 exceed +V5, the outputs of OA206 and OA207 are high. In the event that either of these signals exceeds +V5, the output of the related comparator operational amplifier, i.e., the related one of OA206 or OA207 shifts low. That is, the output of the appropriate one of OA206 or OA207 shifts states. This state shift is compared in OA208 with −V6 and, if suitably low, causes the output of OA208 to shift from a normal low negative state to a high state, which inhibits the operation of the pulse generator as hereinafter described.

The pulse generator 209 comprises: a capacitor designated C209; two resistors designated R210 and R210A; and an NPN transistor designated Q201. The F3 signal is applied through C209 in series with R210 to ground. The junction between C209 and R210 is connected to the base of Q201. The emitter of Q201 is connected to the output of OA208 to the overdrive circuit 207. The collector of Q201 is connected to the gate of FET202 of the triangle amplitude modulator and to the first inverter 211 and through a pull up resistor, R210A, to +V. In normal operation, i.e., the overdrive circuit is not inhibiting the operation of the pulse generator, each negative transition of the F3 signal gates Q201 off for a short period of time, which creates a positive pulse on the collector of Q201. This positive pulse is of short duration compared to the period of F3—100 microseconds, for example. Since the frequency of F3 is twice the frequency of F2, two pulses occur during each F2 cycle. As noted above, these pulses zero the integrator of the triangle amplitude modulator 205. When the overdrive circuit is actuated by either the output of the $V_R$ bandpass filter 203 or the output of the amplifier 217 exceeding the level set by +V5, Q201 is biased off at its emitter terminal, whereby the flow of pulses to the triangle amplitude modulator terminates. More importantly, the collector of Q201 shifts high, whereby FET202 is gated closed and the integrator of the triangle amplitude modulator 205 is held in a zero state.

The first inverter 211 comprises a single inverter designated I201. I201 inverts the pulses produced by the pulse generator 209 and applies the inverted pulse to the polarity comparators 231 where they are used in the manner hereinafter described.

Figure 19:
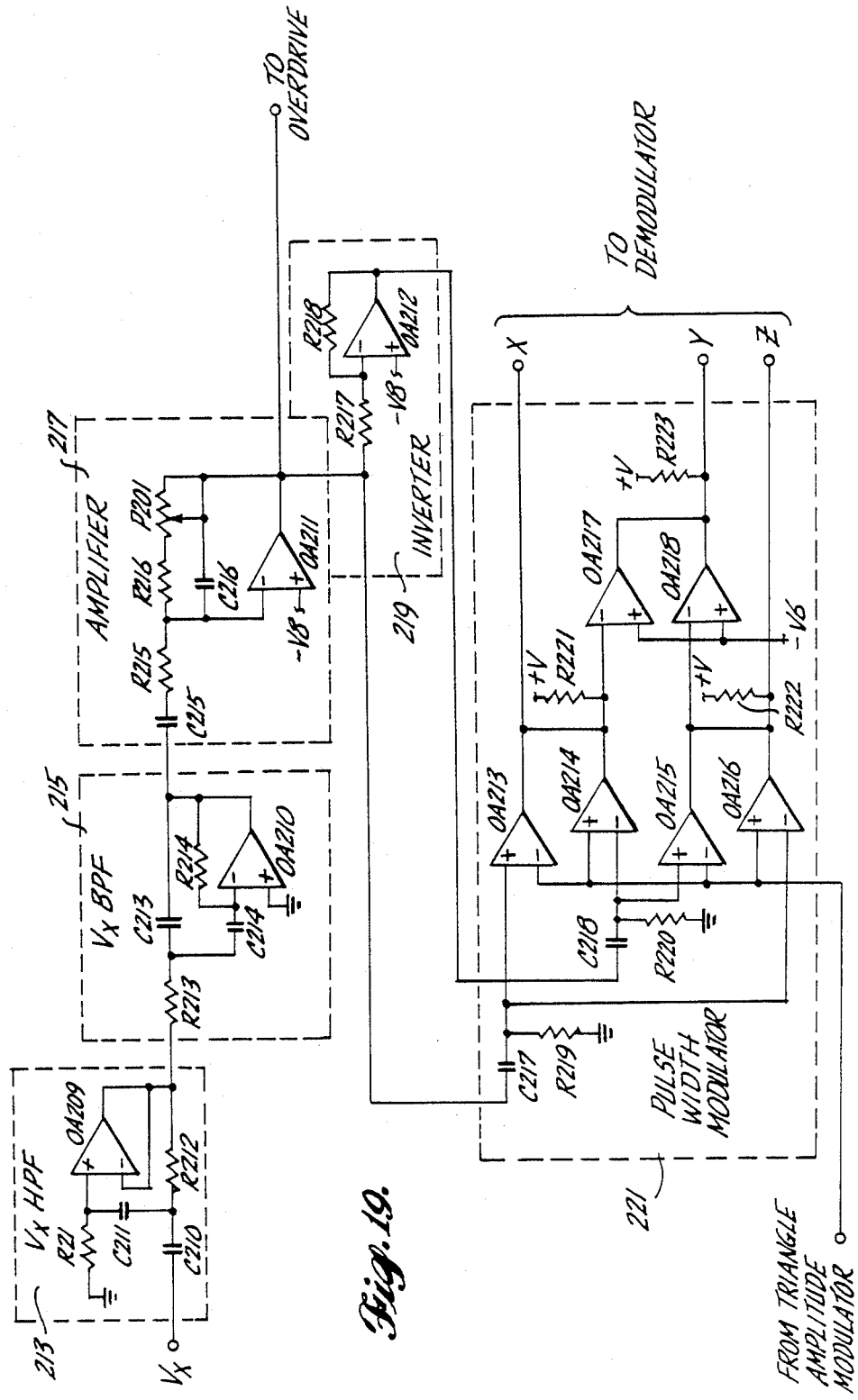
FIG. 19 is a schematic diagram of a $V_X$ highpass filter, a $V_X$ bandpass filter, an amplifier, a second inverter and a pulse width modulator suitable for use in the target identification subsystem illustrated in FIG. 17.

FIG. 19 is a schematic diagram illustrating preferred embodiments of: the $V_X$ highpass filter 213; the $V_X$ bandpass filter 215; the amplifier 217; the second inverter 219; and, the pulse width modulator 221 illustrated in block form in FIG. 17. The $V_X$ highpass filter 213 comprises: two capacitors designated C210 and C211; two resistors designated R211 and R212; and an operational amplifier designated OA209. The $V_X$ signal is applied through C210 in series with C211 and R211 in that order to ground. The junction between C211 and R211 is connected to the noninverting input of OA209. The junction between C210 and C211 is connected through R212 to the output of OA209. The output of OA209 is also connected to the inverting input of OA209. As noted above, the $V_X$ highpass filter has a steep low frequency roll-off characteristic. The $V_X$ highpass filter eliminates a substantial portion of the ground information from the $V_X$ signal and converts the target information from single pulse form into three sinusoidal pulses of alternating polarity.

The $V_X$ bandpass filter 215 comprises: two resistors designated R213 and R214; two capacitors designated C213 and C214; and, an operational amplifier designated OA210. The output of the $V_X$ highpass filter, i.e., the output of OA209, is applied through R213 in series with C214 to the inverting input of OA210. The noninverting input of OA210 is connected to ground. R214 is connected between the output of OA210 and the inverting input of OA210. The output of OA210 is also connected through C213 to the junction between R213 and C214. As noted above, the $V_X$ bandpass filter eliminates additional ground information from the filtered $V_X$ signal and converts the target component of the $V_X$ signal from three sinusoidal pulse form into a ringing signal.

The amplifier 217 comprises two capacitors designated C215 and C216; two resistors designated R215 and R216; a potentiometer designated P201; and, an operational amplifier designated OA211. The output of the $V_X$ bandpass filter, i.e., the output of OA210, is applied through C215 in series with R215 to the inverting input of OA211. The noninverting input of OA211 is connected to −V8. C216 is connected between the output of OA211 and the inverting input of OA211. The output of OA211 is also connected to one end of P201 and to the adjustable contact of P201. The other end of P201 is connected through R216 to the inverting input of OA211. The amplifier 217 highpass filters and raises the amplitude of the output of the $V_X$ bandpass filter 215 to a suitable level and applies the result to the overdrive circuit 207 (FIG. 18), described above, and to the second inverter 219 and the pulse width modulator 211, described below.

The second inverter 219 comprises two resistors designated R217 and R218; and an operational amplifier designated OA212. The output of OA211 of the amplifier 217 is applied through R217 to the inverting input of OA212. R218 is connected between the output of OA212 and the inverting input of OA212. The noninverting input of OA212 is connected to −V8. In a conventional manner the second inverter 219 inverts the ringing signals produced on the output of the amplifier 217 when the detector head passes over a target.

The pulse width modulator 221 comprises: two capacitors designated C217 and C218; five resistors designated R219, R220, R221, R222 and R223; and, six comparators designated OA213 through OA218. The output of OA211 of the amplifier 217 is connected through C217 in series with R219 to ground. The junction between C217 and R219 is connected to the noninverting input of OA213 and to the inverting input of OA216. The output of the second inverter 219 is connected through C218 in series with R220 to ground. The junction between C218 and R220 is connected to the inverting input of OA214 and to the noninverting input of OA215. The output of the triangle amplitude modulator 205 (FIG. 18) is connected to: the inverting input of OA213; the noninverting input of OA214; the inverting input of OA215; and, the noninverting input of OA216. The outputs of OA213 and OA214 are connected together and through a pull up resistor, R221, to +V. The outputs of OA213 and OA214 also form one of the outputs (denoted X) of the pulse width modulator and are applied to the inverting input of OA217. The outputs of OA215 and OA216 are connected together and through a pull up resistor, R222, to +V. The outputs of OA215 and OA216 also form one of the outputs (denoted Z) of the pulse width modulator 221 and are connected to the inverting input of OA218. The noninverting inputs of OA217 and OA218 are connected to −V6. The outputs of OA217 and OA218 are connected together and through a pull up resistor, R223, to +V. The outputs of OA217 and OA218 form the third output (denoted Y) of the pulse width modulator 221.

As will be readily appreciated from the foregoing description of the amplifier 217 and the inverter 219, the output signal of the inverter is 180 degrees out of phase with the output signal of the amplifier. C217 in combination with R219 and C218 in combination with R220 remove any DC component from these two anti-phase signals. Further, these signals are AC coupled by C217 and C218 to the inputs of OA213 and OA214, wherein they are compared with the output of the triangle amplitude modulator 205. In this regard, the circuit components must be chosen such that the $V_R$ ringing excursions tracked by the output of the triangle amplitude modulator (as previously described) are in (or 180 degrees out of) phase with the ringing signal produced at the output of the amplifier 217 when the detector head passes over a target. Further, the circuit components must be chosen such that the magnitude of the envelope of the output of the triangle amplitude modulator exceeds the magnitude of the ringing signals produced by the amplifier, and the ringing signals occurring at the output of the second inverter 219. If the latter condition is not met the comparators may be saturated, whereby an erroneous result will be produced.

Figure 23:
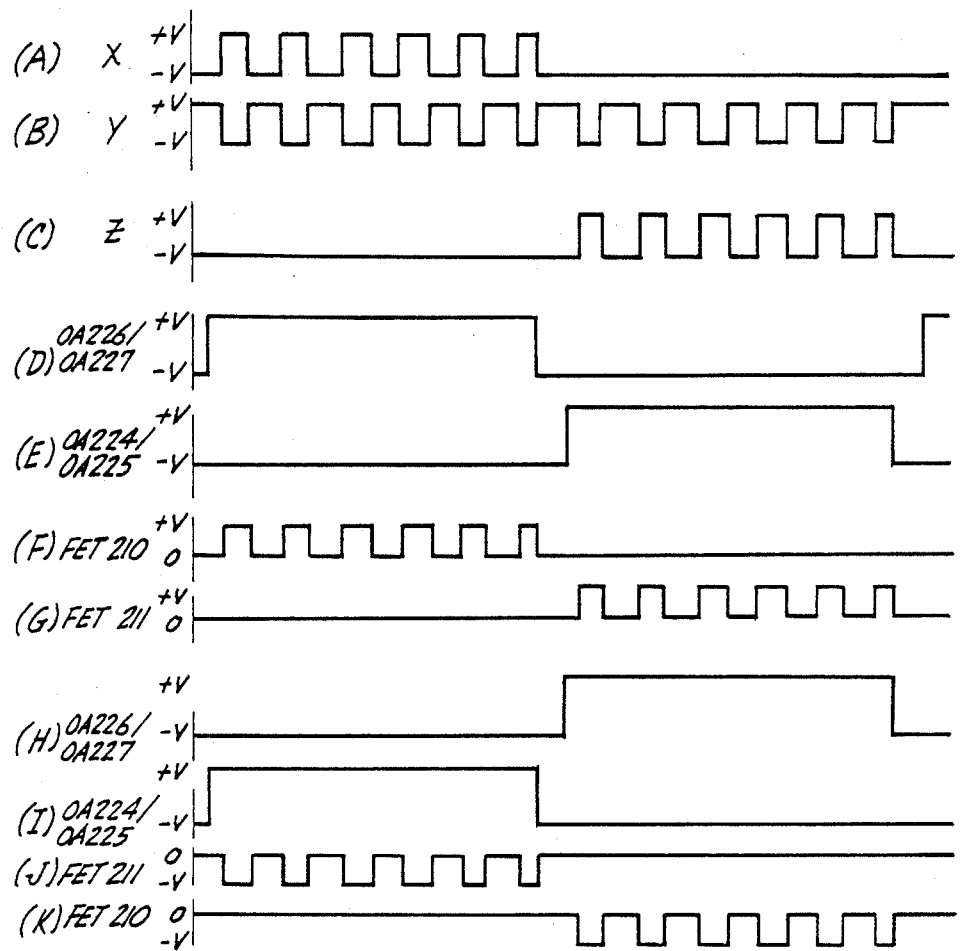

Depending upon the polarity of the output of the amplifier 217 either the upper pair of comparators (e.g., OA213 and OA214) or the lower pair of comparators (e.g., OA215 and OA216) located at the front end of the pulse width modulator are operative. The other pair are inoperative. Specifically, when the output of the amplifier 217 is positive the upper pair, OA213 and OA214, are operative and the lower pair, OA215 and OA216, are inoperative. When the output of the amplifier 217 is negative, the lower pair, OA215 and OA216, are operative and the upper pair, OA213 and OA214, are inoperative. The operative pair of comparators produce a series of pulses at the frequency of the triangular wave signal produced by the triangle amplitude modulator, as that signal rises and falls. The width of these pulses is directly related to the tangent of the phase angle of the target. The pulse height, however, is fixed as shown in FIG. 23, lines A and C. Thus, the voltage amplitude of the pulses is not related to the tangent of the phase angle of the target, only the width of the pulses is so related.

OA217 and OA218 from an OR circuit that combines and inverts the outputs of the comparator pairs and applies the result to output line Y. Thus, output line Y carries an inverted version of all of the pulses alternately carried an output lines X and Z.

Figure 20:
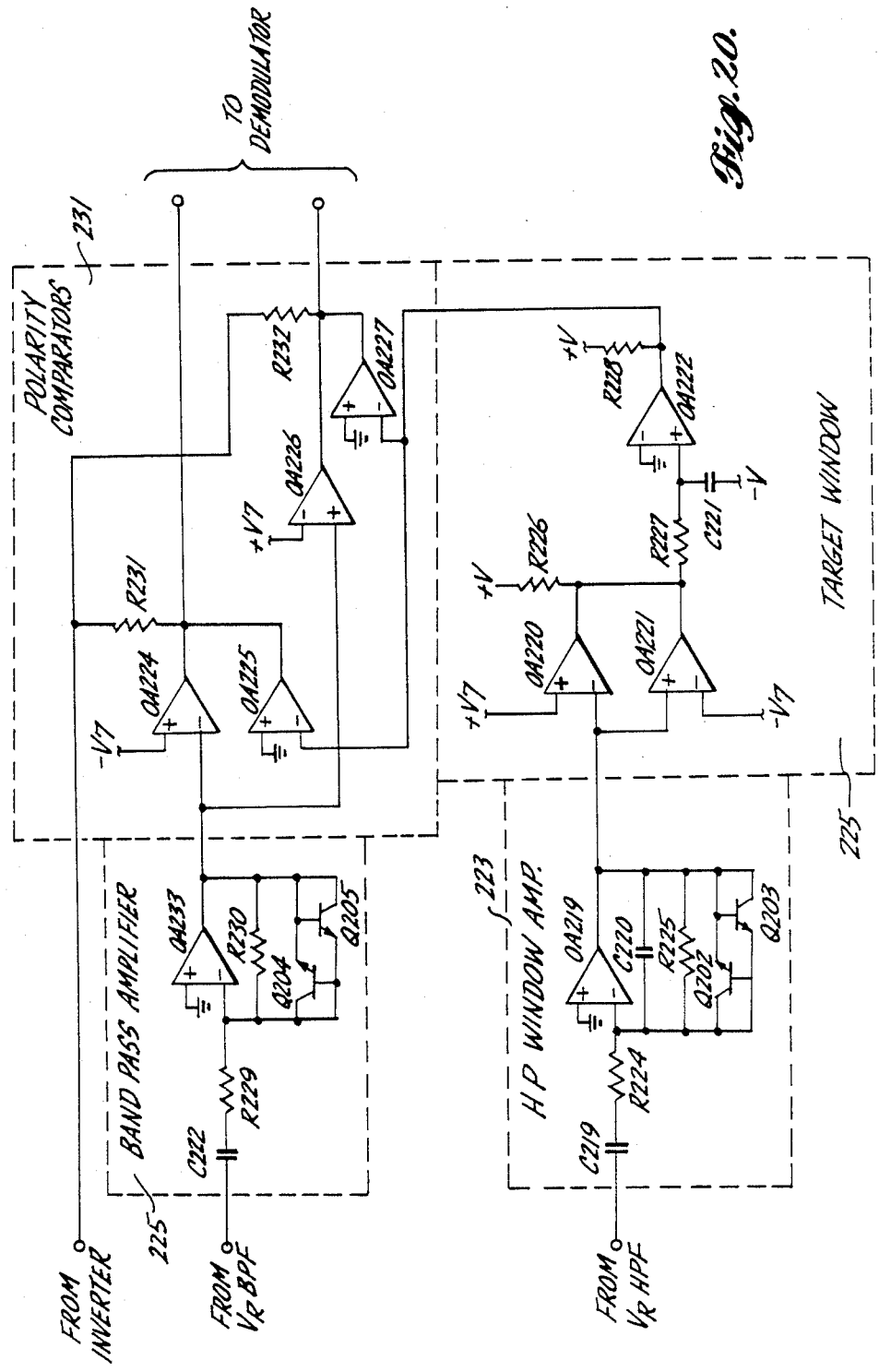
FIG. 20 is a schematic diagram of a highpass window amplifier, a target window circuit, a bandpass amplifier and polarity comparators suitable for use in the target identification subsystem illustrated in FIG. 17.

FIG. 20 is a schematic diagram illustrating preferred embodiments of: the highpass window amplifier 223; the target window circuit 225; the bandpass amplifier 229; and, the polarity comparators 231 illustrated in FIG. 17. The highpass window amplifier 223 comprises: two capacitors designated C219 and C220; two resistors designated R224 and R225; an operational amplifier designated OA219; and, two NPN transistors designated Q202 and Q203. The output of the $V_R$ highpass filter is applied through C219 in series with R224 to the inverting input of OA219. The noninverting input of OA219 is connected to ground. C220 and R225 are connected in parallel between the output of OA219 and the inverting input of OA219. The inverting input of OA219 is also connected to the collector and base of Q202 and to the emitter of Q203; and, the output of OA219 is connected to the collector and base of Q203 and to the emitter of Q202. As will be readily appreciated from the foregoing description of similar circuits contained in the R window circuit 63 (FIG. 7) and the enable circuit 71 (FIG. 8), the highpass window amplifier amplifies voltage of OA219 to a predetermined maximum level. Thus, the output of the highpass window amplifier is a clamped ringing signal that occurs when the detector head passes over a target.

The target window circuit 225 comprises: three comparators designated OA220, OA221 and OA222; three resistors designated R226, R227 and R228; and, a capacitor designated C221. The output of the highpass window amplifier 223, i.e., the output of OA219, is applied to the inverting input of OA220 and to the noninverting input of OA221. The noninverting input of OA220 is connected to a positive voltage source designated +V7 and the inverting input of OA221 is connected to a negative voltage source designated −V7. The outputs of OA220 and OA221 are connected together and through a pull up resistor, R226, to +V. The outputs of OA220 and OA221 are also connected through R227 in series with C221 to −V. The junction between R227 and C221 is connected to the noninverting input of OA222. The inverting input of OA222 is connected to ground. The output of OA222 is connected through a pull up resistor, R228, to +V. OA220 and OA221 are comparators that function in the same manner as OA21 and OA22 of the enable circuit 71 illustrated in FIG. 8 and previously described. Since the input signal applied to OA220 and OA221 is substantially the same as the input signal applied to OA21 and OA22 when the detector head passes over a target, namely a clamped ringing signal, a filtered version of a window signal of the type in FIG. 12I is produced at the common output of OA220 and OA221. Specifically, the short pulse excursions present in the unfiltered window signal are filtered out by a filter formed by R226, R227 and C221. Thus, the output of OA222 is a long pulse signal that shifts from a first state to a second state and remains in the second state during the entire period of time the excursions of the output of the highpass window amplifier exceed +V7 and −V7, rather than including short excursions from the second state back to the first state.

The bandpass amplifier 229 comprises: a capacitor designated C222; two resistors designated R229 and R230; an operatonal amplifier designated OA223; and, two NPN transistors designated Q204 and Q205. The ringing signal produced at the output of the $V_R$ bandpass filter when the detector head passes over a target is applied through C222 and R229 to the inverting input of OA223. The noninverting input of OA223 is connected to ground. R230 is connected between the output and the inverting input of OA223. The inverting input of OA223 is also connected to the collector and base of Q204 and to the emitter of Q205. The output of OA223 is also connected to the collector and base of Q205 and to the emitter of Q204. The bandpass amplifier amplifies the $V_R$ bandpass signals and limits the excursions of the amplified signal to a maximum level set by the clamping action of Q204 and Q205. Thus, the output of the bandpass amplifier 229 is a clamped ringing signal.

The polarity comparators 231 comprise: four comparators designated OA224, OA225, OA226 and OA227; and, two resistors designated R231 and R232. The output of the target window circuit 225, i.e., the output of OA222, is connected to the inverting inputs of OA225 and OA227. The noninverting inputs of OA225 and OA227 are connected to ground. The output of the bandpass amplifier, i.e., the output of OA223, is connected to the inverting input of OA224 and to the noninverting input of OA226. The noninverting input of OA224 is connected to −V7; and, the inverting input of OA226 is connected to +V7. The outputs of OA224 and OA225 are connected together and through R231 to the output of the first inverter 211. Finally, the outputs of OA226 and OA227 are connected together and through R232 to the output of the first inverter 211. The combined outputs of OA224 and OA225 form one of the outputs of the polarity comparators 231 and the combined outputs of OA226 and OA227 form the other output.

During the period of time that the target window circuit 225 produces a long window pulse, the outputs of the bandpass amplifier 229 are compared with −V7 and +V7, respectively. During the period of time that the magnitude of the output of the bandpass filter exceeds one or the other of these voltages, the output of the related comparator (e.g., OA224 or OA226) switches states and creates a pulse on the associated output line. Thus pulses are alternately created on the two output lines of the polarity comparators. +V7 and −V7 have relatively low values, e.g., 200 millivolts, and create a dead zone between the trailing edge of one pulse and the leading edge of the next pulse. These pulses control the switching of the demodulator in the manner hereinafter described. If the magnitude of one or the other signals applied to the overdrive circuit 207 (FIG. 18) reaches a level that disables the pulse generator and, thus, the operation of the triangle amplitude modulator, the inverter 211 switches to an output state that inhibits the production of pulses by the polarity converters 231. This result occurs because the output shift of the overdrive circuit from a low (negative) state to a high state, which biases Q201 off causes the output of the first inverter 211 to shift from a high state to a low state. As a result, the outputs of OA224 and OA226 are forced to remain low for the duration of the reset pulse. A similar result is produced in the absence of a target window signal being produced by the target window circuit 225 via OA225 and OA227.

Figure 21:
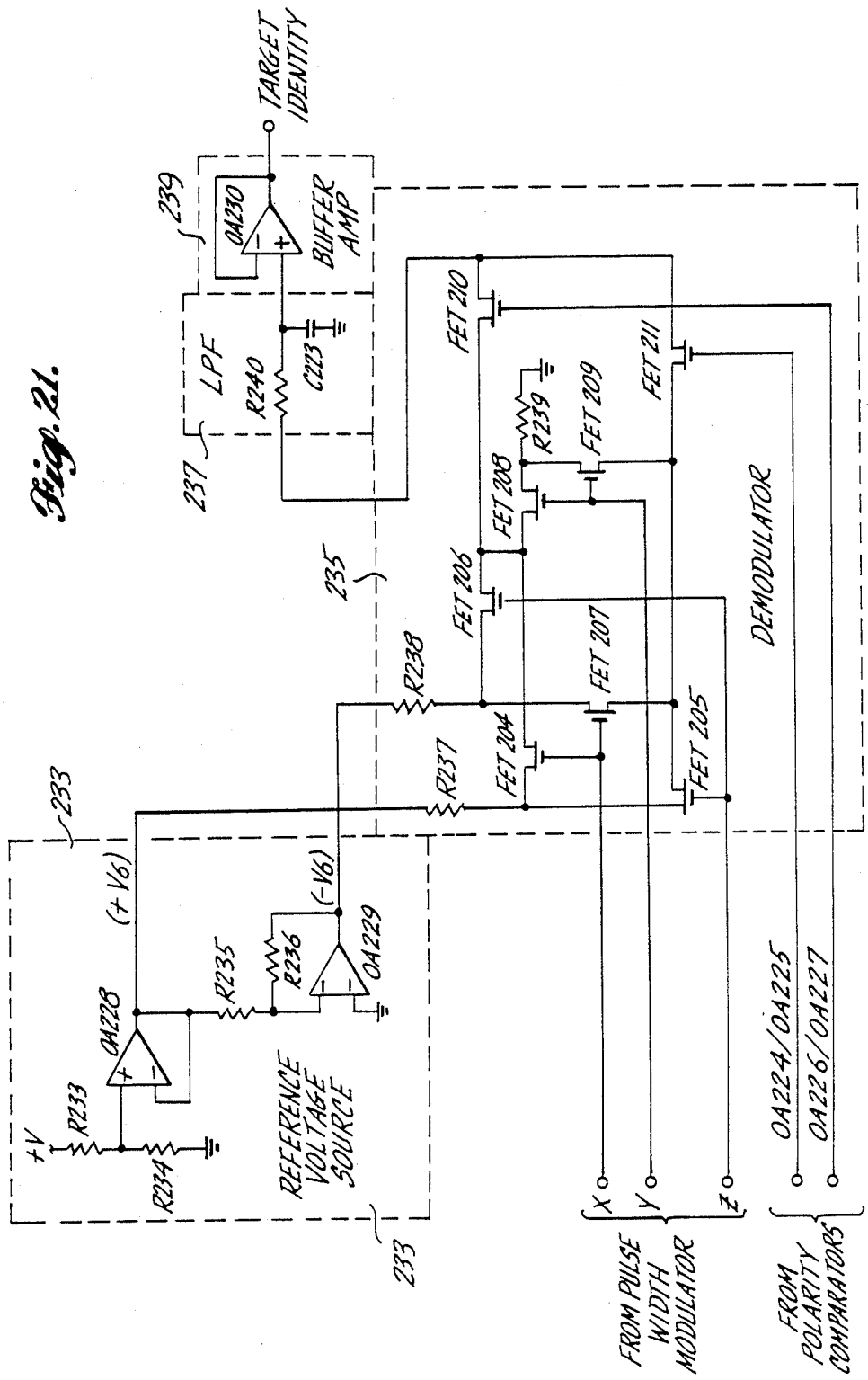
FIG. 21 is a schematic diagram of a reference voltage circuit, a demodulator, a lowpass filter and a buffer amplifier suitable for use in the target identification subsystem illustrated in FIG. 17.

FIG. 21 is a schematic diagram of preferred embodiments of: the reference voltage source 223; a demodulator 235; the lowpass filter 237; and, the buffer amplifier 239 illustrated in FIG. 17. The reference voltage source 233 comprises: four resistors designated R233, R234, R235 and R236; and, two operational amplifiers designated OA228 and OA229. R233 is connected in series with R234 between +V and ground. The junction between R233 and R234 is connected to the noninverting input of OA228. The output of OA228 is connected to the inverting input of OA228 and through R235 to the inverting input of OA229. The noninverting input of OA229 is connected to ground. R236 is connected between the output of OA229 and the inverting input of OA229. OA228 is a buffer amplifier that buffers the voltage at the junction between R233 and R234 and produces a positive voltage of predetermined magnitude at its output. The resistance of R235 is equal to the resistance of R236 whereby OA229 inverts the output of OA228 and produces a negative voltage equal in magnitude to the positive voltage produced by OA228.

The demodulator 235 comprises: three resistors designated R237, R238 and R239; and, eight insulated gate field effect transistor switches designated FET204 through FET211. The positive output of the reference voltage source, i.e., the output of OA228, is connected through R237 to the source terminals of FET204 and FET205. The negative output of the reference voltage source, i.e., the output of OA229, is connected through R238 to the drain terminals of FET206 and FET207. The drain terminal of FET204 and the source terminal of FET206 are connected together and to the source terminal of FET208. The drain terminal of FET205 and the source terminal of FET207 are connected together and to the source terminal of FET209. The drain terminals of FET208 and FET209 are connected together and through R239 to ground. The connection between the noted terminals of FET204, FET206 and FET208 is also connected to the source terminal of FET210. Similarly, the connection between the noted terminals of FET205, FET207 and FET209 is also connected to the source terminal of FET211. The drain terminals of FET211 and FET210 are connected together and to the lowpass filter 237. The gate terminals of FET204 and FET207 are connected to the X output of the pulse width modulator; the gate terminals of FET205 and FET206 are connected to the Z output of the pulse width modulator; and, the gate terminals of FET208 and FET209 are connected to the Y output of the pulse width modulator. The gate terminal of FET210 is connected to the common output of OA226 and OA227 of the polarity comparators; and, the gate terminal of FET211 is connected to the common output of OA224 and OA225 of the polarity comparators.

In essence, the demodulator demodulates the signals produced by the pulse width modulator when the detector head passes over a target and uses the result to control the application of positive or negative pulses to the lowpass filter 237. The magnitude of the pulses is controlled by the magnitude of the positive (+) and negative (−) outputs of the reference voltage source and the width of the pulses is controlled by the width of the pulses produced by the pulse width modulator. As a result, the width information that, as noted above, is related to the tangent of the phase angle of the target, is recovered in the lowpass filter. In this regard, it should be recalled that while the width of the pulses produced by the pulse width modulator is related to the tangent of the phase angle of the target, the voltage amplitude of these pulses is not so related since the magnitude of the pulses is fixed. As will also be recalled, the polarity comparator signals alternately shift from a low state to a high state (with a dead zone therebetween) at the frequency of the ringing signal produced on the output of the bandpass amplifier 229 when the detector head passes over a target. This frequency is the same as the frequency of the ringing signal produced on the output of the amplifier 217. Moreover, these two ringing signals are in phase, or 180 degrees out of phase, with one another. As a result, the presence of pulses on the X and Z output lines of the pulse width modulator is phase related to the outputs of the polarity comparators. That is, when one of the outputs of the polarity comparators is high one or the other of the X and Z output lines carries pulses and the other has none. When the outputs of the polarity comparators switch states, the other one of the X and Z output lines carries the pulses. It is the phase relationship between the presence of pulses on the X and Z output lines and the polarity comparator signals that controls the demodulation action of the demodulator 235. Specifically, if the pulses are occurring on line X (FIG. 23, line A) and the outputs of OA22-6/OA227 of the polarity comparators is high (FIG. 23, line D), FET210 is gated closed, FET204 and FET207 are alternately gated closed and opened, FET205 and FET206 are gated opened, and FET208 and FET209 are gated closed and opened in phase opposition to the opening and closing action of FET204 and FET207. (The switching action of FET207 and FET209 is of no consequence since FET205 and FET211 are gated opened.) The end result of the foregoing relationship is that positive pulses having a magnitude equal to the magnitude of the positive (+V6) output of the reference voltage souce 233 and the width of the pulses on line X are applied to the lowpass filter via FET204 and FET210. During the dead time between pulses the input of the lowpass filter is grounded via FET208 and FET210. The result is illustrated in FIG. 23, line F. When the outputs of the polarity comparators switch states and line Z carries the pulses produced by the pulse width modulator, rather than line X, FET211 is gated closed, FET210 is gated opened, FET204 and FET207 are gated opened, FET205 and FET206 are alternately gated closed and opened, and FET208 are alternately gated opened and closed in phase opposition to the gating of FET205 and FET206. The end result of this relationship is that positive pulses having the magnitude of the positive (+V6) output of the reference voltage source 233 and the width of pulses on line Z are applied to the lowpass filter via FET205 and FET211. During the dead time between pulses the input of the lowpass filter is grounded via FET209 and FET211. This result is illustrated in FIG. 23, line G. When the phase relationship between the outputs of the polarity comparators is reversed with respect to the production of pulses on lines X and Z similar switching actions occur to create negative pulses on the input of the lowpass filter, as illustrated in FIG. 23, lines J and K.

The lowpass filter 237 comprises: a resistor designated R240; and, a capacitor designated C223. The drain terminals of FET210 and FET211 are connected through R240 in series with C223 to ground. The output of the lowpass filter occurs at the junction between R240 and C223. In essence, the lowpass integrates (e.g., accumulates) the pulses produced at the drain terminals of FET210 and FET211 in the manner just described. Negative pulses, of course, decrease the charge on C223 and positive pulses increase the charge. This charge is a DC voltage that is directly related to the tangent of the phase angle of the target. As with the previously described target identification subsystems, the accuracy of this relationship improves each time the detector head passes over the target. This result occurs because only target created pulses are gated to the lowpass filter via FET210 and FET211. Thus, FET210 and FET211 in combination with the lowpass filter and the polarity comparators form a gated lowpass filter having a long time constant.

The buffer amplifier 239 merely comprises a single operational amplifier designated OA230. The output of the lowpass filter 237, i.e., the signal at the junction between R240 and C223, is applied to the noninverting input of OA230. The output of OA230 is connected to the inverting input of OA230. The TARGET IDENTITY signal applied to the display is produced on the output of OA230.

While the target identification subsystem illustrates in FIGS. 17–21 (which uses direct division rather than implicit division) will produce a suitable TARGET IDENTITY signal, it is not as preferred as the target identification subsystems previously illustrated and described because it has ground mineralization offset problems. That is, while like the first described embodiment of the invention the subsystem illustrated in FIGS. 17–21 has a linear transfer function and the ability to distinguish between targets having somewhat closely related phase angles, such as pull tabs and nickels, it has a ground mineralization offset disadvantage. The latter disadvantage is not present in the previously described target identification subsystems.

While preferred embodiments of the invention have been illustrated and described, it will be appreciated that various changes can be made therein without departing from the spirit and scope of the invention. For example, circuits other than those specifically illustrated and described, suitable for performing the denoted functions, can be utilized. Further, some or all of the circuits can be implemented in digital form. Regardless of how implemented, the circuits must be designed to remove ground mineralization information from the signals they process while maintaining phase correlation between signals being processed in different channels, prior to such signals being combined and/or used to control the processing of other signals as heretofore described.

The embodiments of the invention in which an exclusive property or privilege is claimed are defined as follows:

1. A metal detector system for identifying metal targets located in mineralized ground comprising:
(A) a signal production subsystem including:
  (1) detector means, including coil means and oscillator means for driving said coil means, for producing a detector signal that includes a target component when relative movement occurs between said coil means and a suitably close metal target, said detector signal also including a ground mineralization component when said metal target is buried in mineralized ground; and,
  (2) electronic means coupled to said detector means for receiving said detector signal and producing at least one target signal, said target signal including a target component containing information about the phase angle of said metal target and a ground mineralization component when said metal target is buried in mineralized ground;
(B) a signal processor including a target identifying subsystem coupled to said electronic means for: (a)

receiving said target signal; (b) removing substantially all of said ground mineralization component from said target signal; (c) determining the phase angle of said metal target only during the period of time said target component is present in said target signal; and, (d) producing a TARGET IDENTITY signal having a parameter that varies in accordance with said phase angle; and, (C) display means coupled to said signal processor for receiving said TARGET IDENTITY signal and displaying said parameter of said TARGET IDENTITY signal that varies in accordance with said phase angle.

2. A metal detector system as claimed in claim 1 wherein: (a) said target component of said target signal also contains information about the distance between said metal target and said coil means; (b) said signal processor also includes a target depth subsystem for determining the depth of said target based on said distance information and produces a TARGET DEPTH signal having a parameter that varies in accordance with target depth; and, (c) said display is also coupled to said signal processor for receiving said TARGET DEPTH signal and displaying the parameter of said TARGET DEPTH signal that varies in accordance with target depth.

3. A metal detector system as claimed in claim 1 wherein said target identifying subsystem of said signal processor removes said ground mineralization component from said target signal by filtering said one target signal.

4. A metal detector system as claimed in claim 3 wherein:
(A) said electronic means of said signal production subsystem produces two target signals, $V_R$ and $V_X$, both of said target signals including a target component containing information about the phase angle of said metal target, said $V_X$ signal including a substantial ground mineralization component when said metal target is buried in mineralized ground; and,
(B) said target identifying subsystem of said signal processor also: (a) receives said second target signal; (b) filters said second target signal to remove said ground mineralization component therefrom in a manner that maintains phase correlation between the target components of the filtered form of said two target signals; and, (c) determines the phase angle of said target by dividing the target component of one of said target signals into the target component of the other of said target signals, the results of said division controling the magnitude and polarity of the voltage of said TARGET IDENTITY signal, said voltage forming the parameter of said TARGET IDENTITY signal that varies in accordance with the phase angle of said target.

5. A metal detector system as claimed in claim 4 wherein said $V_R$ and $V_X$ signals are in phase quadrature.

6. A metal detector system as claimed in claim 4 wherein said electronic means of said signal production subsystem includes:
a phase shift preamplifier having its input connected to said coil means of said detector means;
a demodulator switching generator connected to said oscillator means for receiving the signal applied to said coil means by said oscillator means and for producing a pair of demodulation signals having the same frequency as the frequency of the signal applied to said coil means by said oscillator means, said pair of demodulation signals having a predetermined phase relationship;
a $V_X$ demodulator having an unknown signal input connected to the output of said phase shift preamplifier and a demodulation signal input connected to one output of said demodulator switching generator, the output of said $V_X$ demodulator forming said $V_X$ signal; and,
a $V_R$ demodulator having an unknown signal input connected to the output of said phase shift preamplifier and a demodulation signal input connected to the second output of said demodulator switching generator, the output of said $V_R$ demodulator forming said $V_R$ signal.

7. A metal detector system as claimed in claim 6 wherein said electronic means of said signal production subsystem also includes a $V_{GB}$ amplifier having two inputs connected to the outputs of said $V_X$ and $V_R$ demodulators, said $V_{GB}$ amplifier combining said $V_X$ and $V_R$ signals in a manner that removes substantially all of the ground mineralization components therefrom and produces a $V_{GB}$ signal, said $V_{GB}$ signal being in the form of a pulse whose magnitude is dependent upon the distance between said metal target and said coil means when said $V_X$ and $V_R$ signals include a target component.

8. A metal detector system as claimed in claim 7 wherein said signal processor also includes a target depth subsystem connected to the output of said $V_{GB}$ amplifier for receiving said $V_{GB}$ signal and determining the depth of said target based on the magnitude of said $V_{GB}$ pulses and producing in accordance therewith a TARGET DEPTH signal having a parameter that varies in accordance with the depth of said target.

9. A metal detector system as claimed in claim 8 wherein the results of said determination of the depth of said target based on the magnitude of said $V_{GB}$ pulses controls the current magnitude of said TARGET DEPTH signal, said current magnitude forming the parameter of said TARGET DEPTH signal that varies in accordance with the depth of said target.

10. A metal detector system as claimed in claim 9 wherein said display means includes first and second displays, said first display coupled to said target identifying subsystem to receive said TARGET IDENTITY signal and display the voltage magnitude of said signal, said second display coupled to said target depth subsystem to receive said TARGET DEPTH signal and display the current magnitude of said signal.

11. A metal detector system as claimed in claim 10 wherein said first and second displays are liquid crystal bar graph displays.

12. A metal detector system as claimed in claim 11 wherein said first and second liquid crystal bar graph displays are located adjacent to one another.

13. A metal detector system as claimed in claim 7 wherein said target identifying subsystem includes:
a divider section coupled to said $V_X$ and $V_R$ demodulators for receiving said $V_X$ and $V_R$ signals and determining the phase angle of said target by determining the ratio between the voltage magnitude of the target components of said $V_X$ and $V_R$ signals; and,
a control section coupled to said $V_{GB}$ amplifier for receiving said $V_{GB}$ pulses and coupled to said divider to enabling said divider only during the period of time a $V_{GB}$ pulses of predetermined magnitude is produced by said $V_{GB}$ amplifier.

14. A metal detector system as claimed in claim 13 wherein said target components of said $V_X$ and $V_R$ signals are both in the form of pulses.

15. A metal detector system as claimed in claim 14 wherein said divider section is an implicit divider.

16. A metal detector system as claimed in claim 14 wherein said implicit divider comprises:

$V_X$ filtering means connected to said $V_X$ demodulator for receiving said $V_X$ signal, removing a substantial portion of said ground mineralization component from said $V_X$ signal and converting the target component of said $V_X$ signal from pulse form to sinusoidal form;

$V_R$ filtering means connected to said $V_R$ demodulator for receiving said $V_R$ signal, removing a substantial portion of said ground mineralization component from said $V_R$ signal and converting the target component of said $V_R$ signal from pulse form to sinusoidal form such that said sinusoidal form of said target component of said $V_R$ signal is phase correlated with said sinusoidal form of the target component of said $V_X$ signal;

modulation means connected to said $V_R$ filtering means for pulse width—pulse height modulating said sinusoidal form of said target component of said $V_R$ signal such that the polarity and width of the pulses is determined by the polarity and magnitude of a feedback signal whose magnitude and polarity is directly related to the phase angle of said metal target and the height of the pulses is determined by the magnitude of said sinusoidal form of said target component of said $V_R$ signal;

a summer connected to the output of said modulation means and to the output of said $V_X$ filtering means for combining said modulated sinusoidal form of said target component of said $V_R$ signal with said sinusoidal form of said target component of said $V_X$ signal and producing a sinusoidal output signal in accordance therewith whose magnitude is related to the magnitude of the difference between said signals; and, demodulation means connected to the output of said summer for demodulating said sinusoidal output signal produced by said summer and producing said feedback signal whose polarity and magnitude is directly related to the phase angle of said metal target producing and applying said feedback signal to said modulation means.

17. A metal detector system as claimed in claim 16 wherein said control section is coupled to said demodulation means of said implicit divider.

18. A metal detector system as claimed in claim 16 wherein said demodulation means of said implicit divider comprises:

filtering means connected to the output of said summer for removing substantially any ground mineralization component present in said sinusoidal output signal produced by said summer and for converting said sinusoidal output signal produced by said summer into a ringing signal;

an automatic gain control circuit connected to the output of said filtering means for demodulating said ringing signal converted by said filtering means and producing, in accordance therewith, a plurality of pulses on one of two outputs, the width of said pulses being related to the magnitude of said ringing signals, the output on which said pulses occur being dependent upon whether the phase angle of said metal target is greater or less than phase angle of the last detected target as determined by the polarity and magnitude of said feedback signal;

a logic circuit connected to the two outputs of said automatic gain control circuit for receiving the pulses produced on said outputs and for producing fixed magnitude bi-polar output pulses in accordance therewith, the polarity of said bi-polar pulses being dependent upon which of the two output lines of said automatic gain control circuit a pulse occurs; and, an integrator connected to the output of said logic circuit for integrating the bi-polar pulses produced by said logic circuit and producing, in accordance therewith, said feedback signal, said feedback signal also forming said TARGET IDENTITY signal.

19. A metal detector system as claimed in claim 18 wherein the output of said control section is connected to said automatic gain control circuit.

20. A metal detector system as claimed in claim 18 wherein said control section of said target identifying subsystem includes:

an R window circuit coupled to said $V_{GB}$ amplifier for producing an R WINDOW signal that shifts from a first state to a second state during the period of time the magnitude of a $V_{GB}$ pulse exceeds a predetermined level, said R WINDOW signal being applied to said automatic gain control circuit in a manner that disables said automatic gain control circuit when said R WINDOW signal is in said first state and enables said automatic gain control circuit when said R WINDOW signal is in said second state.

21. A metal detector system as claimed in claim 20 wherein:

said electronic means of said signal production subsystem also includes a $V_{GB}$ filter connected between the output of said $V_{GB}$ amplifier and the input of said R window circuit for converting said $V_{GB}$ pulses into ringing signals such that the frequency of said ringing signals is the same as the frequency of said ringing signals converted by said filtering means from said sinusoidal output signals produced by said summer; and, said R window circuit produces, in addition to said R WINDOW signal, a pair of anti-phase square wave signals, $+R$ and $-R$, such that said $+R$ and $-R$ signals have the same frequency as said $V_{GB}$ ringing signals and are in phase or 180 degrees out of phase with said ringing signals converted by said filtering means from said sinusoidal output signals produced by said summer, said $+R$ and $-R$ signals being applied to said automatic gain control circuit and determining on which one of said two outputs of said automatic gain control circuit the pulses produced by said automatic gain control circuit occur.

22. A metal detector system as claimed in claim 21 wherein said control section of said target identifying subsystem also includes:

rectifier means connected to said $V_{GB}$ filter and to said R window circuit for receiving said $V_{GB}$ ringing signals and said $+R$ and $-R$ signals and, in accordance therewith, producing bi-polar envelope signals that track the envelopes of said $V_{GB}$ ringing signals; and, a triangle modulator connected to said rectifier means for receiving said bi-polar envelope signals and producing a modulated triangular signal whose magnitude tracks said bi-polar envelope signals, said modulated triangular signal being applied to said automatic gain control circuit for controlling the modulation of said ringing signals converted by said filtering means from said sinusoidal output signals produced by said summer.

23. A metal detector system as claimed in claim 22 wherein said target identifying subsystem also includes an overdrive/enable circuit connected to said $V_{GB}$ filter to receive said $V_{GB}$ ringing signals and, in accordance therewith, enable said logic circuit during the period of time the excursions of said $V_{GB}$ ringing signals are present, and do not exceed a predetermined magnitude.

24. A metal detector system as claimed in claim 22 wherein said display means includes:

a voltage generating means for cyclically generating a voltage that changes from a first level to a second level in a predetermined manner;

a target identification comparator connected to the output of said voltage generating means and to the output of said integrator for comparing the voltage magnitude of said TARGET IDENTITY signal with the voltage produced by said voltage generating means and producing a two state output signal, said output signal being in a first state when the voltage magnitude of said TARGET IDENTITY signal lies above the voltage produced by said voltage generating means and in a second state when the voltage produced by said voltage generating means lies above the voltage magnitude of said TARGET IDENTITY signal;

a target identification display; and, target identity control means connected between the output of said target identification comparator and said target identification display for controlling said target identification display in a manner that denotes the length of time that the output of said target identification comparator remains in one of its two states with respect to the cycle period of said voltage generating means, said time ratio being related to the voltage magnitude of said TARGET IDENTITY signal and, thus, the phase angle of said metal target.

25. A metal detector system as claimed in claim 24 wherein said signal processor also includes a target depth subsystem connected to the output of said $V_{GB}$ amplifier for receiving said $V_{GB}$ signal and determining the depth of said target based on the magnitude of said $V_{GB}$ pulses and producing in accordance therewith a TARGET DEPTH signal having a parameter that varies in accordance with the depth of said target.

26. A metal detector system as claimed in claim 25 wherein the results of said determination of the depth of said target based on the magnitude of said $V_{GB}$ pulses controls the current magnitude of said TARGET DEPTH signal, said current magnitude forming the parameter of said TARGET DEPTH signal that varies in accordance with the depth of said target.

27. A metal detector system as claimed in claim 26 wherein said display means also includes:

a current-to-voltage converter for receiving said TARGET DEPTH signal and converting said target depth information from current form to voltage form;

a target depth comparator connected to the output of said voltage generating means and to the output of current-to-voltage converter for comparing the magnitude of the output voltage of said current-to-voltage converter with the voltage produced by said voltage generating means and producing a two state output signal, said output signal being in a first state when the magnitude of the output voltage of said current-to-voltage converter lies above the voltage produced by said voltage generating means and in a second state when the voltage produced by said voltage generating means lies above the magnitude of the output voltage of said current-to-voltage converter;

a target depth display; and, target depth control means connected between the output of said target depth comparator and said target depth display for controlling said target depth display in a manner that denotes the length of time the output of said target depth comparator remains in one of its two states with respect to the cycle period of said voltage generating means, said time ratio being related to the current magnitude of said TARGET DEPTH signal and, thus, the depth of said metal target.

28. A metal detector system as claimed in claim 27 wherein the output of said voltage generating means changes in a stairstep manner.

29. A metal detector system as claimed in claim 28 wherein said target identity and target depth displays are liquid crystal bar graph displays.

30. A metal detector system as claimed in claim 29 wherein said liquid crystal bar graph displays are located adjacent to one another.

31. A metal detector system as claimed in claim 6 wherein said electronic means of said signal production system produces a target presence pulse when relative movement occurs between said transmit and receive coils and said suitably close metal target and wherein said target identifying subsystem includes:

a divider section coupled to said $V_X$ and $V_R$ demodulators for receiving said $V_X$ and $V_R$ signals and determining the phase angle of said target by determining the ratio between the voltage magnitude of the target components of said $V_X$ and $V_R$ signals; and, a control section coupled to said demodulation means of said signal production system for receiving said target presence pulses and coupled to said divider for enabling said divider only during the period of time a target presence pulse of predetermined magnitude is produced by said demodulation means of said signal production system.

32. A metal detector system as claimed in claim 31 wherein said target components of said $V_X$ and $V_R$ signals are both in the form of pulses.

33. A metal detector system as claimed in claim 32 wherein said divider section is an implicit divider.

34. A metal detector system as claimed in claim 32 wherein said implicit divider comprises:

$V_X$ filtering means connected to said $V_X$ demodulator for receiving said $V_X$ signal, removing a substantial portion of said ground mineralization component from said $V_X$ signal and converting the target component of said $V_X$ signal from pulse form to sinusoidal form;

$V_R$ filtering means connected to said $V_R$ demodulator for receiving said $V_R$ signal, removing a substantial portion of said ground mineralization component from said $V_R$ signal and converting the target component of said $V_R$ signal from pulse form to sinusoidal form such that said sinusoidal form of said target component of said $V_R$ signal is phase correlated with said sinusoidal form of the target component of said $V_X$ signal;

modulation means connected to said $V_R$ filtering means for pulse width—pulse height modulating said sinusoidal form of said target component of said $V_R$ signal such that the polarity and width of the pulses is determined by the polarity and magnitude of a feedback signal whose magnitude and polarity is directly related to the phase angle of said metal target and the height of the pulses is determined by the magnitude of said sinusoidal form of said target component of said $V_R$ signal;

a summer connected to the output of said modulation means and to the output of said $V_X$ filtering means for combining said modulated sinusoidal form of said target component of said $V_R$ signal with said sinusoidal form of said target component of said $V_X$ signal and producing a sinusoidal output signal in accordance therewith whose magnitude is related to the magnitude of the difference between said signals; and, demodulation means connected to the output of said summer for demodulating said sinusoidal output signal produced by said summer and producing said feedback signal whose polarity and magnitude is directly related to the phase angle of said metal target producing and applying said feedback signal to said modulation means.

35. A metal detector system as claimed in claim 34 wherein said control section is coupled to said demodulation means of said implicit divider.

36. A metal detector system as claimed in claim 34 wherein said demodulation means of said implicit divider comprises:

filtering means connected to the output of said summer for removing substantially any ground mineralization component present in said sinusoidal output signal produced by said summer and for converting said sinusoidal output signal produced by said summer into a ringing signal;

an automatic gain control circuit connected to the output of said filtering means for demodulating said ringing signal converted by said filtering means and producing in accordance therewith a plurality of pulses on one of two outputs, the width of said pulses being related to the magnitude of said ringing signals, the output on which said pulses occur being dependent upon whether the phase angle of said metal target is greater or less than the phase angle of the last detected target as determined by the polarity and magnitude of said feedback signal;

a logic circuit connected to the two outputs of said automatic gain control circuit for receiving the pulses produced on said outputs and for producing fixed magnitude bi-polar outputs pulses in accordance therewith, the polarity of said bi-polar pulses being dependent upon which of the two output lines of said automatic gain control circuit a pulse occurs; and, an integrator connected to the output of said logic circuit for integrating the bi-polar pulses produced by said logic circuit and producing, in accordance therewith, said feedback signal, said feedback signal also forming said TARGET IDENTITY signal.

37. A metal detector system as claimed in claim 36 wherein the output of said control section is connected to said automatic gain control circuit.

38. A metal detector system as claimed in claim 36 wherein said control section of said target identifying subsystem includes:

an R window circuit coupled to said electronic means of said signal production subsystem for producing an R WINDOW signal that shifts from a first state to a second state during the period of time the magnitude of a target presence pulse exceeds a predetermined level, said R WINDOW signal being applied to said automatic gain control circuit in a manner that disables said automatic gain control circuit when said R WINDOW signal is in said first state and enables said automatic gain control circuit when said R WINDOW signal is in said second state.

39. A metal detector system as claimed in claim 38 wherein:

said electronic means of said signal production subsystem also includes a filter for converting said target presence pulses into ringing signals such that the frequency of said ringing signals is the same as the frequency of said ringing signals converted by said filtering means from said sinusoidal output signals produced by said summer; and, said R window circuit receives said target presence ringing signals and produces, in addition to said R WINDOW signal, a pair of anti-phase square wave signals, $+R$ and $-R$, such that said $+R$ and $-R$ signals have the same frequency as said target presence ringing signals and are in phase or 180 degrees out of phase with said ringing signals converted by said filtering means from said sinusoidal output signals produced by said summer, said $+R$ and $-R$ signals being applied to said automatic gain control circuit and determining on which one of said two outputs or said automatic gain control circuit pulses produced by said automatic gain control circuit occur.

40. A metal detector system as claimed in claim 39 wherein said control section of said target identifying subsystem also includes:

rectifier means connected to said filter and to said R window circuit for receiving said target presence ringing signals and said $+R$ and $-R$ signals and, in accordance therewith, producing bi-polar envelope signals that track the envelopes of said target presence ringing signals; and, a triangle modulator connected to said rectifier means for receiving said bi-polar envelope signals and producing a modulated triangular signal whose magnitude tracks said bi-polar envelope signals, said modulated triangular signal being applied to said automatic gain control circuit for controlling the modulation of said ringing signals converted by said filtering means from said sinusoidal output signals produced by said summer.

41. A metal detector system as claimed in claim 40 wherein said target identifying subsystem also includes an overdrive/enable circuit connected to said filter to receive said target presence ringing signals and, in accordance therewith, enable said logic circuit during the period of time the excursions of said target presence ringing signals are present, and do not exceed a predetermined magnitude.

42. A metal detector system as claimed in claim 40 wherein said display means includes:
  a voltage generating means for cyclically generating a voltage that changes from a first level to a second level in a predetermined manner;
  a target identification comparator connected to the output of said voltage generating means and to the output of said integrator for comparing the voltage magnitude of said TARGET IDENTITY signal with the voltage produced by said voltage generating means and producing a two state output signal, said output signal being in a first state when the voltage magnitude of said TARGET IDENTITY signal lies above the voltage produced by said voltage generating means and in a second state when the voltage produced by said voltage generating means lies above the voltage magnitude of said TARGET IDENTITY signal;
  a target identification display; and,
  target identity control means connected between the output of said target identification comparator and said target identification display for controlling said target identification display in a manner that denotes the length of time that the output of said target identification comparator remains in one of its two states with respect to the cycle period of said voltage generating means, said time ratio being related to the voltage magnitude of said TARGET IDENTITY signal and, thus, the phase angle of said metal target.

43. A metal detector system as claimed in claim 42 wherein the output of said voltage generating means changes in a stairstep manner.

44. A metal detector system as claimed in claim 43 wherein said target identity display is a liquid crystal bar graph display.

45. A metal detector system as claimed in claim 6 wherein said target identifying subsystem includes:
  a divider section coupled to said $V_X$ and $V_R$ demodulators for receiving said $V_X$ and $V_R$ signals and determining the phase angle of said target by determining the ratio between the voltage magnitude of the target components of said $V_X$ and $V_R$ signals; and,
  a control section coupled to said divider section for receiving said $V_R$ signal and enabling said divider only during the period of time said $V_R$ signal contains a target component.

46. A metal detector system as claimed in claim 45 wherein said divider section of said target identifying subsystem comprises:
  $V_R$ filtering means for receiving said $V_R$ signal, removing ground information from said $V_R$ signal and converting the target component of said $V_R$ signal from pulse form into sinusoidal form;
  a triangle amplitude modulator connected to said $V_R$ filtering means for triangle amplitude modulating the output of said $V_R$ filtering means;
  $V_X$ filtering means connected to said $V_X$ demodulator for receiving said $V_X$ signal, removing ground information from said $V_X$ signal and converting the target component of said $V_X$ signal from pulse form to sinusoidal form;
  a pulse width modulator having a signal input connected to the output of said $V_X$ filtering means and a modulating input connected to the output of said triangle amplitude modulator for pulse width modulating the output of said $V_X$ filtering means;
  demodulation means connected to the output of said pulse width modulator for demodulating the width of the pulses produced by said pulse width modulator and producing bi-polar pulses having a magnitude and polarity related to the phase angle of said metal target; and,
  a lowpass filter connected to the output of said demodulation means for integrating said bi-polar pulses and producing a DC voltage, having a magnitude and polarity related to the phase angle of said metal target, said DC voltage forming said TARGET IDENTITY signal.

47. A metal detector system as claimed in claim 46 wherein said control section of said target identifying subsystem includes polarity comparison means connected to the output of said $V_R$ filtering means for producing a pair of anti-phase output signals having the same frequency as the ringing signals produced on the output of said $V_R$ filtering means and in phase or 180 degrees out of phase therewith, said pair of anti-phase signals connected to said demodulator for enabling said demodulator only during the period of times one of said anti-phase signals exist, said demodulator also using said anti-phase signals to control the polarity of the bi-polar pulses produced by said demodulator.

48. A metal detector system as claimed in claim 47 wherein said control section of said target identifying subsystem also includes window means connected to said $V_R$ filtering means for producing a target window signal that shifts from a first state to a second state and remains in said second state during the period of time a ringing signal is produced by said $V_R$ filtering means, said target window signal being applied to said polarity comparison means for enabling said polarity comparison means to produce said anti-phase signals only during the period of time said target window is in said second state.

49. A metal detector system as claimed in claim 48 wherein said target identifying subsystem also includes overdrive control means connected to said $V_X$ filtering means and said $V_R$ filtering means for producing an overdrive control signal when signals produced by either said $V_R$ filtering means or said $V_X$ filtering means exceeds a predetermined level, the output of said overdrive control means connected to said triangle amplitude modulator to inhibit said triangle amplitude modulator when said overdrive control signal is produced by said overdrive control means.

50. A metal detector system including a target identifying system as claimed in claim 49 wherein the output of said overdrive control signal is also connected to said polarity comparison means to inhibit the operation of said polarity comparison means when said overdrive control signal is produced by said overdrive control means.

51. A metal detector system as claimed in claim 48 wherein said display means includes:
  a voltage generating means for cyclically generating a voltage that changes from a first level to a second level in a predetermined manner;
  a target identification comparator connected to the output of said voltage generating means and to the output of said lowpass filter for comparing the voltage magnitude of said TARGET IDENTITY signal with the voltage produced by said voltage generating means and producing a two state output signal, said output signal being in a first state when the voltage magnitude of said TARGET IDENTITY signal lies above the voltage produced by said voltage generating means and in a second state when the voltage produced by said voltage generating means lies above the voltage magnitude of said TARGET IDENTITY signal;

a target identification display; and, target identity control means connected between the output of said target identification comparator and said target identification display for controlling said target identification display in a manner that denotes the length of time that the output of said target identification comparator remains in one of its two states with respect to the cycle period of said voltage generating means, said time ratio being related to the voltage magnitude of said TARGET IDENTITY signal and, thus, the phase angle of said metal target.

52. A metal detector system as claimed in claim 51 wherein the output of said voltage generating means changes in a stairstep manner.

53. A metal detector system as claimed in claim 52 wherein said target identity display is a liquid crystal bar graph display.

54. A metal detector system as claimed in claim 3 wherein the magnitude and the polarity of the voltage of said TARGET IDENTITY signal form the parameter of said TARGET IDENTITY signal that varies in accordance with the phase angle of said target and wherein said demodulation means of said signal production subsystem includes:

a phase shift circuit having a signal input connected to said oscillator means for receiving the signal applied to said coil means by said oscillator and a control input connected to said signal processor for receiving said TARGET IDENTITY signal, for phase shifting said oscillator signal in accordance with the magnitude and polarity of the voltage of said TARGET IDENTITY signal produced by said target identifying subsystem of said signal processor;

a demodulator switching generator connected to the output of said phase shift circuit for producing demodulation signals having the same frequency as said oscillator signal; and, a demodulator having an unknown signal input coupled to said coil means of said detector means and a demodulation signal input connected to the output of said demodulator switching generator for producing said at least one target signal.

55. A metal detector system as claimed in claim 54 wherein said demodulation means of said signal processor also includes a phase shift preamplifier connected between said coil means and said unknown signal input of said demodulator.

56. A metal detector system as claimed in claim 54 wherein said demodulation means of said signal production subsystem produces a second target signal, $V_{GB}$, said $V_{GB}$ signal being in the form of a pulse whose magnitude is dependent upon the distance between said target and said coil means and whose presence occurs when relative movement occurs between said coil means and said suitably close metal target.

57. A metal detector system as claimed in claim 56 wherein said signal processor also includes a target depth subsystem connected to said demodulation means of said signal production subsystem for receiving said $V_{GB}$ signal and determining the depth of said target based on the magnitude of said $V_{GB}$ pulses and producing, in accordance therewith, a TARGET DEPTH signal having a parameter that varies in accordance with the depth of said metal target.

58. A metal detector system as claimed in claim 57 wherein the results of said determination of the depth of said target based on the magnitude of said $V_{GB}$ pulses controls the current magnitude of said target depth signal, said current magnitude forming the parameter of said TARGET DEPTH signal that varies in accordance with the depth of said target.

59. A metal detector system as claimed in claim 58 wherein said display means includes first and second displays, said first display coupled to said target identifying subsystem to receive said TARGET IDENTITY signal and display the voltage magnitude of said signal, said second display coupled to said target depth subsystem to receive said TARGET DEPTH signal and display the current magnitude of said signal.

60. A metal detector system as claimed in claim 59 wherein said first and second displays are liquid crystal bar graph displays.

61. A metal detector system as claimed in claim 60 wherein said liquid crystal bar graph displays are located adjacent to one another.

62. A metal detector system as claimed in claim 56 wherein said target identifying subsystem of said signal processor includes:

filtering means connected to the output of said demodulator of said demodulation means of said signal production subsystem for receiving the output of said demodulator, removing said ground mineralization component present in the target signals produced by said demodulator and converting the target component of said target signals from pulse form to ringing signal form; and, demodulation means connected to the output of said filtering means for demodulating the output of said filtering means and producing said TARGET IDENTITY signal.

63. A metal detector system as claimed in claim 62 wherein said target identifying subsystem includes a control section that enables said demodulation means only during the period of time a $V_{GB}$ pulse signal is produced by said demodulation means of said signal production subsystem.

64. A metal detector system as claimed in claim 63 wherein said demodulation means of said target identifying subsystem also includes:

an automatic gain control circuit connected to the output of said filtering means for demodulating the ringing signals converted by said filtering means and producing, in accordance therewith, a plurality of pulses on one of two outputs, the width of said pulses being related to the magnitude of said ringing signals, the output on which said pulses occur being dependent upon whether the phase angle of said metal target is greater or less than the phase angle of the last detected target as determined by the magnitude and polarity of said TARGET IDENTITY signal;

a logic circuit connected to the two outputs of said automatic gain control circuit for receiving the pulses produced on said two outputs and for producing fixed magnitude bi-polar output pulses in accordance therewith, the polarity of said bi-polar pulses being dependent upon which of the two output lines of said automatic gain control circuit a pulse occurs; and, an integrator connected to the output of said logic circuit for integrating the bi-polar pulses produced by said logic circuit and producing, in accordance therewith, said TARGET IDENTITY signal.

65. A metal detector system as claimed in claim 64 wherein the output of said control section of said target identifying subsystem is connected to said automatic gain control circuit.

66. A metal detector system as claimed in claim 65 wherein said control section of said target identifying subsystem includes:

an R window circuit connected to said electronic means of said signal production subsystem for receiving said $V_{GB}$ signal and producing an R WINDOW signal that shifts from a first state to a second state during the period of time the magnitude of said $V_{GB}$ pulses exceeds a predetermined level, said R WINDOW signal being applied to said automatic gain control circuit in a manner that disables said automatic gain control circuit when said R WINDOW signal is in said first state and enables said automatic gain control circuit when said R WINDOW signal is in said second state.

67. A metal detector system as claimed in claim 66 wherein said electronic means of said signal production subsystem also produces a $V_{GB}$ ringing signal having a frequency the same as the ringing signal converted by said filtering means from target pulse form; and, said R window circuit is connected to said electronic means of said signal production subsystem for receiving said $V_{GB}$ ringing signal and producing in addition to said R WINDOW signal a pair of anti-phase square waves, $+R$ and $-R$, such that said $+R$ and $-R$ signals have the same frequency as said $V_{GB}$ ringing signal and are in phase or 180 degrees out of phase with said ringing signals converted by said filtering means, said $+R$ and said $-R$ signals being applied to said automatic gain control circuit and determining on which one of said two outputs of said automatic gain control circuit pulses produced by said automatic gain control circuit occur.

68. A metal detector system as claimed in claim 76 wherein said control section of said target identifying subsystem also includes:

rectifier means connected to said electronic means of said signal production subsystem for receiving said $V_{GB}$ ringing signal and to said R window circuit for receiving said $+R$ and $-R$ signals and, in accordance therewith, producing bi-polar envelope signals that track the envelopes of said $V_{GB}$ ringing signal; and, a triangle modulator connector to said rectifier means for receiving said bi-polar envelope signals and producing a modulated triangular signal whose magnitude tracks said bi-polar envelope signals, said modulated triangular signal being applied to said automatic gain control circuit for controlling the modulation of the ringing signals converted by said filtering means.

69. A metal detector system as claimed in claim 68 wherein said target identifying subsystem also includes an overdrive/enable circuit connected to receive said $V_{GB}$ ringing signal and, in accordance therewith, enables said logic circuit during the period of time the excursions of said ringing form of said $V_{GB}$ signal are present, and do not exceed a predetermined magnitude.

70. A metal detector system as claimed in claim 68 wherein said display means includes:

a voltage generating means for cyclically generating a voltage that changes from a first level to a second level in a predetermined manner;

a target identification comparator connected to the output of said voltage generating means and to the output of said integrator for comparing the voltage magnitude of said TARGET IDENTITY signal with the voltage produced by said voltage generating means and producing a two state output signal, said output signal being in a first state when the voltage magnitude of said TARGET IDENTITY signal lies above the voltage produced by said voltage generating means and in a second state when the voltage produced by said voltage generating means lies above the voltage magnitude of said TARGET IDENTITY signal;

a target identification display; and, target identity control means connected between the output of said target identification comparator and said target identification display for controlling said target identification display in a manner that denotes the length of time that the output of said target identification comparator remains in one of its two states with respect to the cycle period of said voltage generating means, said time ratio being related to the voltage magnitude of said TARGET IDENTITY signal and, thus, the phase angle of said metal target.

71. A metal detector system as claimed in claim 70 wherein said signal processor also includes a target depth subsystem connected to said electronic means of said signal processor subsystem for receiving said $V_{GB}$ signal and determining the depth of said target based on the magnitude of said $V_{GB}$ pulses and producing in accordance therewith a TARGET DEPTH signal having a parameter that varies in accordance with the depth of said target.

72. A metal detector system as claimed in claim 71 wherein the results of said determination of the depth of said target based on the magnitude of said $V_{GB}$ pulses controls the current magnitude of said TARGET DEPTH signal, said current magnitude forming the parameter of said TARGET DEPTH signal that varies in accordance with the depth of said target.

73. A metal detector system as claimed in claim 72 wherein said display means also includes:

a current-to-voltage converter for receiving said TARGET DEPTH signal and converting said target depth information from current form to voltage form;

a target depth comparator connected to the output of said voltage generating means and to the output of current-to-voltage converter for comparing the magnitude of the output voltage of said current-to-voltage converter with the voltage produced by said voltage generating means and producing a two state output signal, said output signal being in a first state when the magnitude of the output voltage of said current-to-voltage converter lies above the voltage produced by said voltage generating means and in a second state when the voltage produced by said voltage generating means lies above the magnitude of the output voltage of said current-to-voltage converter;

a target depth display; and, target depth control means connected between the output of said target depth comparator and said target depth display for controlling said target depth display in a manner that denotes the length of time the output of said target depth comparator remains in one of its two states with respect to the cycle period of said voltage generating means, said time ratio being related to the current magnitude of said TARGET DEPTH signal and, thus, the depth of said metal target.

74. A metal detector system as claimed in claim 73 wherein the output of said voltage generating means changes in a stairstep manner.

75. A metal detector system as claimed in claim 74 wherein said target identity and target depth displays are liquid crystal bar graph displays.

76. A metal detector system as claimed in claim 75 wherein said liquid crystal bar graph displays are located adjacent to one another.

* * * * *

UNITED STATES PATENT AND TRADEMARK OFFICE
CERTIFICATE OF CORRECTION

PATENT NO. : 4,507,612
DATED : March 26, 1985
INVENTOR(S) : Payne

It is certified that error appears in the above-identified patent and that said Letters Patent is hereby corrected as shown below:

| | | |
|---|---|---|
| Column 53, | line 42: | insert --and FET 209-- after "FET 208" |
| Claim 13, | line 11: | "to" should be --for-- |
| | line 12: | "pulses" should be --pulse-- |
| Claim 36, | line 24: | "outputs" should be --output-- |
| Claim 67, | line 2: | insert --:-- (colon) after "wherein" |
| Claim 68 | line 1: | "76" should be --67-- |
| | line 11: | "connector" should be --connected-- |

Signed and Sealed this

Tenth Day of December 1985

[SEAL]

Attest:

DONALD J. QUIGG

Attesting Officer

Commissioner of Patents and Trademarks